United States Patent
Wang et al.

(10) Patent No.: US 9,841,944 B2
(45) Date of Patent: Dec. 12, 2017

(54) METHOD FOR PROCESSING INFORMATION AND ELECTRONIC APPARATUS

(71) Applicant: Lenovo (Beijing) Co., Ltd., Beijing (CN)

(72) Inventors: Guizhen Wang, Beijing (CN); Lijun Lin, Beijing (CN); Jing Wang, Beijing (CN); Leilei Zhao, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 325 days.

(21) Appl. No.: 14/230,205

(22) Filed: Mar. 31, 2014

(65) Prior Publication Data
US 2015/0121229 A1    Apr. 30, 2015

(30) Foreign Application Priority Data

Oct. 28, 2013   (CN) .......................... 2013 1 0516587
Oct. 28, 2013   (CN) .......................... 2013 1 0517805
(Continued)

(51) Int. Cl.
*G06F 3/16*      (2006.01)
*G06F 3/0484*    (2013.01)
(Continued)

(52) U.S. Cl.
CPC ............ *G06F 3/167* (2013.01); *G06F 3/0482* (2013.01); *G06F 3/0484* (2013.01); *G06F 3/0488* (2013.01); *G06F 3/0489* (2013.01)

(58) Field of Classification Search
CPC ... G06F 3/04842; G06F 3/0481; G06F 3/0482
See application file for complete search history.

(56) References Cited

U.S. PATENT DOCUMENTS 6,075,531 A * 6/2000 DeStefano .......... G06F 3/04812
                                                    715/788
6,188,405 B1 * 2/2001 Czerwinski ........... G06F 3/0481
                                                    715/764
(Continued)

FOREIGN PATENT DOCUMENTS

CN      101606124 B     2/2013
CN      103116438 A     5/2013
WO   WO-2010110459 A1   9/2010

OTHER PUBLICATIONS

First Chinese Office Action regarding Application No. 201410060515.0 dated Apr. 29, 2016. English translation provided by Unitalen Attorneys at Law.
(Continued)

*Primary Examiner* — Nicholas Augustine
(74) *Attorney, Agent, or Firm* — Harness, Dickey & Pierce, P.L.C.

(57) ABSTRACT

A method for processing information applied in an electronic apparatus is provided. The method includes: acquiring a first operation to trigger the multi-window manager; displaying the multi-window management interface corresponding to the multi-window manager in the touch-control display unit based on the first operation; displaying the at least one object identifier corresponding to the at least one application in the multi-window management interface, and displaying running status information corresponding to the at least one application. Using the technical solution of the present invention, the user is able to know the applications which may be displayed in a form of a small window and the current running status thereof conveniently and quickly by means of a multi-window management interface, and thereby the user experience is improved.

18 Claims, 30 Drawing Sheets

(30) Foreign Application Priority Data

Oct. 28, 2013 (CN) .......................... 2013 1 0517972
Feb. 21, 2014 (CN) .......................... 2014 1 0060515

(51) Int. Cl.
*G06F 3/0488* (2013.01)
*G06F 3/0489* (2013.01)
*G06F 3/0482* (2013.01)
*G06F 3/01* (2006.01)

(56) References Cited

U.S. PATENT DOCUMENTS

| | | | |
|---|---|---|---|
| 8,549,429 B2 | 10/2013 | Tsuruta et al. | |
| 8,769,431 B1* | 7/2014 | Prasad | G06F 3/048 |
| | | | 715/764 |
| 2004/0261037 A1* | 12/2004 | Ording | G06F 3/0481 |
| | | | 715/788 |
| 2008/0307360 A1* | 12/2008 | Chaudhri | G06F 3/0481 |
| | | | 715/835 |
| 2010/0088634 A1 | 4/2010 | Tsuruta et al. | |
| 2012/0013562 A1 | 1/2012 | Jyonoshita et al. | |
| 2013/0120295 A1 | 5/2013 | Kim et al. | |
| 2013/0159941 A1* | 6/2013 | Langlois | G06F 3/017 |
| | | | 715/863 |
| 2013/0290887 A1* | 10/2013 | Sun | G06F 3/0482 |
| | | | 715/769 |
| 2013/0305184 A1* | 11/2013 | Kim | G06F 3/0481 |
| | | | 715/781 |
| 2013/0307783 A1* | 11/2013 | Park | G06F 3/04886 |
| | | | 345/169 |
| 2014/0043277 A1* | 2/2014 | Saukko | G06F 3/044 |
| | | | 345/174 |
| 2014/0047379 A1* | 2/2014 | Urawaki | G09G 5/14 |
| | | | 715/789 |
| 2014/0089831 A1* | 3/2014 | Kim | G06F 3/0481 |
| | | | 715/769 |
| 2014/0089833 A1* | 3/2014 | Hwang | G06F 3/04817 |
| | | | 715/769 |
| 2014/0282119 A1* | 9/2014 | Wouhaybi | G06F 3/04883 |
| | | | 715/760 |
| 2014/0317559 A1* | 10/2014 | Wakefield | G06F 3/0481 |
| | | | 715/788 |

OTHER PUBLICATIONS

Second Chinese Office Action regarding Application No. 201410060515.0 dated Dec. 26, 2016. English translation provided by Unitalen Attorneys at Law.

* cited by examiner obtain a third operation and generate a third triggering instruction which indicates to initiate a multi-window management interface of an electronic apparatus, where the multi-window management interface is used for managing an application of the electronic apparatus ⸺ 601 in response to the second triggering instruction, initiate the multi-window management interface, acquire an application identifier corresponding to the application of the electronic apparatus, and display the acquired application identifier in a first region of the multi-window management interface, where the first region includes N first sub-regions, with N being a positive integer, and each of the first sub-regions is used to display one corresponding application identifier, where the multi-window management interface further includes a second region, in which at least one first displaying small window is included, the first displaying small window is used to display the running interface of an application running in a foreground and opened in the form of the small window ⸺ 602

FIG. 6

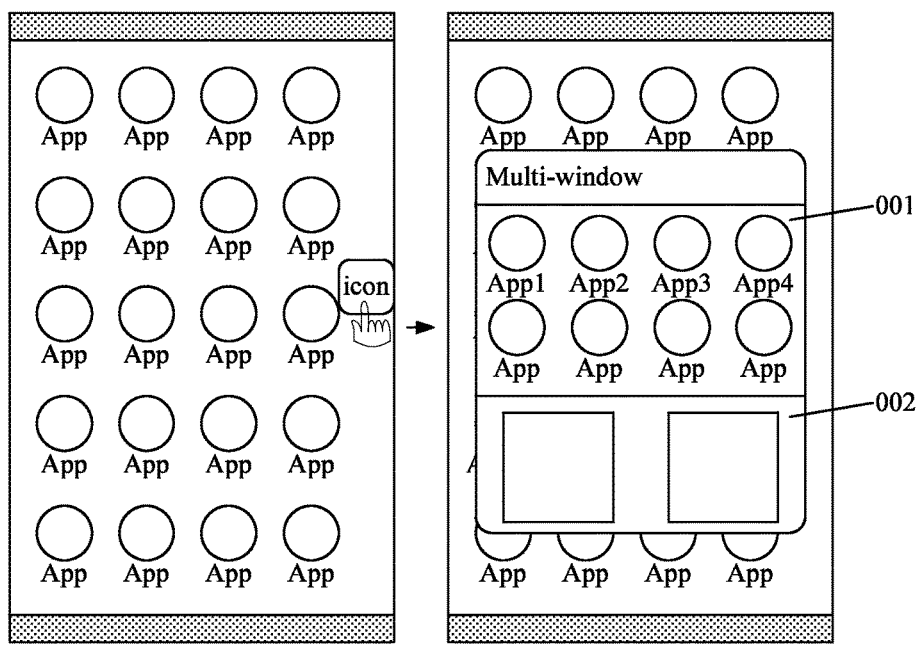

FIG. 7

METHOD FOR PROCESSING INFORMATION AND ELECTRONIC APPARATUS

CROSS-REFERENCES TO RELATED APPLICATIONS

The present application claims priority to Chinese Patent Application No. 201310517805.9, entitled "METHOD FOR PROCESSING INFORMATION AND ELECTRONIC APPARATUS", filed with the Chinese State Intellectual Property Office on Oct. 28, 2013, priority to Chinese Patent Application No. 201310516587.7, entitled "METHOD FOR PROCESSING INFORMATION AND ELECTRONIC APPARATUS", field with the Chinese State Intellectual Property Office on Oct. 28, 2013, priority to Chinese Patent Application No. 201310517972.3, entitled "METHOD FOR PROCESSING INFORMATION AND ELECTRONIC APPARATUS", field with the Chinese State Intellectual Property Office on Oct. 28, 2013, and priority to Chinese Patent Application No. 201410060515.0, entitled "METHOD FOR PROCESSING INFORMATION AND ELECTRONIC APPARATUS", field with the Chinese State Intellectual Property Office on Feb. 21, 2014, which are incorporated herein by reference in their entireties.

TECHNICAL FIELD

The present invention relates to an electronic apparatus technology, particularly relates to a method for processing information and an electronic apparatus.

BACKGROUND

In the earlier stage of the development of the mobile apparatus, the screen size of the mobile apparatus is relatively small, and the screen resolution is relatively low. At this time, operation system such as the Android operation system of the mobile terminal itself provides application function of single window, in which only one application can be displayed. That is to say, the operation system only allows one application in the foreground, and to interact with the user. The status of the application in the foreground is referred to as Activity Status, and the status of the application interacting with the user is referred to as Resumed Status. But with the rapid development of the hardware of the mobile terminal, particularly the increasing of the screen resolution and the increasing of the size, the application of single window of the operation system in the earlier stage of the mobile apparatus cannot meets the requirement of the user, and the user urgently requires that application function of multi-window being provided by the operating system of the mobile device. For example, the user wants to chat with his friends based on the instant message tool such as QQ while watching a video using a mobile terminal such as a tablet computer, two or more windows are required to be displayed in the interface of the tablet computer at the same time, wherein each window is used to display one application.

Generally speaking, a multi-window manager is running in the electronic apparatus having multi-window function, at least one object identifier corresponding to at least one application can be displayed in the display interface of the multi-window manager, how to conveniently and quickly enter the display interface of the multi-window manager becomes a question need to be solved.

SUMMARY

In view of the above, one of the objects of the embodiment of the present invention is to provide a method for processing information and an electronic apparatus. The user is able to know the applications which may be displayed in a form of a small window and the current running status thereof conveniently and quickly by means of a multi-window management interface.

To achieve the above-mentioned object, the technical solution of the embodiment of the present invention is implemented as follows.

The embodiment of the present invention provides a method for processing information, applied in an electronic apparatus. The method includes:

acquiring a first operation for triggering the multi-window manager, wherein the multi-window manager runs on the electronic apparatus;

triggering an object identifier in a multi-window manager corresponding to the multi-window manager, initiating an application corresponding to the object identifier, and determining a first transformation parameter, wherein the first transformation parameter is at least one of: a single parameter, a matrix, a parameter group and a parameter set; and displaying the multi-window management interface corresponding to the multi-window manager based on the first operation; displaying the object identifier in the multi-window management interface, and displaying running status information corresponding to the application in a small window, wherein the small window is transformed from a full screen window based on the first transformation parameter.

Preferably, the acquiring a first operation includes:

detecting whether a touch operation which meets a first predetermined condition occurs; and determining that the first operation is acquired, in the case where the operation meets the first predetermined condition;

detecting whether a key-pressing operation which meets a second predetermined condition occurs; and determining that the first operation is acquired, in the case where the key-pressing operation meets the second predetermined condition;

detecting whether a change in an attitude of the electronic apparatus which meets a third predetermined condition occurs; and determining that the first operation is acquired, in the case where the change in the attitude of the electronic apparatus which meets the third predetermined condition occurs; or, detecting whether a voice operation which meets a fourth predetermined condition occurs; and determining that the first operation is acquired, in the case where the voice operation meets the fourth predetermined condition.

Preferably, the displaying running status information corresponding to the at least one application includes:

displaying at least one piece of running status information in one-to-one correspondence with the at least one application in the multi-window management interface, in the case where the running status of the at least one application is determined to be different.

Preferably, the method includes:

acquiring a second operation;

determining a first object identifier in the multi-window management interface according to the second operation;

determining first running status information of the first object identifier, switching the first application from a first running status to a second running status according to the first running status information, and displaying second running status information of the first application in the multi-window management interface.

Preferably, the multi-window management interface comprises a first region and a second region;

where the first region is configured to display the at least one object identifier corresponding to the at least one application, and the running status information corresponding to the at least one application;

where the second region comprises at least one first displaying small window, the first displaying small window is configured to display running interface of an application running in a foreground and opened in the form of the small window.

Preferably, the method further includes:

obtaining a third operation and generating a third triggering instruction which indicates to select a first application from applications corresponding to the application identifiers displayed in the first region to run in the foreground; and in response to the third triggering instruction, judging whether the selected first application runs in the foreground; if the selected first application runs in the foreground, continuously running the first application in the foreground and displaying the running interface of the first application in a first displaying small window, assigned by the third triggering instruction, in the second region of the multi-window management interface; if the selected first application does not run in the foreground, running the first application in the foreground and displaying the running interface of the first application in the first displaying small window, assigned by the third triggering instruction, in the second region of the multi-window management interface.

Preferably, the method further includes: in the case where the first application runs in the foreground, displaying the running interface of the first application in the form of a first small window corresponding to the first displaying small window, wherein the first small window is covered by the multi-window management interface transparently, translucently or nontransparently.

Preferably, after the displaying the running interface of the first application in the first displaying small window assigned by the third triggering instruction, the method further includes:

obtaining a fourth operation and generating a fourth triggering instruction which indicates to clean the first application displayed in the first displaying small window; and in response to the fourth triggering instruction, switching the first application to run in a background or stopping the first application, and cleaning both the running interface of the first application in the first displaying small window and the first small window corresponding to the first displaying small window.

Preferably, after the displaying the running interface of the first application in the first displaying small window assigned by the third triggering instruction, the method further includes:

obtaining a fifth operation and generating a fifth triggering instruction which indicates to switch the application running in the foreground from the first application to a second application; and in response to the fifth triggering instruction, switching the first application to run in a background and the second application to run in the foreground, and displaying the running interface of the second application in a first displaying small window, assigned by the fifth triggering instruction, in the second region of the multi-window management interface, wherein the first displaying small window assigned by the fifth triggering instruction is the same as the first displaying small window assigned by the second triggering instruction, and the running interface of the second application displayed in the first displaying small window is configured to replace the running interface of the first application.

Preferably, the second regions comprises at least two first displaying small windows, and the first small window corresponds to the first displaying small window in one-to-one correspondence; in the case where the different first displaying small windows are respectively configured to display running interfaces of different applications, the method further includes:

obtaining a sixth operation and generating a sixth triggering instruction which indicates to exchange the running interfaces of the corresponding applications displayed in the two first displaying small windows; and in response to the sixth triggering instruction, replacing the running interfaces of the corresponding applications displayed in the two first displaying small windows assigned by the sixth triggering instruction with each other and also replacing the running interfaces of the corresponding applications displayed in the two first small windows respectively corresponding to the two first displaying small windows with each other.

Preferably, the method further includes:

acquiring a seventh operation;

generating a seventh instruction based on the seventh operation;

detecting a display state of the target object corresponding to the multi-window management application and obtaining a detection result, in response to the seventh instruction; and switching from a first display state to a second display state in the case where the detection result shows that the target object corresponding to the multi-window management application is in the first display state.

Preferably, the electronic apparatus includes a sensing unit, the method includes:

detecting, by the sensing unit, a grip state of the electronic apparatus;

displaying the target object corresponding to the multi-window management application on a first region of the touch-control display unit, in the case where the grip state of the electronic apparatus is a first state; and displaying the target object corresponding to the multi-window management application on a second region of the touch-control display unit, in the case where the grip state of the electronic apparatus is a second state.

Preferably, the detecting, by the sensing unit, a grip state of the electronic apparatus includes:

detecting, by the sensing unit, a deflection angle of the electronic apparatus;

comparing the deflection angle with a preset standard value of a posture, wherein the standard value characterizes a parameter value of the posture in the case where the electronic apparatus is in a horizontal state;

determining that the grip state of the electronic apparatus is the first state, in the case where the deflection angle is greater than the standard value; and determining that the grip state of the electronic apparatus is the second state, in the case where the deflection angle is less than the standard value.

Preferably, the detecting, by the sensing unit, a grip state of the electronic apparatus includes:

detecting, by the sensing unit, touch areas of a first surface and a second surface of the electronic apparatus;

comparing the touch area of the first surface with the touch area of the second surface;

determining that the grip state of the electronic apparatus is the first state, in the case where the touch area of the first surface is larger than the touch area of the second surface; and determining that the grip state of the electronic apparatus is the second state, in the case where the touch area of the first surface is smaller than the touch area of the second surface.

Preferably, the detecting, by the sensing unit, a grip state of the electronic apparatus includes:

detecting, by the sensing unit, fingerprint information on a first surface and/or a second surface of the electronic apparatus; and determining the grip state of the electronic apparatus based on the fingerprint information on the first surface and/or the fingerprint information on the second surface.

Preferably, the detecting, by the sensing unit, a grip state of the electronic apparatus includes:

collecting, by the sensing unit, a grip image of the electronic apparatus;

analyzing the grip image and acquiring a characteristic parameter of the grip image; and matching the characteristic parameter of the grip image with a prestored standard parameter to determine the grip state of the electronic apparatus.

Preferably, the detecting, by the sensing unit, a grip state of the electronic apparatus includes:

detecting a position of a touch-controlling point operated on the touch-control display unit by a user within a predetermined period, to obtain N position coordinates, with N being an integer greater than or equal to 1;

generating touch-control region information based on the N position coordinates, wherein the touch-control region information characterizes a touch-control region operated on the touch-control display unit by the user within the predetermined period;

determining the first region and the second region based on the touch-control region information;

acquiring a first touch-control operation and determining a position of a touch-control point operated on the touch-control display unit by the first touch-control operation;

determining that the grip state of the electronic apparatus is the first state, in the case where the position of the touch-control point operated by the first touch-control operation is in the first region; and determining that the grip state of the electronic apparatus is the second state, in the case where the position of the touch-control point operated by the first touch-control operation is in the second region.

The embodiment of the present invention further provides an electronic apparatus including a touch-control display unit, where a multi-window manager runs on the electronic apparatus;

where the touch-control display unit is configured to display a multi-window management interface corresponding to the multi-window manager, and the multi-window management interface is configured to display at least one object identifier corresponding to at least one application;

where a first transformation parameter is determined in the case where any one of the object identifiers in the multi-window manager is triggered and the application corresponding to the object identifier is initiated;

where a full screen window of the initiated application is transformed into a small window for displaying the application by using the first transformation parameter, a display region of the small window being smaller than a display region of the full screen window for displaying the application;

where the electronic apparatus includes a first acquiring device and a first display device, where:

the first acquiring device is configured to acquire a first operation to trigger the multi-window manager;

the first display device is configured to display the multi-window management interface corresponding to the multi-window manager in the touch-control display unit based on the first operation; to display the at least one object identifier corresponding to the at least one application in the multi-window management interface, and to display running status information corresponding to the at least one application.

Preferably, the first acquiring device includes a detecting unit and a determining unit, where:

the detecting unit is configured to detect whether a touch operation which meets a first predetermined condition occurs; and the determining unit is configured to determine that the first operation is acquired, in the case where the operation meets the first predetermined condition;

the detecting unit is configured to detect whether a key-pressing operation which meets a second predetermined condition occurs; and the determining unit is configured to determine that the first operation is acquired, in the case where the key-pressing operation meets the second predetermined condition;

the detecting unit is configured to detect whether a change in an attitude of the electronic apparatus which meets a third predetermined condition occurs; and the determining unit is configured to determine that the first operation is acquired, in the case where the change in the attitude of the electronic apparatus which meets the third predetermined condition occurs; or, the detecting unit is configured to detect whether a voice operation which meets a fourth predetermined condition occurs; and the determining unit is configured to determine that the first operation is acquired, in the case where the voice operation meets the fourth predetermined condition.

Preferably, the first display device is further configured to display the multi-window management interface corresponding to the multi-window manager in the touch-control display unit based on the first operation; to display the at least one object identifier corresponding to the at least one application in the multi-window management interface; and to display at least one piece of running status information in one-to-one correspondence with the at least one application in the multi-window management interface, in the case where the running status of the at least one application is determined to be different.

Preferably, the electronic apparatus further comprises a second acquiring device, a determining device and a second display device, where:

the second acquiring device is configured to acquire an operation input by the user;

the determining device is configured to determine a first object identifier in the multi-window management interface according to a second operation in the case where the operation is determined to be the second operation; and the second display device is configured to determine first running status information of the current first object identifier, to switch the first application from a first running status to a second running status according to the first running status information, and to display second running status information of the first application in the multi-window management interface.

The embodiment of the present invention provides a method for processing information and an electronic apparatus. A first operation is firstly acquired, which is used to trigger the multi-window manager. Then the multi-window management interface corresponding to the multi-window manager is displayed in the touch-control display unit based on the first operation; the at least one object identifier corresponding to the at least one application is displayed in the multi-window management interface, and running status information corresponding to the at least one application is displayed. According to the technical solution of the present invention, a display interface is provided for an application displayed in a form of a small window, an object identifier corresponding to the application and the running status of the current application can be displayed in the interface. Therefore, the user is able to know the applications which may be displayed in a form of a small window and the current running status thereof conveniently and quickly by means of the interface. Thereby the user experience is improved by the technical solution of the present invention.

Furthermore, a second operation is firstly acquired. Then a first object identifier in the multi-window management interface is determined according to the second operation. First running status information of the current first object identifier is determined, the first application is switched from the first running status to a second running status according to the first running status information, and the second running status information of the first application is displayed in the multi-window management interface. Thereby, a technical solution for changing the running status of the applications in a multi-window management interface is provided in the embodiment of the present invention.

BRIEF DESCRIPTION OF THE DRAWINGS

FIG. 6 is a schematic diagram of an interface display effect according to a seventh embodiment of the present invention;

FIG. 7 is a schematic diagram of an interface display effect according to an eighth embodiment of the present invention;

DETAILED DESCRIPTION

Figure 1:
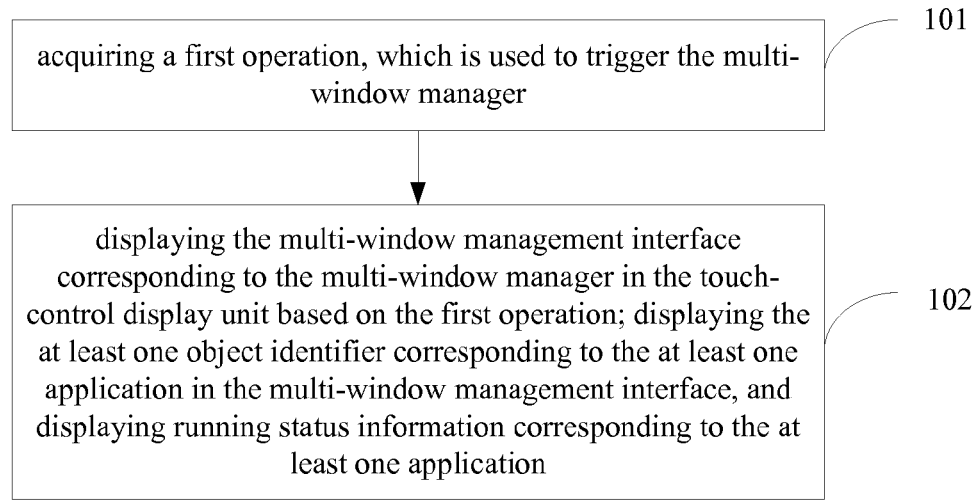
FIG. 1 is a schematic flowchart of a method for processing information according to a first embodiment of the present invention.

The embodiments of the present invention will be further explained in detail in connection with the accompany drawings and the particular embodiment.

According to the embodiments of the present invention, a method for processing information and an electronic apparatus are provided, the electronic apparatus includes a touch-control display unit, and a multi-window manager runs on the electronic apparatus, the touch-control display is configured to display a multi-window management interface corresponding to the multi-window manager, and the multi-window management interface is configured to display at least one object identifier corresponding to at least one application;

a first transformation parameter is determined when any one of the object identifiers in the multi-window manager is triggered and the application corresponding to the object identifier is initiated;

a full screen window of the initiated application is transformed into a small window for displaying the application by using the first transformation parameter, a display region of the small window is smaller than a display region of the full screen window for displaying the application.

In the embodiments of the present invention, the application running on the electronic apparatus may be an application self-contained in the electronic apparatus system such as a clock application, a camera application, an contact list application, and also may be a third party application installed by the user such as a wechat application, a game application, a browser application, an instant chatting application, an e-mail application, a management application and so on.

Generally speaking, all the applications are displayed in the form of object identifiers on the desktop of the electronic apparatus, one application corresponds to one object identifier, a typical object identifier is an icon, the application corresponding to the object identifier is initiated by performing an operation on the object identifier of the application. For example, when a user touches an icon of the contact list application on the desktop of the electronic apparatus such as a mobile phone, the contact list application may be initiated, and the recorded contact list in the contact list application is displayed on the touch-control display unit. When the application is initiated from the desktop, the application is displayed in the form of a full screen window on the display screen of the electronic apparatus.

In the embodiments of the present invention, the first transformation parameter may be stored in the database of the electronic apparatus in advance; the first transformation parameter is at least one of: a parameter, a matrix, a parameter group and a parameter set. For example, in a practical implementation, the first transformation parameter may be presented either in the form of a matrix or in the form of a parameter group, where the parameter in a parameter group may either be a specific numerical value or a vector; the first transformation parameter is implemented below in the form of a matrix, which is specifically defined in the embodiments of the present invention as a first transformation parameter, the first matrix may be stored in a matrix library of the electronic apparatus in advance; a transformation of the full screen window of the application may be performed using the first matrix, to generate a small window; such as a decrease transformation, a translation transformation or a shape transformation is performed on the full screen window, thereby a full screen window is transformed into a small window.

Using the first matrix, the graphics cache data of the application in the full screen window may be transformed to generate graphics cache data of the application in the small window; by the transformation of the graphics cache data in the full window, the display effect of decreasing the full screen window of the application and forming the small window, thereby the application being displayed in the form of a small window on the touch-control display unit may be achieved, and a translation transformation, a shape transformation and an angle transformation etc. of the small window may be performed using the first matrix.

Preferably, the first matrix may be set by the manufacturer of the electronic apparatus in advance, and also may be set in the electronic apparatus manually by the user; the electronic apparatus provides a function of generating the matrix automatically for the convenience of the user to set the first matrix manually, the user is only required to set some parameters such as a window horizontal coordinate scaling parameter, a window vertical coordinate scaling parameter, a window translation parameter, a window shape parameter, a window angle rotation parameter relating to the first matrix in the electronic apparatus for the electronic apparatus to generate a corresponding first matrix according to the above-mentioned parameters.

Here, a scaling and rotation transformation on the full screen window of the first application is performed, which may be implemented by formula (1) using the first matrix:

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_2 \\ z_3 \end{pmatrix} \qquad (1)$$

In formula (1), $$\begin{pmatrix} x_2 \\ y_2 \\ z_2 \end{pmatrix}$$

is the coordinate vector of the small window, $x_2$ is the horizontal coordinate of the small window, $y_2$ is the vertical coordinate of the small window, $z_2$ is generally default to be set to 1;

$$V = \begin{pmatrix} M_{11} & M_{12} & M_{13} \\ M_{21} & M_{22} & M_{23} \\ M_{31} & M_{32} & M_{33} \end{pmatrix}, V$$

represents the first matrix, the first matrix is a matrix of 3×3, $M_{ij}$ represents the ith row and the jth column of the first matrix, the value of i ranges from 1, 2, 3; the value of j ranges from 1, 2, 3;

$$\begin{pmatrix} x_1 \\ y_1 \\ z_1 \end{pmatrix}$$

represents the coordinate vector of the full screen window, $x_1$ is the horizontal coordinate of the full screen window, $y_1$ is the vertical coordinate of the full screen window, $z_1$ is generally default to be set to 1;

when performing a scaling transformation on the full screen window by formula (1), the 4 elements of $M_{ij}$ may be set as follows: $M_{11}=\alpha$, $M_{12}=0$, $M_{21}=0$, $M_{22}=\beta$, other 5 elements may be arbitrarily set, thus, formula (2) may be obtained by substituting the set parameter mentioned above into formula (1):

$$x_2 = \alpha \times x_1 \quad (1)$$

$$y_2 = \beta \times y_1 \quad (2)$$

where $\alpha$ is a horizontal coordinate scaling parameter, and $\beta$ is a vertical coordinate scaling parameter.

When a clockwise rotation transformation on the full screen window is performed by formula (1), the 4 elements of $M_{ij}$ may be set as follows: $M_{11}=\cos\theta$, $M_{12}=\sin\theta$, $M_{21}=-\sin\theta$, $M_{22}=\cos\theta$, other 5 elements may be arbitrarily set, thus, formula (3) may be obtained by substituting the set parameter mentioned above into formula (1):

$$x_2 = \cos\theta \times x_1 + \sin\theta \times y_1$$

$$y_2 = -\sin\theta \times x_1 + \cos\theta \times y_1 \quad (3)$$

where $\theta$ is a rotation angle.

A translation transformation on the full screen window of the first application is performed, which may be implemented by formula (4) using the first matrix:

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (4)$$

When performing the translation transformation on the full screen window by formula (4), the 2 elements of $M_{ij}$ may be set such as follows: $M_{11}=a$, $M_{21}=b$, $M_{31}=0$, thus, formula (5) may be obtained by substituting the set parameter mentioned above into formula (4):

$$x_2 = a + x_1$$

$$y_2 = b + y_1 \quad (5)$$

where a is a horizontal coordinate translation parameter, and b is a vertical coordinate translation parameter.

In the above-mentioned solution, there may be multiple coordinate vectors of the full screen window, each coordinate vector corresponds to one position of a pixel point; similarly, there may be multiple coordinate vectors of the small screen window, and the number of coordinate vectors of the small window are the same as the number of the coordinate vectors of full screen window, the coordinate vector of the small window also corresponds to one position of the pixel point, which is the pixel point corresponding to the full screen window.

When in a practical implementation, each element of the first matrix further may be set to other value, so that a full screen window may be transformed into a desired small window; and, when a scaling, a translation and a rotation operation of the full screen window is performed at the same time, each element of the first matrix may be set so that the scaling, the translation and the rotation operation of the full screen window may be performed at the same time.

In the embodiments of the present invention, the first matrix M also may be other square matrix such as a 4×4 square matrix. Those skilled in the art may perform a transformation on the dimension of the square matrix according to the practical requirement, and this will not be described in detail herein.

First Embodiment

According to the first embodiment of the present invention, it is provided a method for processing information applied in an electronic apparatus, which has a touch-control display unit, and a multi-window manager runs on the electronic apparatus, the touch-control display unit is configured to display a multi-window management interface corresponding to the multi-window manager, and the multi-window management interface is configured to display at least one object identifier corresponding to at least one application;

a first transformation parameter is determined when any one of the object identifiers in the multi-window manager is triggered and the application corresponding to the object identifier is initiated;

a full screen window of the initiated application is transformed into a small window for displaying the application by using the first transformation parameter, a display region of the small window is smaller than a display region of the full screen window for displaying the application. FIG. 1 is a schematic diagram of the implementation flow of the method for processing information according to the first embodiment of the present invention. As illustrated in FIG. 1, the method includes step 101 and step 102:

in step 101: acquiring a first operation, which is used to trigger the multi-window manager; and in step 102: displaying the multi-window management interface corresponding to the multi-window manager in the touch-control display unit based on the first operation; displaying the at least one object identifier corresponding to the at least one application in the multi-window management interface, and displaying running status information corresponding to the at least one application.

Here, the step of acquiring a first operation includes step A1 and step A2:

step A1 is to detect whether a touch operation which meets a first predetermined condition occurs;

step A2 is to determine that the first operation is acquired, in the case where the operation meets the first predetermined condition.

Here, the touch operation meeting the first predetermined condition occurs, may be implemented by the following forms but is not limited to: whether the touch operation is a single click touch operation; whether the touch operation is a double click touch operation; whether the touch operation is a three-finger touch operation; or, whether the touch operation is a five-finger touch operation.

Here, the step of acquiring a first operation includes step B1 and step B2.

step B1 is to detect whether a key-pressing operation which meets a second predetermined condition occurs.

step B2 is to determine that the first operation is acquired, in the case where the key-pressing operation meets the second predetermined condition.

Here, the key-pressing operation meeting the second predetermined condition, may be implemented by the following forms but is not limited to: whether the key-pressing operation is a long pressure on a certain key, for example pressing a function key such as HOME key for more than 2 seconds; or, whether the key-pressing operation is a combination of some keys, for example a combination of function keys such as HOME key and BACK key.

Here, the step of acquiring a first operation includes step C1 and step C2.

step C1 is to detect whether a change in an attitude of the electronic apparatus which meets a third predetermined condition occurs.

step C2 is to determine that the first operation is acquired, in the case where the change in the attitude of the electronic apparatus which meets the third predetermined condition occurs.

Here, the change in the attitude may be a change in the position of the electronic apparatus. In addition, the first operation may be a voice control operation. In the embodiments of the present invention, the first operation may be any type of operation on the interactive object in the multi-window manager, and this will not be described in detail herein.

Here, the step of acquiring a first operation includes step D1 and step D2.

step D1 is to detect whether a voice operation which meets a fourth predetermined condition occurs;

step D2 is to determine that the first operation is acquired, in the case where the voice operation meets the fourth predetermined condition.

In the embodiment of the present invention, a first operation is firstly acquired, which is used to trigger the multi-window manager. Then the multi-window management interface corresponding to the multi-window manager is displayed in the touch-control display unit based on the first operation; the at least one object identifier corresponding to the at least one application is displayed in the multi-window management interface, and running status information corresponding to the at least one application is displayed. According to the technical solution of the present invention, a display interface is provided for an application displayed in a form of a small window, an object identifier corresponding to the application and the running status of the current application can be displayed in the interface. Therefore, the user is able to know the applications which may be displayed in a form of a small window and the current running status thereof conveniently and quickly by means of the interface. Thereby the user experience is improved by the technical solution of the present invention.

Second Embodiment

Figure 2:
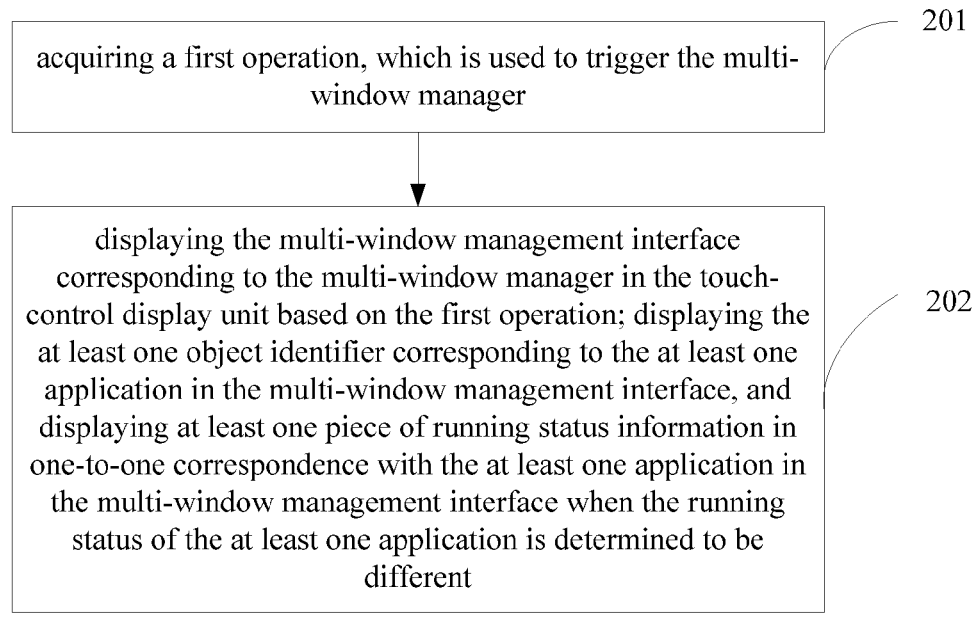
FIG. 2 is a schematic flowchart of a method for processing information according to a second embodiment of the present invention.

According to the second embodiment of the present invention, it is provided a method for processing information applied in an electronic apparatus, which has a touch-control display unit, and a multi-window manager runs on the electronic apparatus, the touch-control display unit is configured to display a multi-window management interface corresponding to the multi-window manager, and the multi-window management interface is configured to display at least one object identifier corresponding to at least one application;

a first transformation parameter is determined when any one of the object identifiers in the multi-window manager is triggered and the application corresponding to the object identifier is initiated;

a full screen window of the initiated application is transformed into a small window for displaying the application by using the first transformation parameter, a display region of the small window is smaller than a display region of the full screen window for displaying the application. FIG. 2 is a schematic diagram of the implementation flow of the method for processing information according to the second embodiment of the present invention. As illustrated in FIG. 2, the method includes step 201 and step 202:

in step 201: acquiring a first operation, which is used to trigger the multi-window manager;

in step 202: displaying the multi-window management interface corresponding to the multi-window manager in the touch-control display unit based on the first operation; displaying the at least one object identifier corresponding to the at least one application in the multi-window management interface, and displaying at least one piece of running status information in one-to-one correspondence with the at least one application in the multi-window management interface when the running status of the at least one application is determined to be different.

Here, the running status includes an opened status and an unopened status; correspondingly, the running status information at least includes opened status information and unopened status information; in a practical implementation, the opened status information may be represented by being marked with a tick or a circle, while the unopened status information may not be marked; when the user sees an object identifier of a specific application being marked with a tick, it means that the application program may currently be displayed in a small window on the touch-control display unit; when the user sees the object identifier of another application is not marked with any marking information, it means that the application may not be opened.

Preferably, the running status information is displayed at a lower right corner or an upper right corner or a lower left corner or an upper left corner of the corresponding object identifier.

In the embodiment of the present invention, a first operation is firstly acquired. Then the multi-window management interface corresponding to the multi-window manager is displayed in the touch-control display unit based on the first operation; the at least one object identifier corresponding to the at least one application is displayed in the multi-window management interface; and at least one piece of running status information in one-to-one correspondence with the at least one application is displayed in the multi-window management interface in the case where the running status of the at least one application is determined to be different. Thus a display interface is provided for an application displayed in a form of a small window, an object identifier corresponding to the application can be displayed in the interface, and the running status information displayed in the multi-window display interface may vary when the running status of the applications varies. Through the interface, the user is able to know the applications which may be displayed in a form of a small window and the current running status thereof conveniently and quickly by means of a multi-window management interface, and thereby the user experience is improved by the technical solution of the present invention.

Third Embodiment

Figure 3:
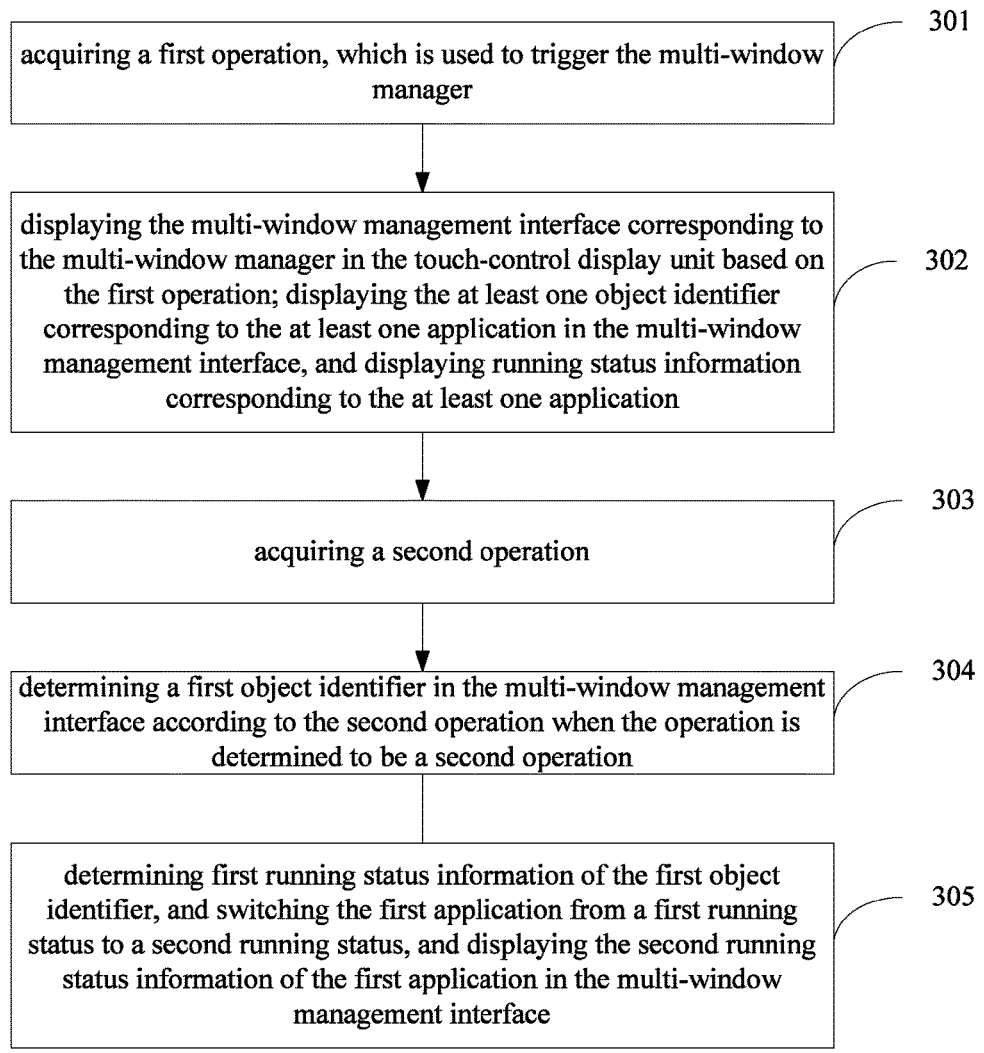
FIG. 3 is a schematic flowchart of a method for processing information according to a third embodiment of the present invention.

According to the third embodiment of the present invention, it is provided a method for processing information applied in an electronic apparatus, which has a touch-control display unit, and a multi-window manager runs on the electronic apparatus, the touch-control display unit is configured to display a multi-window management interface corresponding to the multi-window manager, and the multi-window management interface is configured to display at least one object identifier corresponding to at least one application;

a first transformation parameter is determined when any one of the object identifiers in the multi-window manager is triggered and the application corresponding to the object identifier is initiated;

a full screen window of the initiated application is transformed into a small window for displaying the application by using the first transformation parameter, a display region of the small window being smaller than a display region of the application displayed in the full screen window. FIG. 3 is a schematic diagram of the implementation flow of the method for processing information according to a third embodiment of the present invention. As illustrated in FIG. 3, the method includes step 301 to step 305:

in step 301: acquiring a first operation, which is used to trigger the multi-window manager;

in step 302: displaying the multi-window management interface corresponding to the multi-window manager in the touch-control display unit based on the first operation; displaying the at least one object identifier corresponding to the at least one application in the multi-window management interface, and displaying running status information corresponding to the at least one application;

in step 303: acquiring a second operation;

in step 304: determining a first object identifier in the multi-window management interface according to the second operation when the operation is determined to be a second operation;

in step 305: determining first running status information of the first object identifier, and switching the first application from a first running status to a second running status, and displaying the second running status information of the first application in the multi-window management interface.

Here, the step of acquiring a first operation includes step A1 and step A2:

step A1 is to detect whether a touch operation which meets a first predetermined condition occurs.

step A2 is to determine that the first operation is acquired, in the case where the operation meets the first predetermined condition.

Here, the touch operation meeting the first predetermined condition occurs, may be implemented by the following forms but is not limited to: whether the touch operation is a single click touch operation; whether the touch operation is a double click touch operation; whether the touch operation is a three-finger touch operation; or, whether the touch operation is a five-finger touch operation.

Here, the step of acquiring a first operation includes step B1 and step B2:

step B1 is to detect whether a key-pressing operation which meets a second predetermined condition occurs.

step B2 is to determine that the first operation is acquired, in the case where the key-pressing operation meets the second predetermined condition.

Here, the key-pressing operation meeting the second predetermined condition, may be implemented by the following forms but is not limited to: whether the key-pressing operation being a long pressure on a certain key, for example pressing a function key such as HOME key for more than 2 seconds; or, whether the key-pressing operation being a combination of some keys, for example a combination of function keys such as HOME key and BACK key.

Here, the step of acquiring a first operation includes step C1 and step C2:

step C1 is to detect whether a change in an attitude of the electronic apparatus which meets a third predetermined condition occurs.

step C2 is to determine that the first operation is acquired, in the case where the change in the attitude of the electronic apparatus which meets the third predetermined condition occurs.

Here, the change in the attitude may be a change in the position of the electronic apparatus. In addition, the first operation may be a voice control operation. In the embodiments of the present invention, the first operation may be any type of operation on the interactive object in the multi-window manager, and this will not be described in detail herein.

Here, the step of acquiring a first operation includes step D1 and step D2:

step D1 is to detect whether a voice operation which meets a fourth predetermined condition occurs.

step D2 is to determine that the first operation is acquired, in the case where the voice operation meets the fourth predetermined condition.

Preferably, the step 302 may further be: displaying the multi-window management interface corresponding to the multi-window manager in the touch-control display unit based on the first operation; displaying the at least one object identifier corresponding to the at least one application in the multi-window management interface; and displaying at least one piece of running status information in one-to-one correspondence with the at least one application in the multi-window management interface when the running status of the at least one application is determined to be different.

Here, the running status includes an opened status and an unopened status; correspondingly, the running status information at least includes opened status information and unopened status information; in a practical implementation, opened status information may be represented by being marked with a tick or a circle, while unopened status information may not be marked; when the user sees an object identifier of a specific application being marked with a tick, it means that the application program may currently be displayed in a small window on the touch-control display unit; when the user sees the object identifier of another application is not marked with any marking information, it means that the application may not be opened.

Preferably, the running status information is displayed at a lower right corner or an upper right corner or a lower left corner or an upper left corner of the corresponding object identifier.

In the embodiment of the present invention, a second operation is firstly acquired. Then a first object identifier in the multi-window management interface is determined according to the second operation. First running status information of the current first object identifier is determined, the first application is switched from the first running status to a second running status according to the first running status information, and the second running status information of the first application is displayed in the multi-window management interface. Thereby, a technical solution for changing the running status of the applications in a multi-window management interface is provided in the embodiment of the present invention.

Fourth Embodiment

Figure 4:
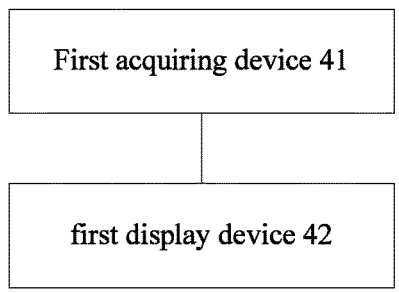
FIG. 4 is a schematic diagram of an electronic apparatus according to a fourth embodiment of the present invention.

According to the fourth embodiment of the present invention, it is provided an electronic apparatus for processing information, which includes a touch-control display unit, and a multi-window manager runs on the electronic apparatus, the touch-control display unit is configured to display a multi-window management interface corresponding to the multi-window manager, and the multi-window management interface is configured to display at least one object identifier corresponding to at least one application;

a first transformation parameter is determined when any one of the object identifiers in the multi-window manager is triggered and the application corresponding to the object identifier is initiated;

a full screen window of the initiated application is transformed into a small window display of the application by using the first transformation parameter, a display region of the small window being smaller than a display region of the application displayed in the full screen window. FIG. 4 is a schematic diagram of the composition structure of the electronic apparatus according to the fourth embodiment of the present invention. As illustrated in FIG. 4, the electronic apparatus includes a first acquiring device 41 and a first display device 42, where:

the first acquiring device 41 is configured to acquire the first operation, which is used to trigger the multi-window manager;

the first display device 42 is configured to display the multi-window management interface corresponding to the multi-window manager in the touch-control display unit based on the first operation; to display the at least one object identifier corresponding to the at least one application in the multi-window management interface, and to display running status information corresponding to the at least one application.

Preferably, the first acquiring device includes a detecting unit and a determining unit, where:

the detecting unit is configured to detect whether a touch operation which meets a first predetermined condition occurs; and the determining unit is configured to determine that the first operation is acquired, in the case where the operation meets the first predetermined condition;

the detecting unit is configured to detect whether a key-pressing operation which meets a second predetermined condition occurs; and the determining unit is configured to determine that the first operation is acquired, in the case where the key-pressing operation meets the second predetermined condition;

the detecting unit is configured to detect whether a change in an attitude of the electronic apparatus which meets a third predetermined condition occurs; and the determining unit is configured to determine that the first operation is acquired, in the case where the change in the attitude of the electronic apparatus which meets the third predetermined condition occurs; or, the detecting unit is configured to detect whether a voice operation which meets a fourth predetermined condition occurs; and the determining unit is configured to determine that the first operation is acquired, in the case where the voice operation meets the fourth predetermined condition.

Here, the touch operation meeting the first predetermined condition occurs, may be implemented by the following forms but is not limited to: whether the touch operation is a single click touch operation; whether the touch operation is a double click touch operation; whether the touch operation is a three-finger touch operation; or, whether the touch operation is a five-finger touch operation.

Here, the key-pressing operation meeting the second predetermined condition, may be implemented by the following forms but is not limited to: whether the key-pressing operation being a long pressure on a certain key, for example pressing a function key such as HOME key for more than 2 seconds; or, whether the key-pressing operation being a combination of some keys, for example a combination of function keys such as HOME key and BACK key.

Here, the change in the attitude may be a change in the position of the electronic apparatus. In addition, the first operation may be a voice control operation. In the embodiments of the present invention, the first operation may be any type of operation on the interactive object in the multi-window manager, and this will not be described in detail herein.

In the embodiments of the present invention, a first operation is firstly acquired, which is used to trigger the multi-window manager. Then the multi-window management interface corresponding to the multi-window manager is displayed in the touch-control display unit based on the first operation; the at least one object identifier corresponding to the at least one application is displayed in the multi-window management interface, and running status information corresponding to the at least one application is displayed. According to the technical solution of the present invention, a display interface is provided for an application displayed in a form of a small window, an object identifier corresponding to the application and the running status of the current application can be displayed in the interface. Therefore, the user is able to know the applications which may be displayed in a form of a small window and the current running status thereof conveniently and quickly by means of the interface. Thereby the user experience is improved by the technical solution of the present invention.

Fifth Embodiment

According to the fifth embodiment of the present invention, it is provided provides an electronic apparatus for processing information, which includes a touch-control display unit, and a multi-window manager runs on the electronic apparatus, the touch-control display unit is configured to display a multi-window management interface corresponding to the multi-window manager, and the multi-window management interface is configured to display at least one object identifier corresponding to at least one application;

a first transformation parameter is determined when any one of the object identifiers in the multi-window manager is triggered and the application corresponding to the object identifier is initiated;

a full screen window of the initiated application is transformed into a small window for displaying the application by using the first transformation parameter, a display region of the small window being smaller than a display region of t the full screen window for displaying he application; the electronic apparatus includes a first acquiring device and a first display device, where the first acquiring device is configured to acquire first operation, and the first operation is used to trigger the multi-window manager;

the first display device is configured to display the multi-window management interface corresponding to the multi-window manager in the touch-control display unit based on the first operation; to display the at least one object identifier corresponding to the at least one application in the multi-window management interface; and to display at least one piece of running status information in one-to-one correspondence with the at least one application in the multi-window management interface when the running status of the at least one application is determined to be different.

Here, the running status includes an opened status and an unopened status; correspondingly, the running status information at least includes opened status information and unopened status information; in a practical implementation, the opened status information may be represented by being marked with a tick or a circle, while the unopened status information may not be marked; when the user sees an object identifier of a specific application being marked with a tick, it means that the application program may currently be displayed in a small window on the touch-control display unit; when the user sees the object identifier of another application is not marked with any marking information, it means that the application may not be opened.

Preferably, the running status information is displayed at a lower right corner or an upper right corner or a lower left corner or an upper left corner of the corresponding object identifier.

In the embodiments of the present invention, a first operation is firstly acquired. Then the multi-window management interface corresponding to the multi-window manager is displayed in the touch-control display unit based on the first operation; the at least one object identifier corresponding to the at least one application is displayed in the multi-window management interface; and at least one piece of running status information in one-to-one correspondence with the at least one application is displayed in the multi-window management interface in the case where the running status of the at least one application is determined to be different. Thus a display interface is provided for an application displayed in a form of a small window, an object identifier corresponding to the application can be displayed in the interface, and the running status information displayed in the multi-window management interface may vary when the running status of the applications varies. Through the interface, the user is able to know the applications which may be displayed in a form of a small window and the current running status thereof conveniently and quickly by means of a multi-window management interface, and thereby the user experience is improved by the technical solution of the present invention.

Sixth Embodiment

Figure 5:
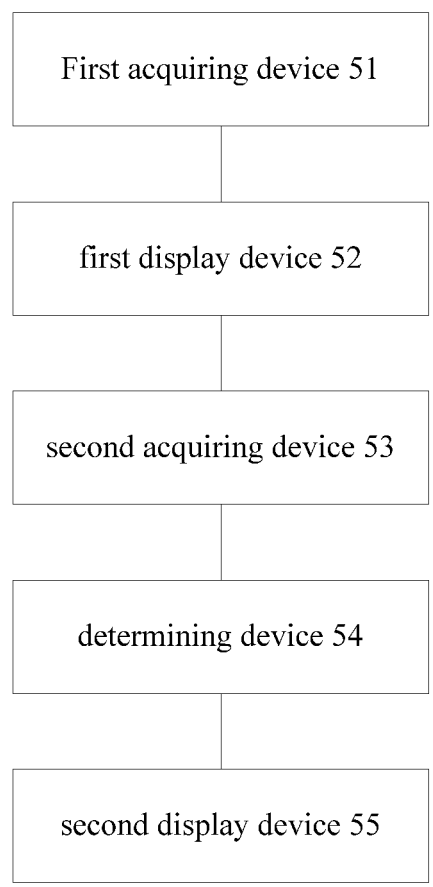
FIG. 5 is a schematic diagram of an electronic apparatus according to a sixth embodiment of the present invention.

According to the sixth embodiment of the present invention, it is provided an electronic apparatus for processing information, which includes a touch-control display unit, and a multi-window manager runs on the electronic apparatus, the touch-control display unit is configured to display a multi-window management interface corresponding to the multi-window manager, and the multi-window management interface is configured to display at least one object identifier corresponding to at least one application;

a first transformation parameter is determined when any one of the object identifiers in the multi-window manager is triggered and the application corresponding to the object identifier is initiated;

a full screen window of the initiated application is transformed into a small window for displaying the application by using the first transformation parameter, a display region of the small window being smaller than a display region of the full screen window for displaying the application. FIG. 5 is a schematic diagram of the composition structure of the electronic apparatus according to the sixth embodiment of the present invention. As illustrated in FIG. 5, the electronic apparatus includes a first acquiring device 51, a first display device 52, a second acquiring device 52, a determining device 53 and a second display device 54, where, the first acquiring device 51 is configured to acquire a first operation, which is used to trigger the multi-window manager;

the first display device 52 is configured to display the multi-window management interface corresponding to the multi-window manager in the touch-control display unit based on the first operation; to display the at least one object identifier corresponding to the at least one application in the multi-window management interface, and to display running status information corresponding to the at least one application;

the second acquiring device 53 is configured to acquire an operation input by the user;

the determining device 54 is configured to determine a first object identifier in the multi-window management interface according to a second operation in the case where the operation is determined to be the second operation;

the second display device 55 is configured to determine first running status information of the current first object identifier, to switch the first application from a first running status to a second running status according to the first running status information, and to display second running status information of the first application in the multi-window management interface.

Preferably, the first acquiring device 51 includes a detecting unit and a determining unit, where:

the detecting unit is configured to detect whether a touch operation which meets a first predetermined condition occurs; and the determining unit is configured to determine that the first operation is acquired, in the case where the operation meets the first predetermined condition;

the detecting unit is configured to detect whether a key-pressing operation which meets a second predetermined condition occurs; and the determining unit is configured to determine that the first operation is acquired, in the case where the key-pressing operation meets the second predetermined condition;

the detecting unit is configured to detect whether a change in an attitude of the electronic apparatus which meets a third predetermined condition occurs; and the determining unit is configured to determine that the first operation is acquired, in the case where the change in the attitude of the electronic apparatus which meets the third predetermined condition occurs; or, the detecting unit is configured to detect whether a voice operation which meets a fourth predetermined condition occurs; and the determining unit is configured to determine that the first operation is acquired, in the case where the voice operation meets the fourth predetermined condition.

Here, the touch operation meeting the first predetermined condition occurs, may be implemented by the following forms but is not limited to: whether the touch operation is a single click touch operation; whether the touch operation is a double click touch operation; whether the touch operation is a three-finger touch operation; or, whether the touch operation is a five-finger touch operation.

Here, the key-pressing operation meeting the second predetermined condition, may be implemented by the following forms but is not limited to: whether the key-pressing operation being a long pressure on a certain key, for example pressing a function key such as HOME key for more than 2 seconds; or, whether the key-pressing operation being a combination of some keys, for example a combination of function keys such as HOME key and BACK key.

Here, the change in the attitude may be a change in the position of the electronic apparatus. In addition, the first operation may be a voice control operation, in the embodiment of the present invention, the first operation may be any type of operation on the interactive object in the multi-window manager, and this will not be described in detail herein.

Preferably, the first display device is further configured to display the multi-window management interface corresponding to the multi-window manager in the touch-control display unit based on the first operation; to display the at least one object identifier corresponding to the at least one application in the multi-window management interface; and to display at least one piece of running status information in one-to-one correspondence with the at least one application in the multi-window management interface, in the case where the running status of the at least one application is determined to be different.

Here, the running status includes an opened status and an unopened status; correspondingly, the running status information at least includes opened status information and unopened status information; in a practical implementation, the opened status information may be represented by being marked with a tick or a circle, while the unopened status information may not be marked; when the user sees an object identifier of a specific application being marked with a tick, it means that the application program may currently be displayed in a small window on the touch-control display unit; when the user sees the object identifier of another application is not marked with any marking information, it means that the application may not be opened.

Preferably, the running status information is displayed at a lower right corner or an upper right corner or a lower left corner or an upper left corner of the corresponding object identifier.

In the embodiment of the present invention, a second operation is firstly acquired. Then a first object identifier in the multi-window management interface is determined according to the second operation. First running status information of the current first object identifier is determined, the first application is switched from the first running status to a second running status according to the first running status information, and the second running status information of the first application is displayed in the multi-window management interface. Thereby, a technical solution for changing the running status of the applications in a multi-window management interface is provided in the embodiment of the present invention.

According to the embodiments of the present invention, a method for processing information and an electronic apparatus are provided to implement more interactive operations and a more vivid application management in an electronic apparatus in which an application is displayed in multiple windows (a full screen window and a small window).

The method according to the embodiments of the present invention is applied in the electronic apparatus. The electronic apparatus includes a touch-control display unit on which M target objects in one-to-one correspondence with M applications are displayed, with M being a positive integer and a corresponding application may be initiated when the target object is touch-controlled. The application may be displayed in a form of a full screen window or a small window on the touch-control display unit, the display region of the small window is smaller than that of the full screen window, and the small window is transformed from the full screen window by using a first transforming parameter.

In the embodiments of the present invention, the first transforming parameter may be stored in a database of the electronic apparatus in advance. The first transforming parameter at least one of a parameter value, a transforming matrix, a parameter group and a parameter set. For example, during a practical implementation, the first transforming parameter may be presented either in the form of a matrix or in the form of a parameter group. Specifically, a parameter in the parameter group may be a specific numerical value or a vector. In the following, the first transforming parameter is implemented in the matrix form and is specifically defined as a first matrix in the embodiments of the present invention. The first matrix may be stored in a matrix library in the electronic apparatus. The full screen window of the application may be transformed by using the first matrix to generate a small window, for example, a decrease transformation, a translation transformation and a shape transformation may be performed on the full screen window to transform the full screen window into the small window.

Using the first matrix, the graphics cache data of the application in the full screen window may be transformed to generate graphics cache data of the application in the small window. By the transformation of the graphics cache data in the full window, the display effect of decreasing the full screen window of the application and forming the small window, thereby the application being displayed in the form of a small window on the touch-control display unit may be achieved, and a translation transformation, a shape transformation and an angle transformation etc. of the small window may be performed using the first matrix.

Preferably, the first matrix may be set by the manufacturer of the electronic apparatus in advance, or may be set in the electronic apparatus manually by a user. The electronic apparatus provides a function of generating the matrix automatically for the convenience of the user to set the first matrix manually, thus the user only required to set some parameters such as a window horizontal coordinate scaling parameter, a window vertical coordinate scaling parameter, a window translation parameter, a window shape parameter and a window angle rotation parameter relating to the first matrix in the electronic apparatus for the electronic apparatus to generate a corresponding first matrix according to the above-mentioned parameters.

Here, a scaling and a rotation transformations on the full screen window of the first application is performed, which may be implemented by formula (1) using the first matrix:

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \qquad (1)$$

in formula (1), $$\begin{pmatrix} x_2 \\ y_2 \\ z_2 \end{pmatrix}$$

is the coordinate vector of a small window, where $x_2$ is the horizontal coordinate of the small window, $y_2$ is the vertical coordinate of the small window and $z_2$ is generally set as 1 in default.

$$V = \begin{pmatrix} M_{11} & M_{12} & M_{13} \\ M_{21} & M_{22} & M_{23} \\ M_{31} & M_{32} & M_{33} \end{pmatrix},$$

where V represents the first matrix which is a matrix of 3×3, $M_{ij}$ represents the ith row and the jth column of the first matrix, the value of i ranges from 1 to 3 and the value of j ranges from 1 to 3.

$$\begin{pmatrix} x_1 \\ y_1 \\ z_1 \end{pmatrix}$$

represents a coordinate vector of the full screen window, where $x_1$ is the horizontal coordinate of the full screen window, $y_1$ is the vertical coordinate of the full screen window and $z_1$ is generally set as 1 in default.

When performing a scaling transformation on the full screen window by formula (1), 4 elements in M may be set as follows: $M_{11}=\alpha$, $M_{12}=0$, $M_{21}=0$ and $M_{22}=\beta$, and other 5 elements in $M_{ij}$ may be set arbitrarily. Thus, formula (2) may be obtained by substituting the parameters set above into formula (1):

$$x_2 = \alpha \times x_1$$

$$y_2 = \beta \times y_1 \qquad (2)$$

where $\alpha$ is a horizontal coordinate scaling parameter, and $\beta$ is a vertical coordinate scaling parameter.

When a clockwise rotation transformation is performed on the full screen window by formula (1), 4 elements in M may be set as follows: $M_{11}=\cos\theta$, $M_{12}=\sin\theta$, $M_{21}=\sin\theta$ and $M_{22}=\cos\theta$, and the other 5 elements in $M_{ij}$ may be set arbitrarily. Thus, formula (3) may be obtained by substituting the parameters set above into formula (1):

$$x_2 = \cos\theta \times x_1 + \sin\theta \times y_1$$

$$y_2 = -\sin\theta \times x_1 + \cos\theta \times y_1 \qquad (3)$$

where $\theta$ is a rotation angle.

A translation transformation on the full screen window of the first application is performed, which may be implemented by formula (4) using the first matrix:

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \qquad (4)$$

When performing the translation transformation on the full screen window by formula (4), 3 elements in $M_{ij}$ may set as follows: $M_{11}=a$, $M_{21}=b$ and $M_{31}=0$, thus, formula (5) may be $M_{11}$ obtained by substituting the parameters set above into formula (4):

$$x_2 = a + x_1$$

$$y_2 = b + y_1 \qquad (5)$$

where a is a horizontal coordinate translation parameter, and b is a vertical coordinate translation parameter.

In the above-mentioned solution, there may be multiple coordinate vectors of the full screen window, each coordinate vector corresponds to one position of a pixel point. Similarly, there may be multiple coordinate vectors of the small window and the number of the coordinate vectors for the small window is the same as that of the full screen window. Each coordinate vector of the small window is also in one-to-one correspondence with to the position of one pixel point, which is the corresponding pixel point of the full screen window.

In a practical implement, elements in the first matrix may be also set as other values, so that a full screen window may be transformed into a desired small window. In addition, when a scaling, a translation and a rotation operation of the full screen window is performed at the same time, each element of the first matrix may be set so that the scaling, the translation and the rotation operation of the full screen window may be performed at the same time.

In embodiments of the present invention, the first matrix M may be also other square matrixes such as a 4×4 square matrix. The dimension of the square matrix may be changed by those skilled in the art as needed, and will not be described hereinafter.

Seventh Embodiment

As shown in FIG. 6, a method for processing information according to the embodiment of the present invention mainly includes steps 601 and 602.

Step 601 is to obtain a third operation and generate a third triggering instruction which indicates to initiate a multi-window management interface of an electronic apparatus, where the multi-window management interface is used for managing an application of the electronic apparatus.

In the embodiments of the present invention, the application of the electronic apparatus may be a self-contained application, such as a clock application, a camera application and a contact list application; and may be also a third-party application installed in the electronic apparatus, such as a WeChat application, a game application, an explorer application, an instant chat application and a mail application.

In the embodiments of the present invention, the second operation may be that a user clicks a certain function button on a system operation interface, and of course may be other operations. The specific content of the first operation is not limited in the embodiment of the present invention, and any second operation which is capable of triggering to generate the second triggering instruction in the practical application should be in the scope of the embodiment of the present invention.

Step 602 is to, in response to the second triggering instruction, initiate the multi-window management interface, acquire an application identifier corresponding to the application of the electronic apparatus, and display the acquired application identifier in a first region of the multi-window management interface, where the first region includes N first sub-regions, with N being a positive integer, and each of the first sub-regions is used to display one corresponding application identifier, where the multi-window management interface further includes a second region, in which at least one first displaying small window is included, the first displaying small window is used to display the running interface of an application running in a foreground and opened in the form of the small window.

The initiated multi-window management interface at least includes the first region and the second region. Specifically, the first region is used for displaying the application identifier of the application, and may include multiple first sub-regions, each of which is used to display one application identifier. The second region is used for displaying the running interface of the application running in the foreground. The second region includes at least one first displaying small window, each of which is used to display the running interface of the application running in the foreground and opened in a small window. In other words, the electronic apparatus supports that multiple applications are opened in a small window manner and runs in the foreground simultaneously. In addition, the running interface of the application displayed in the first displaying small window may be a dynamic interface or a static interface.

In an embodiment of the present invention, after the initiating the multi-window management interface and displaying the application identifier, the method may further includes:

obtaining a third operation and generating a third triggering instruction which indicates to select a first application from applications corresponding to the application identifiers displayed in the first region to run in the foreground; and in response to the third triggering instruction, judging whether the selected first application runs in the foreground; if the selected first application runs in the foreground, continuously running the first application in the foreground and displaying the running interface of the first application in a first displaying small window, assigned by the third triggering instruction, in the second region of the multi-window management interface; if the selected first application does not run in the foreground, running the first application in the foreground and displaying the running interface of the first application in a first displaying small window, assigned by the third triggering instruction, in the second region of the multi-window management interface.

The third operation may be that the user selects the application identifier of the first application from the first region and drags the application identifier into the first displaying small window in the second region, or may be that the user clicks the application identifier within the first region and the first displaying small window within the second region successively in a set time range (such as 1 second). In the embodiments of the present invention, the specific content of the third operation is not limited and any second operation which is capable of triggering to generate the third triggering instruction in practical application should be in the scope of the embodiment of the present invention.

When responding to the third triggering instruction, the electronic apparatus firstly judges whether the first application selected by the user is running in the foreground. If the first application runs in the foreground, the first application is kept running in the foreground and the running interface of the first application is displayed in the first displaying small window assigned by the third triggering instruction in the second region; if the selected first application does not run in the foreground, the first application may runs in the background or may be unopened; for the first application running in the background, it is necessary to switch the running status into the foreground running, and for the unopened first application, it is necessary to open the first application and run it in the foreground; furthermore, it is also necessary to display the running interface of the first application in the first displaying small window assigned by the third triggering instruction in the second region.

In addition, when the first application runs in the foreground, the electronic apparatus may display the running interface of the first application in a first small window corresponding to the first displaying small window, and the first small window is covered by the multi-window management interface transparently, translucently or nontransparently. That is, when responding to the third triggering instruction, the electronic apparatus not only runs the selected first application in the form of the small window (that is the first small window) in the foreground, but also displays the running interface of the first application in the form of the first displaying small window assigned by the third triggering instruction in the second region. And the multi-window management interface may cover over the first small window transparently, translucently or nontransparently.

In an embodiment of the present invention, after the displaying the running interface of the first application in the first displaying small window assigned by the third triggering instruction, the method may further includes:

obtaining a fourth operation and generating a fourth triggering instruction which indicates to clean the first application displayed in the first displaying small window; and in response to the fourth triggering instruction, switching the first application to run in the background or stopping the first application, and cleaning both the running interface of the first application in the first displaying small window and the first small window corresponding to the first displaying small window.

The fourth operation may be that the user clicks the first displaying small window and drags outside the multi-window management interface. In the embodiments of the present invention, the specific content of the fourth operation is not limited, and any fourth operation which is capable of triggering to generate the fourth triggering instruction should be in the scope of the embodiments of the present invention.

When responding to the fourth triggering instruction, the electronic apparatus not only close the running first application in the foreground (may be switched to run in the background or stopped), but also clean the first small window when the first application runs in the foreground and the running interface of the first application in the first displaying small window in the multi-window management interface.

In an embodiment of the present invention, after the displaying the running interface of the first application in the first displaying small window assigned by the third triggering instruction, the method may further includes:

obtaining a fifth operation and generating a fifth triggering instruction which indicates to switch the application running in the foreground from the first application to a second application; and in response to the fifth triggering instruction, switching the first application to run in the background and switching the second application to run in the foreground, and displaying the running interface of the second application in a first displaying small window, assigned by the fifth triggering instruction, in the second region of the multi-window management interface; the first displaying small window assigned by the fifth triggering instruction is the same as the first displaying small window assigned by the third triggering instruction, and the running interface of the second application displayed in the first displaying small window is used for replacing the running interface of the first application.

The fifth operation may be that the user selects the application identifier of the second application from the first region and drags the selected application identifier into the first displaying small window, in which the running interface of the first application is being displayed, in the second region. In the embodiments of the present invention, the specific content of the fifth operation is not limited, and any fifth operation which is capable of triggering to generate the fifth trigging instruction in the practical application should be in the scope of the embodiments of the present invention.

When responding to the fifth trigger instruction, the electronic apparatus needs to switch the first application to run in the background or stop the first application, judge whether the second application runs in the foreground; if the second application runs in the foreground, the electronic apparatus keeps the second application running in the foreground; if the second application is not running in the foreground, the second application may run in the background or may be unopened; then, for the second application running in the background, it is necessary to switch the running status into foreground running, and for the unopened second application, it is necessary to open the second application and run it in the foreground. Furthermore, it is also necessary to replace the running interface of the first application displayed in the first displaying small window with the running interface of the second application.

Moreover, when the second application is switched to run in the foreground, the running interface of the second application is further displayed in the form of the first small window covered by the multi-window management interface. The first small window corresponds to the first displaying small window, and the running interface of the second application displayed in the first small window is used for replacing the running interface of the first application. That is, the running interface of the second application instead of the running interface of the first application is displayed in the first small window.

In an embodiment of the present invention, there are at least two first displaying small windows in the second region, and the first small window is in one-to-one correspondence with the first displaying small window when different first displaying small windows are respectively used to display running interfaces of different applications, the method further includes:

obtaining a sixth operation and generating a sixth triggering instruction which indicates to exchange the running interfaces of the corresponding applications displayed in the two first displaying small windows; and in response to the sixth triggering instruction, replacing the running interfaces of the corresponding applications displayed in the two first displaying small windows assigned by the sixth triggering instruction with each other and also replacing the running interfaces of the corresponding applications displayed in the two first small windows respectively corresponding to the two first displaying small windows with each other.

The sixth operation may be that the user clicks one of the first displaying small windows and drags it into another displaying small window. In the embodiments of the present invention, the specific content of the fifth operation is not limited, and any sixth operation which is capable of triggering to generate the sixth triggering instruction should be in the scope of the embodiments of the present invention.

It should be noted that, in the above embodiments, both the first displaying small window and the first small window in which the running interface of the corresponding application is displayed are obtained by changing the full screen window of the corresponding application with the first transforming parameter. The specific implement refers to the method introduced before the first embodiment of the present invention, and will not be described hereinafter. The first transforming parameter includes at least one of a transforming matrix, a parameter value, a parameter group and a parameter set.

The information processing method according to the embodiments of the present invention is further described in detail by the following examples.

Eighth Embodiment

Referring to FIG. 7, when a user clicks a function button of "icon" on the system operation interface of an electronic apparatus, the electronic device obtains a second operation and generates a second triggering instruction which indicates to initiate a multi-window management interface of the electronic apparatus for managing an application of the electronic apparatus. In response to the second triggering instruction, the electronic apparatus initiates the multi-window management interface (that is the Multi-window interface illustrated in FIG. 7) which suspends over the system operation interface. The electronic apparatus also acquires an application identifier corresponding to the application thereof (the application may be all of the applications, the application running in the foreground or the application running in the background, and it may be set as needed), and displays the acquired application identifier in a first region of the multi-window management interface. As shown in FIG. 7, the acquired application identifier includes application identifiers of App1, App2, App3 and App4, which are respectively displayed within different first sub-regions of the first region 001. Moreover, the multi-window management interface further includes a second region 002 in which at least one first displaying small window is included. The first displaying small window is used for displaying the running interface of the application running in the foreground and opened in a small window.

Ninth Embodiment

Figure 8:
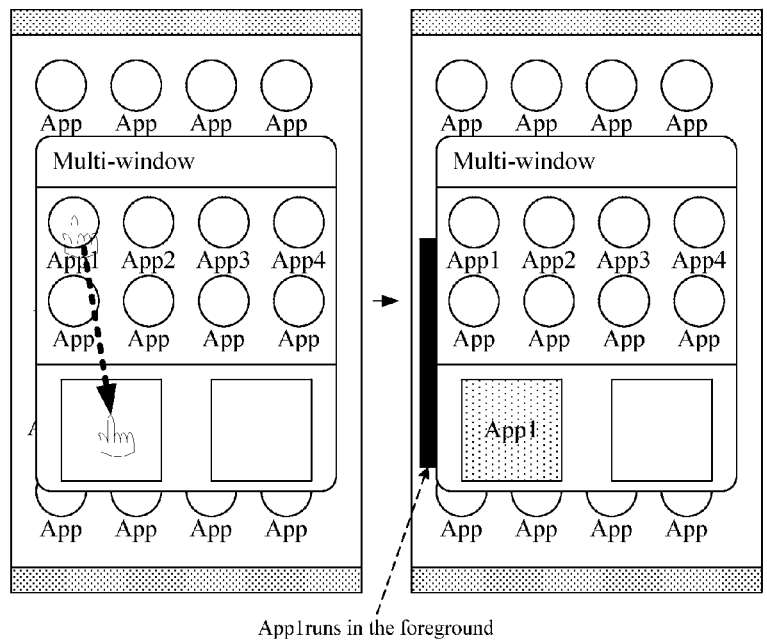
FIG. 8 is a schematic diagram of an interface display effect according to a ninth embodiment of the present invention.

As shown in FIG. 8, after the electronic apparatus initiates the multi-window management interface and displays the application identifier, when the user clicks the application identifier of App1 in the first region and drags the application identifier into the first displaying small window in the second region, the electronic apparatus immediately obtains a third operation and generates a third triggering instruction which indicates that App1 is selected to run in the foreground. In response to the third triggering instruction, the electronic apparatus judges whether the selected App1 runs in the foreground, if App1 runs in the foreground, the electronic apparatus keeps App1 running in the foreground and displays the running interface of App1 in the first displaying small window, assigned by the third triggering instruction, in the second region of the multi-window management interface; if App1 does not run in the foreground, the electronic apparatus runs App1 in the foreground and displays the running interface of App1 in the first displaying small window, assigned by the third triggering instruction, in the second region of the multi-window management interface. In addition, the electronic apparatus runs App1 in a foreground small window manner, that is, displays the running interface of App1 in a first small window corresponding to the first displaying small window, and the first small window is covered by the multi-window management interface transparently, translucently or nontransparently. As shown in FIG. 8, a black box covered by the multi-window management interface represents the first small window in which the running interface of App1 is displayed.

Tenth Embodiment

Figure 9:
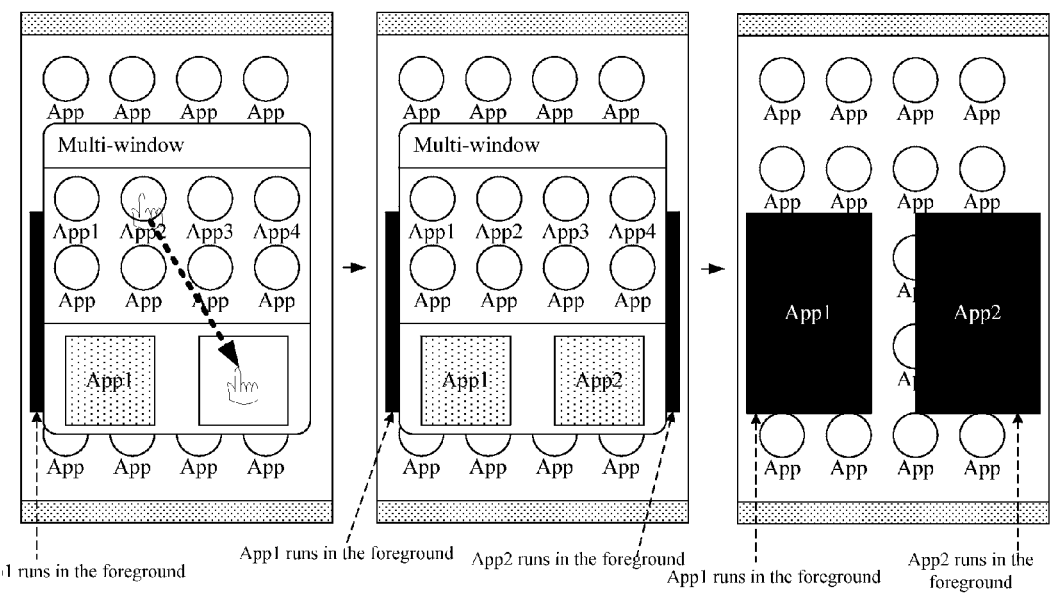
FIG. 9 is a schematic diagram of an interface display effect according to a tenth embodiment of the present invention.

As shown in FIG. 9, on the basis of the scenario illustrated in FIG. 8, when the user clicks the application identifier of App2 in the first region and drags the application identifier into a null first displaying small window in the second region, the electronic apparatus immediately obtains the third operation and generates the third triggering instruction which indicates that App2 is selected to run in the foreground. In response to the third triggering instruction, the electronic apparatus judges whether the selected App2 runs in the foreground, if App2 runs in the foreground, the electronic apparatus keeps App2 running in the foreground and displays the running interface of App2 in the first displaying small window, assigned by the third triggering instruction, in the second region of the multi-window management interface; if App2 does not run in the foreground, the electronic apparatus runs App2 in the foreground and displays the running interface of App2 in the first displaying small window, assigned by the third triggering instruction, in the second region of the multi-window management interface. In addition, the electronic apparatus runs App2 in a foreground small window manner, that is, displays the running interface of App2 in a first small window corresponding to the first displaying small window in which the running interface of App2 is displayed. And the first small window is covered by the multi-window management interface transparently, translucently or nontransparently. As shown in FIG. 4, a black box covered by the multi-window management interface represents the first small window in which the running interface of App2 is displayed.

After the above operations, the electronic apparatus runs App1 and App2 simultaneously in a small window manner in the foreground. In the second region of the multi-window management interface, there are corresponding first displaying small windows for respectively displaying the running interfaces of App1 and App2. For a convenient description, the first displaying small window displaying the running interface of App1 is marked as A and the first displaying small window displaying the running interface of App2 is marked as B. In addition, the running interfaces of App1 and App2 running in the foreground in a small window manner are displayed in the form of the corresponding first small windows respectively. For a convenient description, the first small window displaying the running interface of App1 is marked as a and the first small window displaying the running interface of App2 is marked as b. Specifically, small window a corresponds to displaying small window A and small window b corresponds to displaying small window B. that is, the running interface of the application displayed in small window a is the same as the running interface of the application displayed in displaying small window A, and the running interface of the application displayed in small window b is the same as the running interface of the application displayed in displaying small window B. Small windows a and b are shown as the black boxes in FIG. 9.

After the above processing, the user closes the multi-window management interface and the display effect on the screen is shown as the last interface schematic diagram in FIG. 9: small windows a and b suspend on the top, the running interface of App1 is displayed in small window a and the running interface of App2 is displayed in small window b. The user may also perform, on small windows a and b, corresponding operations on the running App1 and App2 respectively.

Eleventh Embodiment

Figure 10:
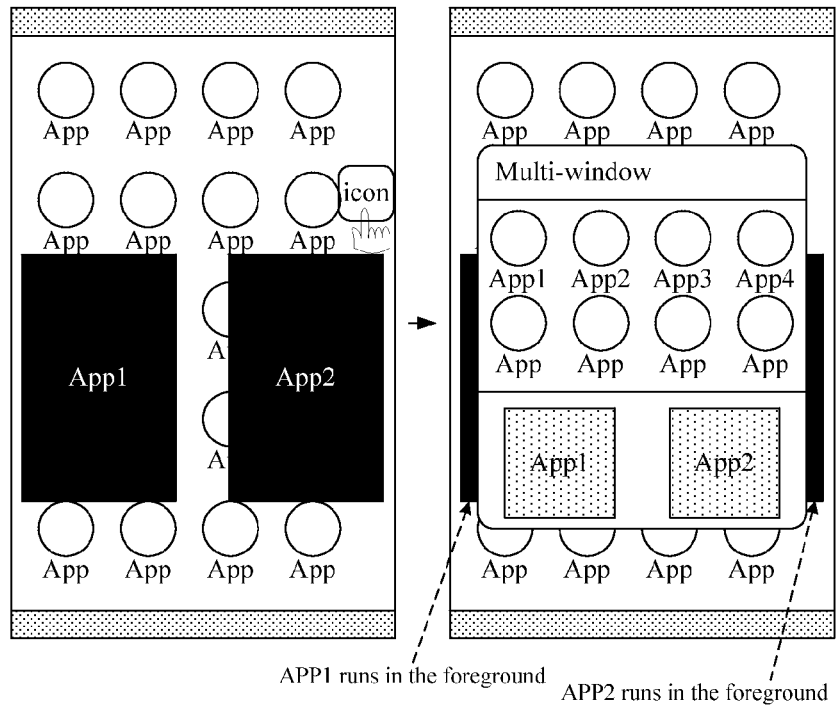
FIG. 10 is a schematic diagram of an interface display effect according to an eleventh embodiment of the present invention.

As shown in FIG. 10, on the basis of the scenario shown in FIG. 9, the user clicks the function button of "icon" on the system operation interface of the electronic apparatus (displayed through the touch-control display unit) again. The electronic apparatus obtains the second operation and generates the second triggering instruction which indicates to initiate the multi-window management interface of the electronic apparatus. In response to the second triggering instruction, the electronic apparatus initiates the multi-window management interface (that is the Multi-window interface illustrated in FIG. 7) which suspends over the system operation interface. The electronic apparatus also acquires the application identifier corresponding to the application thereof (the application may be all of the applications, the application running in the foreground or the application running in the background, and it may be set as needed), and displays the acquired application identifier in the first region of the multi-window management interface. As shown in FIG. 10, the acquired application identifier includes application identifiers of App1, App2, App3 and App4, which are respectively displayed in different first sub-regions of the first region 001. Moreover, in the second region of the multi-window management interface, the running interface of the application running in the foreground and opened in a small window is displayed. In the embodiment, App1 and App2 are applications running in the foreground and opened in a small window manner. In the second region, the running interface of App1 is displayed in displaying small window A and the running interface of App2 is displayed in displaying small window B.

Twelfth Embodiment

Figure 11:
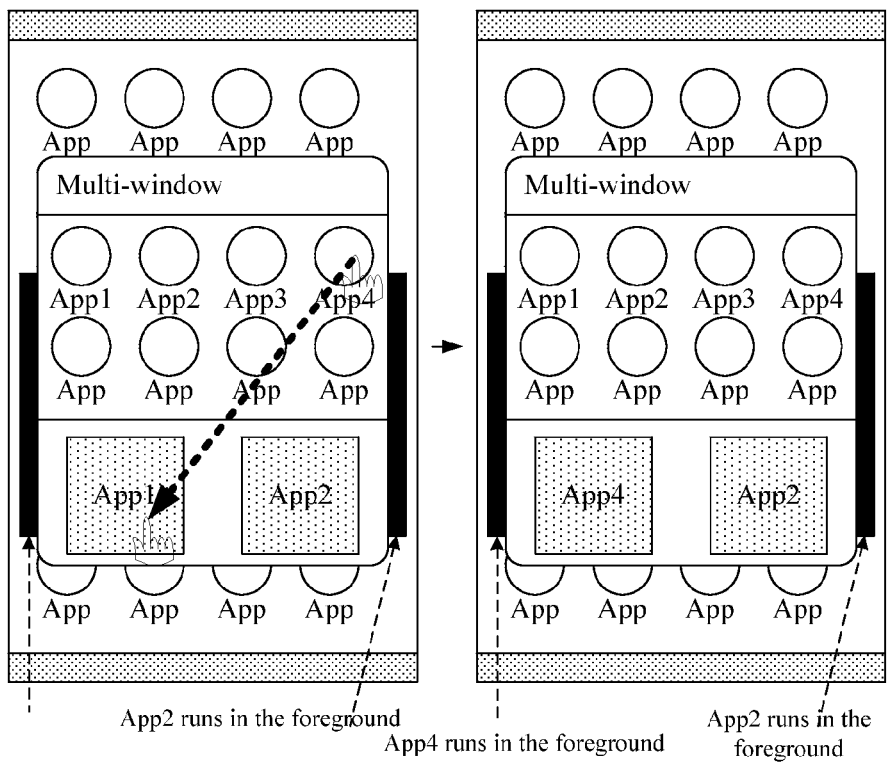
FIG. 11 is a schematic diagram of an interface display effect according to a twelfth embodiment of the present invention.

As shown in FIG. 11, on the basis of the scenario shown in FIG. 10, the user selects the application identifier of App4 from the first region and drags it into first displaying small window A, in which the running interface of App1 is being displayed, in the second region. The electronic apparatus immediately obtains a fifth operation and generates a fifth triggering instruction which indicates to switch the application running in the foreground from App1 to App4. In response to the fifth triggering instruction, the electronic apparatus switches App1 to run in the background and App4 to run in the foreground, and the running interface of App4 is displayed in displaying small window A in the second region of the multi-window management interface. That is, the running interface of App4 instead of the running interface of App1 is displayed in displaying small window A. Moreover, the running interface of App4 instead of the running interface of App1 is also displayed in small window a which corresponds to displaying small window A, and the display effect is shown as the last interface schematic diagram in FIG. 11.

Thirteenth Embodiment

Figure 12:
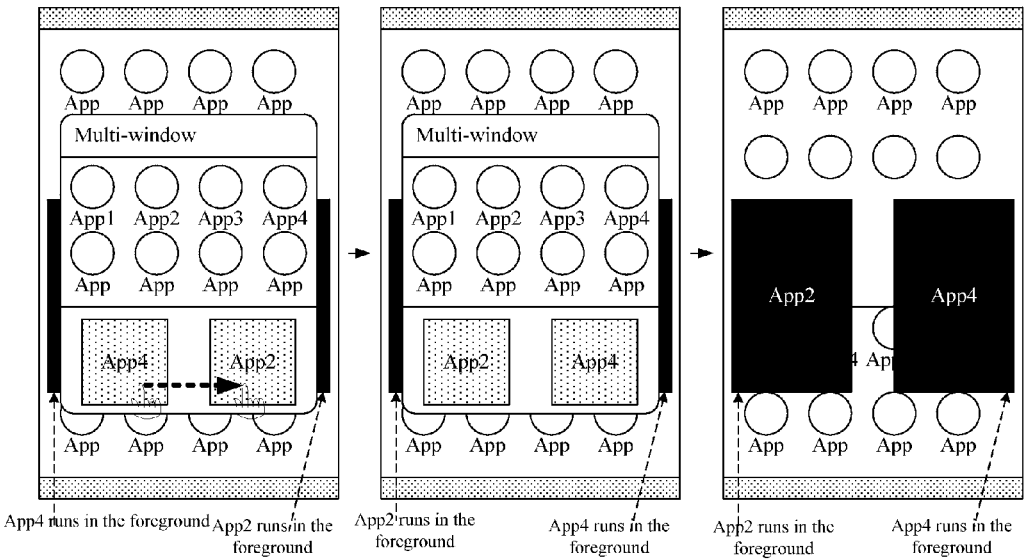
FIG. 12 is a schematic diagram of an interface display effect according to a thirteenth embodiment of the present invention.

As shown in FIG. 12, on the basis of the scenario shown in FIG. 11, the user clicks the displaying small window A and drags it to displaying small window B. The electronic apparatus immediately obtains the sixth operation and generates the sixth triggering instruction which indicates to exchange the running interfaces of the corresponding applications displayed in displaying small windows A and B. In response to the sixth triggering instruction, the electronic apparatus replaces, in displaying small window A, the running interface of App4 with the running interface of App2, and replacing, in displaying small window B, the running interface of App2 with the running interface of App4. Similarly, in small window a, the running interface of App4 may be also replaced with the running interface of App2, and in small window b, the running interface of App2 may be also replaced with the running interface of App4. The display effect after the multi-window management interface is closed is shown as the last interface schematic diagram in FIG. 12.

Fourteenth Embodiment

Figure 13:
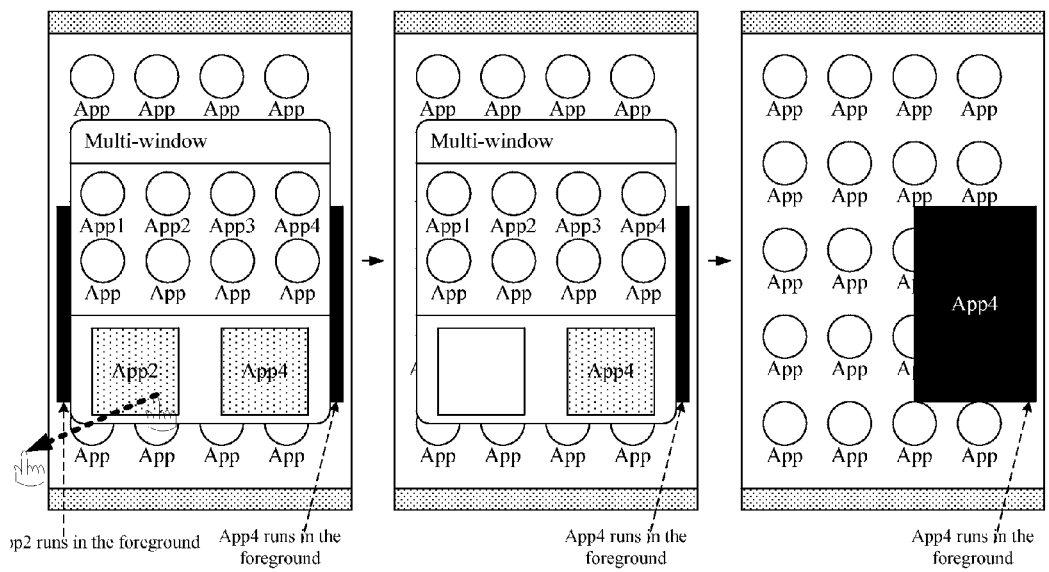
FIG. 13 is a schematic diagram of an interface display effect according to a fourteenth embodiment of the present invention.

As shown in FIG. 13, on the basis of the scenario shown in FIG. 12, the user clicks displaying small window A and drags it outside the multi-window management interface, then the electronic apparatus immediately obtains a fourth operation and generate a fourth triggering instruction which indicates to clean application App2 displayed in displaying small window A. In response to the fourth triggering instruction, the electronic apparatus switches App2 to run in the background or stopping App2, cleans both the running interface of App2 in displaying small window A and small window a corresponding to displaying small window A. the display effect after the multi-window management interface is closed is shown as the last interface schematic diagram in FIG. 13, that is, only App4 is left running in the foreground in a small window manner.

Fifteenth Embodiment

Figure 14:
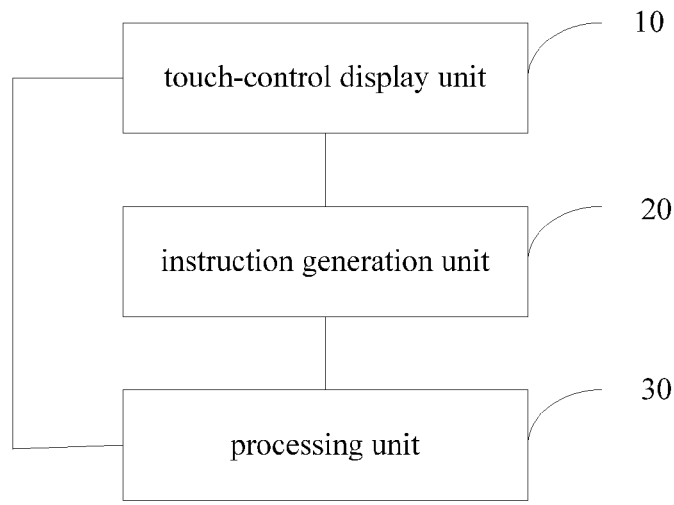
FIG. 14 is a schematic diagram of an electronic apparatus according to a fifteenth embodiment of the present invention.

Corresponding to the above method for processing information, according to the embodiment of the present invention, it is further provided an electronic apparatus. As shown in FIG. 14, the electronic apparatus includes a touch-control unit 10 on which M application identifiers in one-to-one correspondence with M applications are displayed, with M is being positive integer, and a corresponding application is initiated when the application identifier is touch-controlled; the application may be displayed in a form of a full screen window or a small window on the touch-control display unit 10, the display region of the small window is smaller than the display region of the full screen window and the small window is transformed from the full screen window by using a first transforming parameter.

The electronic apparatus further includes: an instruction generation unit 20 which is configured to obtain a second operation and generate a second triggering instruction which indicates to initiate a multi-window management interface of the electronic apparatus for managing applications of the electronic apparatus; and a processing unit 30, configured to, in response to the second triggering instruction, initiate the multi-window management interface, acquire the application identifier corresponding to the application of the electronic apparatus, and display the acquired application identifier in a first region of the multi-window management interface, where the first region includes N first sub-regions, with N being a positive integer, and each of the first sub-regions is used to display one corresponding application identifier;

the multi-window management interface further includes a second region, in which at least one first displaying small window is included, the first displaying small window is used to display the running interface of an application running in a foreground and opened in the form of the small window.

In an embodiment, the instruction generation unit 20 is further configured to, after the processing unit 30 initiates the multi-window management interface and displays the application identifier, obtain a third operation and generate a third triggering instruction which indicates to select a first application from applications corresponding to the application identifiers displayed in the first region to run in the foreground; and the processing unit 30 is further configured to, in response to the third triggering instruction, judge whether the selected first application runs in the foreground; if the selected first application runs in the foreground, continuously run the first application in the foreground and display the running interface of the first application in a first displaying small window, assigned by the third triggering instruction, in the second region of the multi-window management interface; if the selected first application does not run in the foreground, run the first application in the foreground and display the running interface of the first application in the first displaying small window, assigned by the third triggering instruction, in the second region of the multi-window management interface.

In an embodiment, the processing unit 30 is further configured to, when the first application runs in the foreground, display the running interface of the first application in the form of a first small window corresponding to the first displaying small window, where the first small window is covered by the multi-window management interface transparently, translucently or a nontransparently.

In an embodiment, the instruction generation unit 20 is further configured to, after the running interface of the first application is displayed in the first displaying small window assigned by the third triggering instruction, obtain a fourth operation and generate a fourth triggering instruction which indicates to clean the first application displayed in the first displaying small window; and the processing unit 30 is further configured to, in response to the fourth triggering instruction, switch the first application to run in a background or stop the first application, and clean both the running interface of the first application in the first displaying small window and the first small window corresponding to the first displaying small window.

In an embodiment, the instruction generation unit 20 is configured to, after the running interface of the first application is displayed in the first displaying small window assigned by the third triggering instruction, obtain a fifth operation and generate a fifth triggering instruction which indicates to switch the application running in the foreground from the first application to a second application; and the processing unit 30 is further configured to, in response to the fifth triggering instruction, switch the first application to run in a background and the second application to run in the foreground, and display the running interface of the second application in a first displaying small window, assigned by the fifth triggering instruction, in the second region of the multi-window management interface, where the first displaying small window assigned by the fifth triggering instruction is the same as the first displaying small window assigned by the third triggering instruction, and the running interface of the second application displayed in the first displaying small window is used for replacing the running interface of the first application.

In an embodiment, the processing unit 30 is further configured to, when the second application is switched to run in the foreground, display the running interface of the second application in the form of the first small window which is covered by the multi-window management interface, where the first small window corresponds to the first displaying small window and the running interface of the second application displayed in the first small window is used for replacing the running interface of the first application.

In an embodiment, there are at least two first displaying small windows in the second region, and the first small window corresponds to the first displaying small window in one-to-one correspondence;

the instruction generation unit 20 is further configured to, when the different first displaying small windows are respectively used to display running interfaces of different applications, obtain a sixth operation and generate a sixth triggering instruction which indicates to exchange the running interfaces of the corresponding applications displayed in the two first displaying small windows; and the processing unit 30 is further configured to, in response to the sixth triggering instruction, replace the running interfaces of the corresponding applications displayed in the two first displaying small windows assigned by the sixth triggering instruction with each other, and replace the running interfaces of the corresponding applications displayed in the two first small windows respectively corresponding to the two first displaying small windows with each other.

It should be noted that, the running interfaces of the corresponding applications displayed in both the first displaying small window and the first small window is obtained by transforming, by the processing unit 30, the full screen windows of the corresponding applications by using the first transforming parameter, which is not described hereinafter. The first transforming parameter includes at least one of a transforming matrix, a parameter value, a parameter group and a parameter set.

In a practical implementation, the touch-control display unit 10 may be realized by the a touch-control display screen of the electronic apparatus, and the instruction generation unit 20 and the processing unit 30 may be realized by a CPU (Central Processing Unit), a MPU (Micro Processing Unit) or a DSP (Digital Signal Processor) of the electronic apparatus.

In summary, in the method for processing information and the electronic apparatus provided in the embodiments of the present invention, a more vivid management for multiple windows is implemented in the electronic apparatus in which an application is displayed in multiple windows. And a more vivid management for the application and more interactive operations are also implemented, so as to not only facilitate the management for the applications in the electronic apparatus, but also improve the user experience. The management for the application in the electronic apparatus at least includes: acquiring rapidly, from the multi-window management interface, the running interface of an application running in the foreground and an application identifier of an application; by operating on the multi-window management interface, switching the foreground application and the background application rapidly, and initiating and closing the applications quickly; and calling a small window of the application running in the foreground and operating on the small window quickly.

Sixteenth Embodiment

Figure 15:
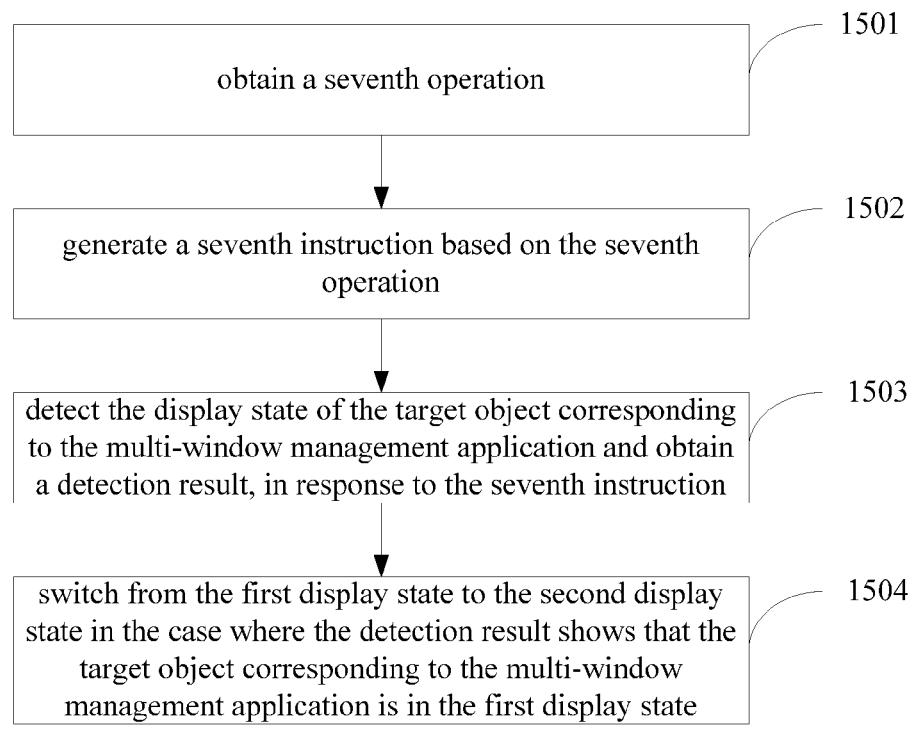
FIG. 15 is a schematic diagram of an electronic apparatus according to a sixteenth embodiment of the present invention.

FIG. 15 is a schematic flowchart of a method for processing information according to the sixteenth embodiment of the invention. The method for processing information according to the embodiment of the invention is applied in an electronic apparatus with a touch-control display unit. The electronic apparatus is capable of running a multi-window management application and N first applications, displays a target object corresponding to the multi-window management application on the touch-control display unit. A multi-window management interface is presented when the target object is touch controlled, and there are target objects corresponding to N first applications in the multi-window management interface, with N being a positive integer. The first application is initiated by using the target object corresponding to the first application, and the initiated first application is displayed in a form of a small window on the touch-control display unit. The display region of the small window is smaller than the display region of the full-screen window of the first application, and the small window is transformed from the full-screen window by using a first parameter. In a preferred embodiment of the invention, the method for processing information includes step 1501 to step 1504.

Step 1501 is to obtain a seventh operation.

In this embodiment, the first application running on the electronic apparatus may be an application self-contained in the electronic apparatus system, such as a clock application, a camera application, alternatively, may also be a third party application installed by the user, such as a WeChat application, a game application.

Generally, all of the first applications are displayed on the desktop of the electronic apparatus in the form of an icon-list, and a first application corresponds to an icon. The corresponding first application may be initiated by touch controlling the icon. The first application may be displayed on the display screen of the electronic apparatus in the form of the full-screen window when the first application is initiated by the above-mentioned way.

In the embodiments of the invention, the first application supports small window display, the first application may be displayed on the touch-control display unit of the electronic apparatus in the form of the small window when the first application is initiated by the following way, but not limited to herein.

The way of initiating the first application may be: adding in advance the first application into the multi-window management interface so that the first application supports the small window display; the multi-window management interface being displayed by initiating the icon corresponding to the multi-window management application; the first application being displayed on the touch-control display unit of the electronic apparatus in the form of the small window when the first application is initiated by the multi-window management interface.

Hence, the icon needs to be displayed on the touch-control display unit in the case where the multi-window management application is initiated by the icon corresponding to the multi-window management application. The icon is hidden in the case where the user does not use the multi-window management application. To this end, the displaying or hiding the icon corresponding to the multi-window management application may be achieved by triggering the first operation. Thus, the electronic apparatus obtains the first operation and performs Step 1502.

In the above-mentioned solution, the first parameter is at least one of a parameter, a matrix, a parameter group and a parameter set.

For example, the first parameter may be achieved by a first matrix. The full-screen of the first application is transformed by using the first matrix, which may be achieved by a formula (1).

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \qquad (1)$$

where, $$\begin{pmatrix} x_2 \\ y_2 \\ z_2 \end{pmatrix}$$

represents the coordinate vector of a small window, $x_2$ is the horizontal coordinate of the small window, $y_2$ is the vertical coordinate of the small window and $z_2$ is generally set to 1 by default;

$$M = \begin{pmatrix} M_{11} & M_{12} & M_{13} \\ M_{21} & M_{22} & M_{23} \\ M_{31} & M_{32} & M_{33} \end{pmatrix},$$

M represents the first matrix which is a matrix of 3×3, $M_{ij}$ represents the element of the first matrix at row i and column j, where the value of i is 1, 2, 3 and the value of j is 1, 2, 3;

$$\begin{pmatrix} x_1 \\ y_1 \\ z_1 \end{pmatrix}$$

represents the coordinate vector of the full-screen window, $x_1$ is the horizontal coordinate of the full-screen window, $y_1$ is the vertical coordinate of the full-screen window and $z_1$ is generally set to 1 by default.

When performing a scaling transforming on the full screen window by formula (1a), four elements of $M_{ij}$ may be set as follows: $M_{11}=\alpha$, $M_{12}=0$, $M_{21}=0$, $M_{22}=\beta$, and other five elements may be set arbitrarily. Thus, a formula (2a) may be obtained by substituting the set above-mentioned parameters to the formula (1).

$$x_2 = \alpha \times x_1$$

$$y_2 = \beta \times y_1 \qquad (2)$$

where, $\alpha$ is a horizontal coordinate scaling parameter, $\beta$ is a vertical coordinate scaling parameter.

In the case where the full-screen is transformed in rotate by formula (1a), four elements of M may be set as follows: $M_{11}=\cos\theta$, $M_{12}=\sin\theta$, $M_{21}=-\sin\theta$, $M_{22}=\cos\theta$, and other five elements may be set arbitrarily. Thus, a formula (3) may be obtained by substituting the set above-mentioned parameters to formula (1).

$$x_2 = \cos\theta \times x_1 + \sin\theta \times y_1$$

$$y_2 = -\sin\theta \times x_1 + \cos\theta \times y_1 \qquad (3)$$

where, $\theta$ is a rotation angle.

The full-screen of the first application is transformed in translation by using the first matrix, which may be achieved by formula (4).

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \qquad (4)$$

In the case where a translation transformation on the full-screen is performed by the formula (4), three elements of $M_{ij}$ may be set as follows: $M_{11}=a$, $M_{21}=b$, $M_{31}=0$. Thus, formula (5) may be obtained by substituting the set above-mentioned parameters to formula (4).

$$x_2 = a + x_1$$

$$y_2 = b + y_1 \qquad (5)$$

where, a is a horizontal coordinate translation parameter, b is a vertical coordinate translation parameter.

Step 1502 is to generate a seventh instruction based on the seventh operation.

Herein, the seventh instruction is generated according to the seventh operation; the seventh instruction is used for detecting a display state of the target object corresponding to the multi-window management application.

Step 1503 is to detect the display state of the target object corresponding to the multi-window management application and obtain a detection result, in response to the seventh instruction.

Herein, the display state of the target object corresponding to the multi-window management application may be a first display state, or a second display state. The two display states may indicate that the target object corresponding to the multi-window management application is in a displayed state and a hidden state, respectively. For example, the first display state may indicate that the target object is in the displayed state or the hidden state; alternatively, the second display state may indicate that the target object is in the hidden state or the displayed state.

In the above-mentioned solution, the displayed state means that the target object, i.e., the application icon, is displayed on the touch-control display unit; the hidden state means that the target object is not displayed on the touch-control display unit.

Step 1504 is to switch from the first display state to the second display state in the case where the detection result shows that the target object corresponding to the multi-window management application is in the first display state.

In this embodiment, assumed that the first display state is the displayed state, the target object is in the hidden state after the first display state is switched to the second display state; assumed that the first display state is the hidden state, the target object is in the displayed state after the first display state is switched to the second display state. Thus, it is achieved to hide and initiate conveniently the application icon corresponding to the multi-window management application, thereby the user experience is improved.

Seventeenth Embodiment

Figure 16:
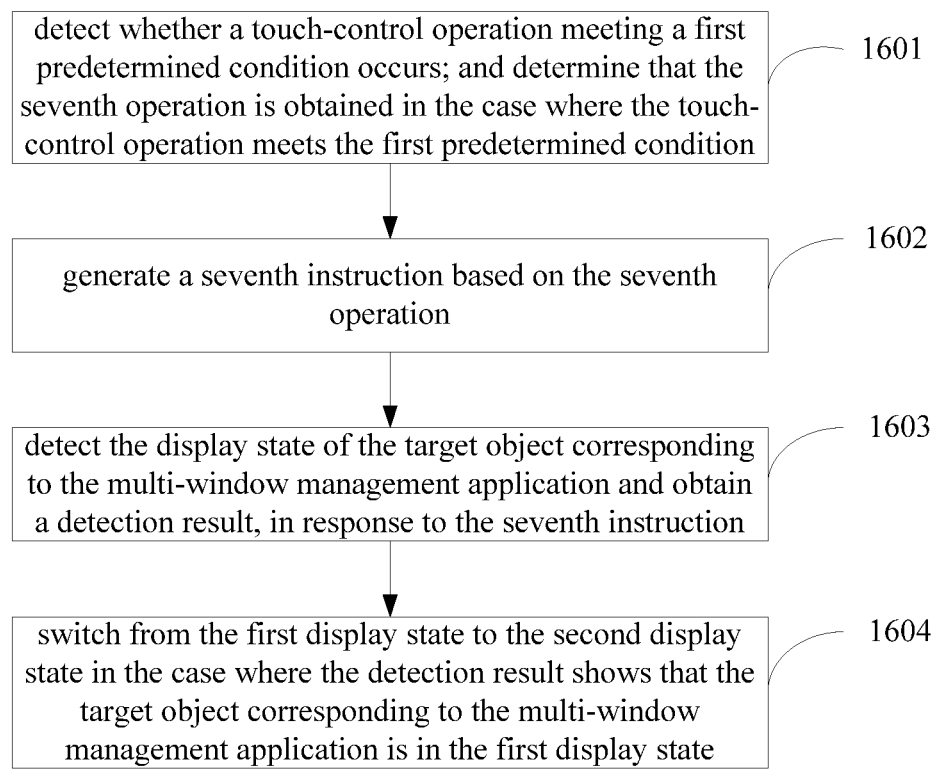
FIG. 16 is a schematic flowchart of a method for processing information according to a seventeenth embodiment of the present invention.

FIG. 16 is a schematic flowchart of a method for processing information according to a seventeenth embodiment of the invention. The method for processing information according to the embodiment of the invention is applied in an electronic apparatus with a touch-control display unit. The electronic apparatus is capable of running a multi-window management application and N first applications, displays a target object corresponding to the multi-window management application on the touch-control display unit. A multi-window management interface is presented when the target object is touch controlled, and there are target objects corresponding to N first applications in the multi-window management interface, with N being a positive integer. The first application is initiated by using the target object corresponding to the first application, and the initiated first application is displayed in a form of a small window on the touch-control display unit. The display region of the small window is smaller than the display region of the full-screen window of the first application, and the small window is transformed from the full-screen window by using a first parameter. In a preferred embodiment of the invention, the information processing method includes step 1601 to step 1604.

Step 1601 is to detect whether a touch-control operation meeting a first predetermined condition occurs; and determine that the seventh operation is obtained in the case where the touch-control operation meets the first predetermined condition.

Herein, the touch-control operation meeting the first predetermined condition may be achieved in the following forms, but not limited to herein:

whether the touch-control operation is a single click touch-control operation;

whether the touch-control operation is a double click touch-control operation;

whether the touch-control operation is a three fingers touch-control operation; or, whether the touch-control operation is a five fingers touch-control operation.

In specific implementation, the user may touch at a time any region of the touch-control display unit in the electronic apparatus to trigger the seventh operation; touch at double times any region of the touch-control display unit of the electronic apparatus in a predetermined period of time to trigger the seventh operation; touch by three fingers the touch-control display unit in the electronic apparatus to trigger the seventh operation; or, touch by five fingers the touch-control display unit in the electronic apparatus to trigger the seventh operation.

In this embodiment, the first application running on the electronic apparatus may be an application self-contained in the electronic apparatus system, such as a clock application, a camera application, alternatively, may also be a third party application provided by the user, such as a WeChat application, a game application.

Generally, all of the first applications are displayed on the desktop of the electronic apparatus in the form of an icon-list, and a first application corresponds to an icon. The corresponding first application may be initiated by touch controlling the icon. The first application may be displayed on the display screen of the electronic apparatus in the form of the full-screen window when the first application is initiated by the above-mentioned way.

In the embodiments of the invention, the first application supports small window display, the first application may be displayed on the touch-control display unit of the electronic apparatus in the form of the small window when the first application is initiated by the following way, but not limited to herein.

The way of initiating the first application may be: adding in advance the first application into the multi-window management interface so that the first application supports the small window display; the multi-window management interface being displayed by initiating the icon corresponding to the multi-window management application; the first application being displayed on the touch-control display unit of the electronic apparatus in the form of the small window when the first application is initiated by the multi-window management interface.

Hence, the icon needs to be displayed on the touch-control display unit in the case where the multi-window management application is initiated by the icon corresponding to the multi-window management application. The icon is hidden in the case where the user does not use the multi-window management application. To this end, the displaying or hiding the icon corresponding to the multi-window management application may be achieved by triggering the seventh operation. Thus, the electronic apparatus obtains the first operation and performs step 1602.

In the above-mentioned solution, the first parameter is at least one of a parameter, a matrix, a parameter group and a parameter set.

For example, the first parameter may be achieved by a first matrix. The full-screen of the first application is transformed by using the first matrix, which may be achieved by formula (1).

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (1)$$

where, $$\begin{pmatrix} x_2 \\ y_2 \\ z_2 \end{pmatrix}$$

represents the coordinate vector of a small window, $x_2$ is the horizontal coordinate of the small window, $y_2$ is the vertical coordinate of the small window and $z_2$ is generally set to 1 by default;

$$M = \begin{pmatrix} M_{11} & M_{12} & M_{13} \\ M_{21} & M_{22} & M_{23} \\ M_{31} & M_{32} & M_{33} \end{pmatrix},$$

M represents the first matrix which is a matrix of 3×3, $M_{ij}$ represents the element of the first matrix at row i and column j, where the value of i is 1, 2, 3 and the value of j is 1, 2, 3;

$$\begin{pmatrix} x_1 \\ y_1 \\ z_1 \end{pmatrix}$$

represents the coordinate vector of the full-screen window, $x_1$ is the horizontal coordinate of the full-screen window, $y_1$ is the vertical coordinate of the full-screen window and $z_1$ is generally set to 1 by default.

When performing a scaling transforming on the full screen window by formula (1b), four elements of $M_{ij}$ may be set as follows: $M_{11}=\alpha$, $M_{12}=0$, $M_{21}=0$, $M_{22}=\beta$, and other five elements may be set arbitrarily. Thus, a formula (2) may be obtained by substituting the set above-mentioned parameters to formula (1).

$$x_2 = \alpha \times x_1$$

$$y_2 = \beta \times y_1 \quad (2)$$

where, $\alpha$ is a horizontal coordinate scaling parameter, $\beta$ is a vertical coordinate scaling parameter.

In the case where the full-screen is transformed in rotate by formula (1), four elements of $M_{ij}$ may be set as follows: $M_{11}=\cos\theta$, $M_{12}=\sin\theta$, $M_{21}=-\sin\theta$, $M_{22}=\cos\theta$, and other five elements may be set arbitrarily. Thus, a formula (3) may be obtained by substituting the set above-mentioned parameters to formula (1).

$$x_2 = \cos\theta \times x_1 + \sin\theta \times y_1$$

$$y_2 = -\sin\theta \times x_1 + \cos\theta \times y_1 \quad (3)$$

where, $\theta$ is a rotation angle.

The full-screen of the first application is transformed in translation by using the first matrix, which may be achieved by formula (4).

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (4)$$

In the case where a translation transforming on the full-screen is performed by formula (4), three elements of $M_{ij}$ may be set as follows: $M_{11}=a$, $M_{21}=b$, $M_{31}=0$. Thus, formula (5) may be obtained by substituting the set above-mentioned parameters to formula (4).

$$x_2 = a + x_1$$

$$y_2 = b + y_1 \quad (5)$$

where, a is a horizontal coordinate translation parameter, b is a vertical coordinate translation parameter.

Step 1602 is to generate a seventh instruction based on the seventh operation.

Herein, the seventh instruction is generated according to the seventh operation; the seventh instruction is used for detecting a display state of the target object corresponding to the multi-window management application.

Step 1603 is to detect the display state of the target object corresponding to the multi-window management application and obtain a detection result, in response to the seventh instruction.

Herein, the display state of the target object corresponding to the multi-window management application may be a first display state, or a second display state. The two display states may indicate that the target object corresponding to the multi-window management application is in a displayed state and a hidden state, respectively. For example, the first display state may indicate that the target object is in the displayed state or the hidden state; alternatively, the second display state may indicate that the target object is in the hidden state or the displayed state.

In the above-mentioned solution, the displayed state means that the target object, i.e., the application icon, is displayed on the touch-control display unit; the hidden state means that the target object is not displayed on the touch-control display unit.

Step 1604 is to switch from the first display state to the second display state in the case where the detection result shows that the target object corresponding to the multi-window management application is in the first display state.

In this embodiment, assumed that the first display state is the displayed state, the target object is in the hidden state after the first display state is switched to the second display state; assumed that the first display state is the hidden state, the target object is in the displayed state after the first display state is switched to the second display state. Thus, it is achieved to hide and initiate conveniently the application icon corresponding to the multi-window management application, thereby the user experience is improved.

Eighteenth Embodiment

Figure 17:
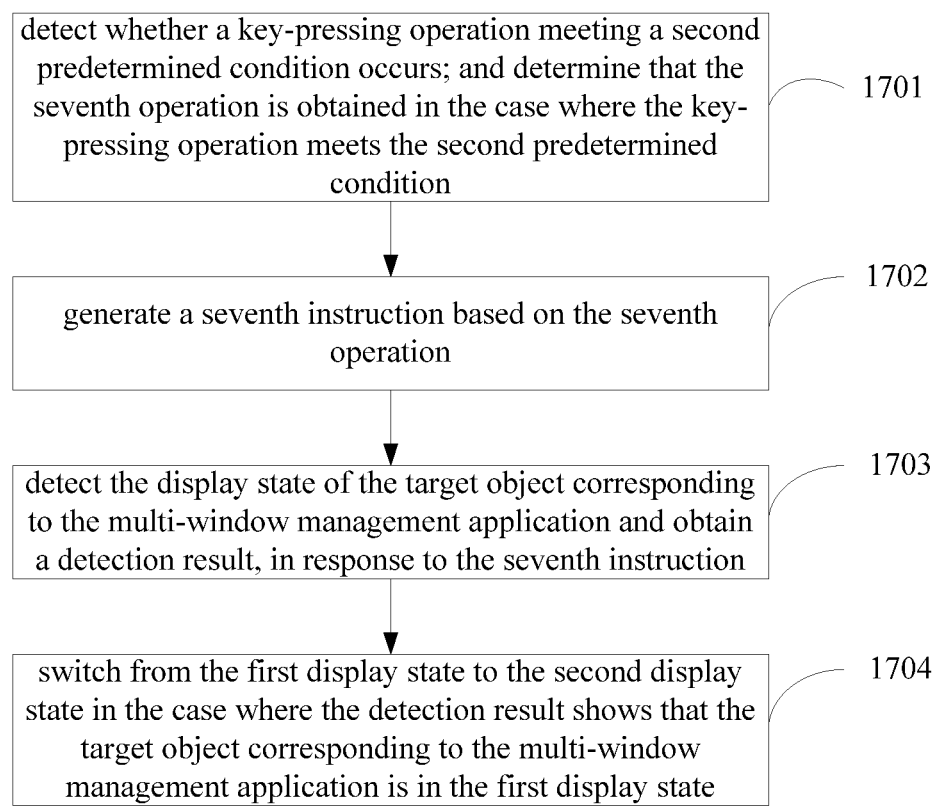
FIG. 17 is a schematic flowchart of a method for processing information according to an eighteenth embodiment of the present invention.

FIG. 17 is a schematic flowchart of a method for processing information according to a eighteenth embodiment of the invention. The method for processing information according to the embodiment of the invention is applied in an electronic apparatus with a touch-control display unit. The electronic apparatus is capable of running a multi-window management application and N first applications, displays a target object corresponding to the multi-window management application on the touch-control display unit. A multi-window management interface is presented when the target object is touch controlled, and there are target objects corresponding to N first applications in the multi-window management interface, with N being a positive integer. The first application is initiated by using the target object corresponding to the first application, and the initiated first application is displayed in a form of a small window on the touch-control display unit. The display region of the small window is smaller than the display region of the full-screen window of the first application, and the small window is transformed from the full-screen window by using a first parameter. In a preferred embodiment of the invention, the method for processing information includes step 1701 to step 1704.

Step 1701 is to detect whether a key-pressing operation meeting a second predetermined condition occurs; and determine that the seventh operation is obtained in the case where the key-pressing operation meets the second predetermined condition.

Herein, the key-pressing operation meeting the second predetermined condition may be achieved in the following forms, but not limited to herein.

Whether the key-pressing operation is pressing a certain key for a long time, for example, pressing the function key HOME for more than 2 seconds; or, whether the key-pressing operation is pressing a combination of some keys, for example, the combination of the function keys HOME and BACK.

In specific implementation, the user may press a certain key for a long time, for example, press the function key HOME for more than 2 seconds, to trigger the first operation; or, press a combination of some keys, for example, the combination of the function keys HOME and BACK, to trigger the first operation.

In this embodiment, the first application running on the electronic apparatus may be an application self-contained in the electronic apparatus system, such as a clock application, a camera application, alternatively, may also be a third party application provided by the user, such as a WeChat application, a game application.

Generally, all of the first applications are displayed on the desktop of the electronic apparatus in the form of an icon-list, and a first application corresponds to an icon. The corresponding first application may be initiated by touch controlling the icon. The first application may be displayed on the display screen of the electronic apparatus in the form of the full-screen window when the first application is initiated by the above-mentioned way.

In the embodiment of the invention, the first application supports small window display, the first application may be displayed on the touch-control display unit of the electronic apparatus in the form of the small window when the first application is initiated by the following way, but not limited to herein.

The way of initiating the first application may be: adding in advance the first application into the multi-window management interface so that the first application supports the small window display; the multi-window management interface being displayed by initiating the icon corresponding to the multi-window management application; the first application being displayed on the touch-control display unit of the electronic apparatus in the form of the small window when the first application is initiated by the multi-window management interface.

Hence, the icon needs to be displayed on the touch-control display unit in the case where the multi-window management application is initiated by the icon corresponding to the multi-window management application. The icon is hidden in the case where the user does not use the multi-window management application. To this end, the displaying or hiding the icon corresponding to the multi-window management application may be achieved by triggering the seventh operation. Thus, the electronic apparatus obtains the seventh operation and performs step 1702.

In the above-mentioned solution, the first parameter is at least one of a parameter, a matrix, a parameter group and a parameter set.

For example, the first parameter may be achieved by a first matrix. The full-screen of the first application is transformed by using the first matrix, which may be achieved by formula (1).

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (1)$$

where, $$\begin{pmatrix} x_2 \\ y_2 \\ z_2 \end{pmatrix}$$

represents the coordinate vector of a small window, $x_2$ is the horizontal coordinate of the small window, $y_2$ is the vertical coordinate of the small window and $z_2$ is generally set to 1 by default;

$$M = \begin{pmatrix} M_{11} & M_{12} & M_{13} \\ M_{21} & M_{22} & M_{23} \\ M_{31} & M_{32} & M_{33} \end{pmatrix},$$

M represents the first matrix which is a matrix of 3×3, $M_{ij}$ represents the element of the first matrix at row i and column j, where the value of i is 1, 2, 3 and the value of j is 1, 2, 3;

$$\begin{pmatrix} x_1 \\ y_1 \\ z_1 \end{pmatrix}$$

represents the coordinate vector of the full-screen window, $x_1$ is the horizontal coordinate of the full-screen window, $y_1$ is the vertical coordinate of the full-screen window and $z_1$ is generally set to 1 by default.

When performing a scaling transforming on the full screen window by formula (1), four elements of $M_{ij}$ may be set as follows: $M_{11}=\alpha$, $M_{12}=0$, $M_{21}=0$, $M_{22}\leq\beta$, and other five elements may be set arbitrarily. Thus, a formula (2) may be obtained by substituting the set above-mentioned parameters to formula (1).

$$x_2 = \alpha \times x_1$$

$$y_2 = \beta \times y_1 \quad (2)$$

where, $\alpha$ is a horizontal coordinate scaling parameter, $\beta$ is a vertical coordinate scaling parameter.

In the case where the full-screen is transformed in rotate by formula (1), four elements of $M_{ij}$ may be set as follows: $M_{11}=\cos\theta$, $M_{12}=\sin\theta$, $M_{21}=-\sin\theta$, $M_{22}=\cos\theta$, and other five elements may be set arbitrarily. Thus, a formula (3) may be obtained by substituting the set above-mentioned parameters to formula (1).

$$x_2 = \cos\theta \times x_1 + \sin\theta \times y_1$$

$$y_2 = -\sin\theta \times x_1 + \cos\theta \times y_1 \quad (3)$$

where, $\theta$ is a rotation angle.

The full-screen of the first application is transformed in translation by using the first matrix, which may be achieved by formula (4).

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (4)$$

In the case where a translation transforming on the full-screen is performed by formula (4), three elements of $M_{ij}$ may be set as follows: $M_{11}=a$, $M_{21}=b$, $M_{31}=0$. Thus, formula (5) may be obtained by substituting the set above-mentioned parameters to formula (4).

$$x_2 = a + x_1$$

$$y_2 = b + y_1 \quad (5)$$

where, a is a horizontal coordinate translation parameter, b is a vertical coordinate translation parameter.

Step 1702 is to generate a seventh instruction based on the seventh operation.

Herein, the seventh instruction is generated according to the seventh operation; the seventh instruction is used for detecting a display state of the target object corresponding to the multi-window management application.

Step 1703 is to detect the display state of the target object corresponding to the multi-window management application and obtain a detection result, in response to the seventh instruction.

Herein, the display state of the target object corresponding to the multi-window management application may be a first display state, or a second display state. The two display states may indicate that the target object corresponding to the multi-window management application is in a displayed state and a hidden state, respectively. For example, the first display state may indicate that the target object is in the displayed state or the hidden state; alternatively, the second display state may indicate that the target object is in the hidden state or the displayed state.

In the above-mentioned solution, the displayed state means that the target object, i.e., the application icon, is displayed on the touch-control display unit; the hidden state means that the target object is not displayed on the touch-control display unit.

Step 1704 is to switch from the first display state to the second display state in the case where the detection result shows that the target object corresponding to the multi-window management application is in the first display state.

In this embodiment, assumed that the first display state is the displayed state, the target object is in the hidden state after the first display state is switched to the second display state; assumed that the first display state is the hidden state, the target object is in the displayed state after the first display state is switched to the second display state. Thus, it is achieved to hide and initiate conveniently the application icon corresponding to the multi-window management application, thereby the user experience is improved.

Nineteenth Embodiment

Figure 18:
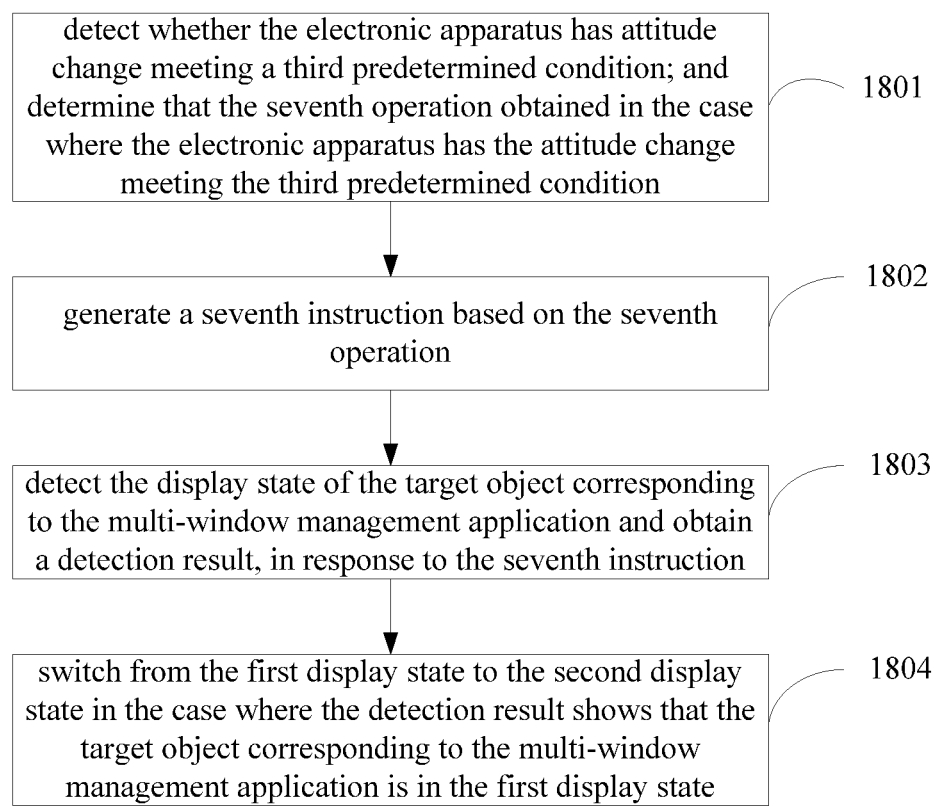
FIG. 18 is a schematic flowchart of a method for processing information according to a nineteenth embodiment of the present invention.

FIG. 18 is a schematic flowchart of a method for processing information according to a nineteenth embodiment of the invention. The method for processing information according to the embodiment of the invention is applied in an electronic apparatus with a touch-control display unit. The electronic apparatus is capable of running a multi-window management application and N first applications, displays a target object corresponding to the multi-window management application on the touch-control display unit. A multi-window management interface is presented when the target object is touch controlled, and there are target objects corresponding to N first applications in the multi-window management interface, with N being a positive integer. The first application is initiated by using the target object corresponding to the first application, and the initiated first application is displayed in a form of a small window on the touch-control display unit. The display region of the small window is smaller than the display region of the full-screen window of the first application, and the small window is transformed from the full-screen window by using a first parameter. In a preferred embodiment of the invention, the method for processing information includes Step 1801 to Step 1804.

Step 1801 is to detect whether the electronic apparatus has attitude change meeting a third predetermined condition; and determine that the seventh operation obtained in the case where the electronic apparatus has the attitude change meeting the third predetermined condition.

Herein, the electronic apparatus having the attitude change meeting the third predetermined condition may be achieved in the following forms, but not limited to herein.

Detecting, by a gravity sensor, whether the electronic apparatus has the attitude change, such as swinging to the left and right; or, detecting, by an acceleration, whether the electronic apparatus has shock.

In specific implementation, the user may shake the electronic apparatus so that the electronic apparatus has the attitude change of swinging to the left and right, to trigger the seventh operation.

In this embodiment, the first application running on the electronic apparatus may be an application self-contained in the electronic apparatus system, such as a clock application, a camera application, alternatively, may also be a third party application provided by the user, such as a WeChat application, a game application.

Generally, all of the first applications are displayed on the desktop of the electronic apparatus in the form of an icon-list, and a first application corresponds to an icon. The corresponding first application may be initiated by touch controlling the icon. The first application may be displayed on the display screen of the electronic apparatus in the form of the full-screen window when the first application is initiated by the above-mentioned way.

In the embodiment of the invention, the first application supports small window display, the first application may be displayed on the touch-control display unit of the electronic apparatus in the form of the small window when the first application is initiated by the following way, but not limited to herein.

The way of initiating the first application may be: adding in advance the first application into the multi-window management interface so that the first application supports the small window display; the multi-window management interface being displayed by initiating the icon corresponding to the multi-window management application; the first application being displayed on the touch-control display unit of the electronic apparatus in the form of the small window when the first application is initiated by the multi-window management interface.

Hence, the icon needs to be displayed on the touch-control display unit in the case where the multi-window management application is initiated by the icon corresponding to the multi-window management application. The icon is hidden in the case where the user does not use the multi-window management application. To this end, the displaying or hiding the icon corresponding to the multi-window management application may be achieved by triggering the seventh operation. Thus, the electronic apparatus obtains the first operation and performs step 1802.

In the above-mentioned solution, the first parameter is at least one of a parameter, a matrix, a parameter group and a parameter set.

For example, the first parameter may be achieved by a first matrix. The full-screen of the first application is transformed by using the first matrix, which may be achieved by formula (1).

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (1)$$

where, $$\begin{pmatrix} x_2 \\ y_2 \\ z_2 \end{pmatrix}$$

represents the coordinate vector of a small window, $x_2$ is the horizontal coordinate of the small window, $y_2$ is the vertical coordinate of the small window and $z_2$ is generally set to 1 by default;

$$M = \begin{pmatrix} M_{11} & M_{12} & M_{13} \\ M_{21} & M_{22} & M_{23} \\ M_{31} & M_{32} & M_{33} \end{pmatrix},$$

M represents the first matrix which is a matrix of 3×3, $M_{ij}$ represents the element of the first matrix at row i and column j, where the value of i is 1, 2, 3 and the value of j is 1, 2, 3;

$$\begin{pmatrix} x_1 \\ y_1 \\ z_1 \end{pmatrix}$$

represents the coordinate vector of the full-screen window, $x_1$ is the horizontal coordinate of the full-screen window, $y_1$ is the vertical coordinate of the full-screen window and $z_1$ is generally set to 1 by default.

When performing a scaling transforming on the full screen window by formula (1), four elements of $M_{ij}$ may be set as follows: $M_{11}=\alpha$, $M_{12}=0$, $M_{21}=0$, $M_{22}=\beta$, and other five elements may be set arbitrarily. Thus, formula (2) may be obtained by substituting the set above-mentioned parameters to formula (1).

$$x_2 = \alpha \times x_1$$

$$y_2 = \beta \times y_1 \quad (2)$$

where, $\alpha$ is a horizontal coordinate scaling parameter, $\beta$ is a vertical coordinate scaling parameter.

In the case where the full-screen is transformed in rotate by formula (1), four elements of $M_{ij}$ may be set as follows: $M_{11}=\cos\theta$, $M_{12}=\sin\theta$, $M_{21}=-\sin\theta$, $M_{22}=\cos\theta$, and other five elements may be set arbitrarily. Thus, a formula (3) may be obtained by substituting the set above-mentioned parameters to formula (1).

$$x_2 = \cos\theta \times x_1 + \sin\theta \times y_1$$

$$y_2 = -\sin\theta \times x_1 + \cos\theta \times y_1 \quad (3)$$

where, $\theta$ is a rotation angle.

The full-screen of the first application is transformed in translation by using the first matrix, which may be achieved by formula (4).

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (4)$$

In the case where a translation transforming on the full-screen is performed by formula (4), three elements of $M_{ij}$ may be set as follows: $M_{11}=a$, $M_{21}=b$, $M_{31}=0$. Thus, formula (5) may be obtained by substituting the set above-mentioned parameters to formula (4).

$$x_2 = a + x_1$$

$$y_2 = b + y_1 \quad (5)$$

where, a is a horizontal coordinate translation parameter, b is a vertical coordinate translation parameter.

Step 1802 is to generate a seventh instruction based on the seventh operation.

Herein, the seventh instruction is generated according to the seventh operation; the seventh instruction is used for detecting a display state of the target object corresponding to the multi-window management application.

Step 1803 is to detect the display state of the target object corresponding to the multi-window management application and obtain a detection result, in response to the seventh instruction.

Herein, the display state of the target object corresponding to the multi-window management application may be a first display state, or a second display state. The two display states may indicate that the target object corresponding to the multi-window management application is in a displayed state and a hidden state, respectively. For example, the first display state may indicate that the target object is in the displayed state or the hidden state; alternatively, the second display state may indicate that the target object is in the hidden state or the displayed state.

In the above-mentioned solution, the displayed state means that the target object, i.e., the application icon, is displayed on the touch-control display unit; the hidden state means that the target object is not displayed on the touch-control display unit.

Step 1804 is to switch from the first display state to the second display state in the case where the detection result shows that the target object corresponding to the multi-window management application is in the first display state.

In this embodiment, assumed that the first display state is the displayed state, the target object is in the hidden state after the first display state is switched to the second display state; assumed that the first display state is the hidden state, the target object is in the displayed state after the first display state is switched to the second display state. Thus, it is achieved to hide and initiate conveniently the application icon corresponding to the multi-window management application, thereby the user experience is improved.

Twentieth Embodiment

Figure 19:
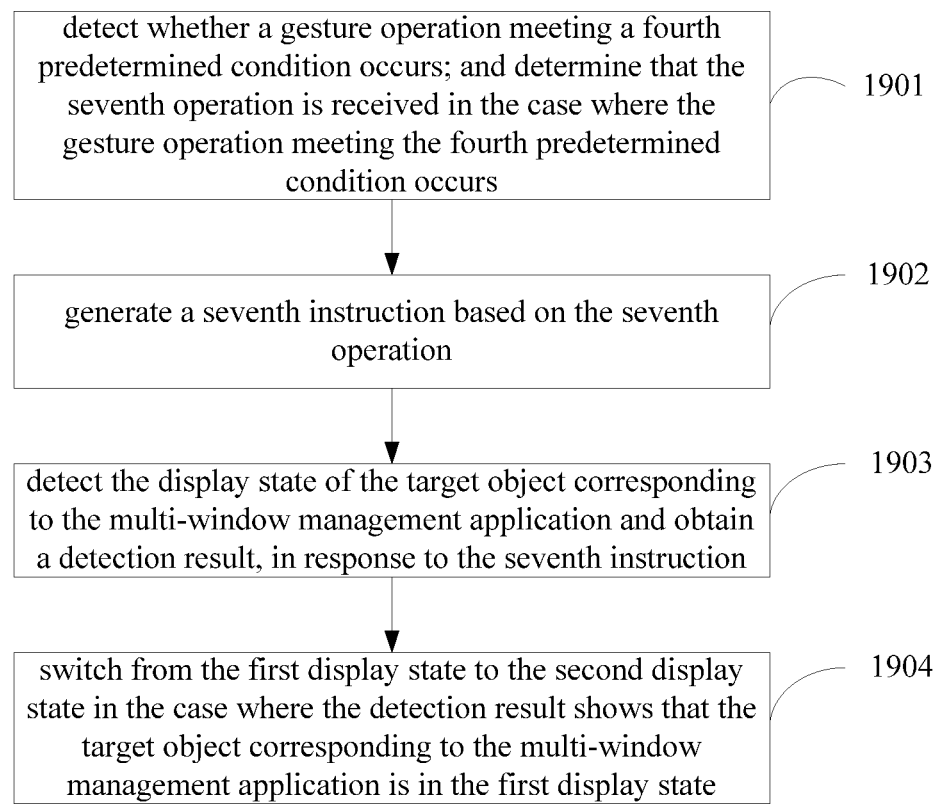
FIG. 19 is a schematic flowchart of a method for processing information according to a twentieth embodiment of the present invention.

FIG. 19 is a schematic flowchart of a method for processing information according to a twentieth embodiment of the invention. The method for processing method according to the embodiment of the invention is applied in an electronic apparatus with a touch-control display unit. The electronic apparatus is capable of running a multi-window management application and N first applications, displays a target object corresponding to the multi-window management application on the touch-control display unit. A multi-window management interface is presented when the target object is touch controlled, and there are target objects corresponding to N first applications in the multi-window management interface, with N being a positive integer. The first application is initiated by using the target object corresponding to the first application, and the initiated first application is displayed in a form of a small window on the touch-control display unit. The display region of the small window is smaller than the display region of the full-screen window of the first application, and the small window is transformed from the full-screen window by using a first parameter. In a preferred embodiment of the invention, the method for processing information includes step 1901 to step 1904.

Step 1901 is to detect whether a gesture operation meeting a fourth predetermined condition occurs; and determine that the seventh operation is received in the case where the gesture operation meeting the fourth predetermined condition occurs.

Herein, the gesture operation which meets a fourth predetermined condition occurring may be achieved in the following forms, but not limited to herein.

Shooting an image of the gesture operation by an image acquisition unit in the electronic apparatus, such as a camera; resolving the image and acquire feature parameters of the image; matching the feature parameters with the database of feature parameters stored at local and determining whether the gesture has a certain shape, such as a V-shaped gesture.

In specific implementation, the user may show a gesture with a special shape, such as the V-shaped gesture, in the shooting region of the camera in the electronic apparatus, to trigger the seventh operation.

In this embodiment, the first application running on the electronic apparatus may be an application self-contained in the electronic apparatus system, such as a clock application, a camera application, alternatively, may also be a third party application provided by the user, such as a WeChat application, a game application.

Generally, all of the first applications are displayed on the desktop of the electronic apparatus in the form of an icon-list, and a first application corresponds to an icon. The corresponding first application may be initiated by touch controlling the icon. The first application may be displayed on the display screen of the electronic apparatus in the form of the full-screen window when the first application is initiated by the above-mentioned way.

In the embodiment of the invention, the first application supports small window display, the first application may be displayed on the touch-control display unit of the electronic apparatus in the form of the small window when the first application is initiated by the following way, but not limited to herein.

The way of initiating the first application may be: adding in advance the first application into the multi-window management interface so that the first application supports the small window display; the multi-window management interface being displayed by initiating the icon corresponding to the multi-window management application; the first application being displayed on the touch-control display unit of the electronic apparatus in the form of the small window when the first application is initiated by the multi-window management interface.

Hence, the icon needs to be displayed on the touch-control display unit in the case where the multi-window management application is initiated by the icon corresponding to the multi-window management application. The icon is hidden in the case where the user does not use the multi-window management application. To this end, the displaying or hiding the icon corresponding to the multi-window management application may be achieved by triggering the seventh operation. Thus, the electronic apparatus obtains the seventh operation and performs step 1902.

In the above-mentioned solution, the first parameter is at least one of a parameter, a matrix, a parameter group and a parameter set.

For example, the first parameter may be achieved by a first matrix. The full-screen of the first application is transformed by using the first matrix, which may be achieved by formula (1).

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} + \begin{pmatrix} x_1 \\ y_1 \\ z_1 \end{pmatrix} \quad (1)$$

where, $$\begin{pmatrix} x_2 \\ y_2 \\ z_2 \end{pmatrix}$$

represents the coordinate vector of a small window, $x_2$ is the horizontal coordinate of the small window, $y_2$ is the vertical coordinate of the small window and $z_2$ is generally set to 1 by default;

$$M = \begin{pmatrix} M_{11} & M_{12} & M_{13} \\ M_{21} & M_{22} & M_{23} \\ M_{31} & M_{32} & M_{33} \end{pmatrix},$$

M represents the first matrix which is a matrix of 3×3, $M_{ij}$ represents the element of the first matrix at row i and column j, where the value of i is 1, 2, 3 and the value of j is 1, 2, 3;

$$\begin{pmatrix} x_1 \\ y_1 \\ z_1 \end{pmatrix}$$

represents the coordinate vector of the full-screen window, $x_1$ is the horizontal coordinate of the full-screen window, $y_1$ is the vertical coordinate of the full-screen window and $z_1$ is generally set to 1 by default.

When performing a scaling transforming on the full screen window by formula (1), four elements of $M_{ij}$ may be set as follows: $M_{11}=\alpha$, $M_{12}=0$, $M_{21}=0$, $M_{22}=\beta$, and other five elements may be set arbitrarily. Thus, formula (2) may be obtained by substituting the set above-mentioned parameters to formula (1).

$$x_2 = \alpha \times x_1$$

$$y_2 = \beta \times y_1 \quad (2)$$

where, $\alpha$ is a horizontal coordinate scaling parameter, $\beta$ is a vertical coordinate scaling parameter.

In the case where the full-screen is transformed in rotate by formula (1), four elements of M may be set as follows: $M_{11}=\cos\theta$, $M_{12}=\sin\theta$, $M_{21}=-\sin\theta$, $M_{22}=\cos\theta$, and other five elements may be set arbitrarily. Thus, a formula (3) may be obtained by substituting the set above-mentioned parameters to formula (1).

$$x_2 = \cos\theta \times x_1 + \sin\theta \times y_1$$

$$y_2 = -\sin\theta \times x_1 + \cos\theta \times y_1 \quad (3)$$

where, $\theta$ is a rotation angle.

The full-screen of the first application is transformed in translation by using the first matrix, which may be achieved by formula (4).

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (4)$$

In the case where a translation transforming on the full-screen is performed by formula (4), three elements of $M_{ij}$ may be set as follows: $M_{11}=a$, $M_{21}=b$, $M_{31}=0$. Thus, formula (5) may be obtained by substituting the set above-mentioned parameters to formula (4).

$$x_2 = a + x_1$$

$$y_2 = b + y_1 \quad (5)$$

where, a is a horizontal coordinate translation parameter, b is a vertical coordinate translation parameter.

Step 1902 is to generate a seventh instruction based on the seventh operation.

Herein, the seventh instruction is generated according to the seventh operation; the seventh instruction is used for detecting a display state of the target object corresponding to the multi-window management application.

Step 1903 is to detect the display state of the target object corresponding to the multi-window management application and obtain a detection result, in response to the seventh instruction.

Herein, the display state of the target object corresponding to the multi-window management application may be a first display state, or a second display state. The two display states may indicate that the target object corresponding to the multi-window management application is in a displayed state and a hidden state, respectively. For example, the first display state may indicate that the target object is in the displayed state or the hidden state; alternatively, the second display state may indicate that the target object is in the hidden state or the displayed state.

In the above-mentioned solution, the displayed state means that the target object, i.e., the application icon, is displayed on the touch-control display unit; the hidden state means that the target object is not displayed on the touch-control display unit.

Step 1904 is to switch from the first display state to the second display state in the case where the detection result shows that the target object corresponding to the multi-window management application is in the first display state.

In this embodiment, assumed that the first display state is the displayed state, the target object is in the hidden state after the first display state is switched to the second display state; assumed that the first display state is the hidden state, the target object is in the displayed state after the first display state is switched to the second display state. Thus, it is achieved to hide and initiate conveniently the application icon corresponding to the multi-window management application, thereby the user experience is improved.

Twenty-First Embodiment

Figure 20:
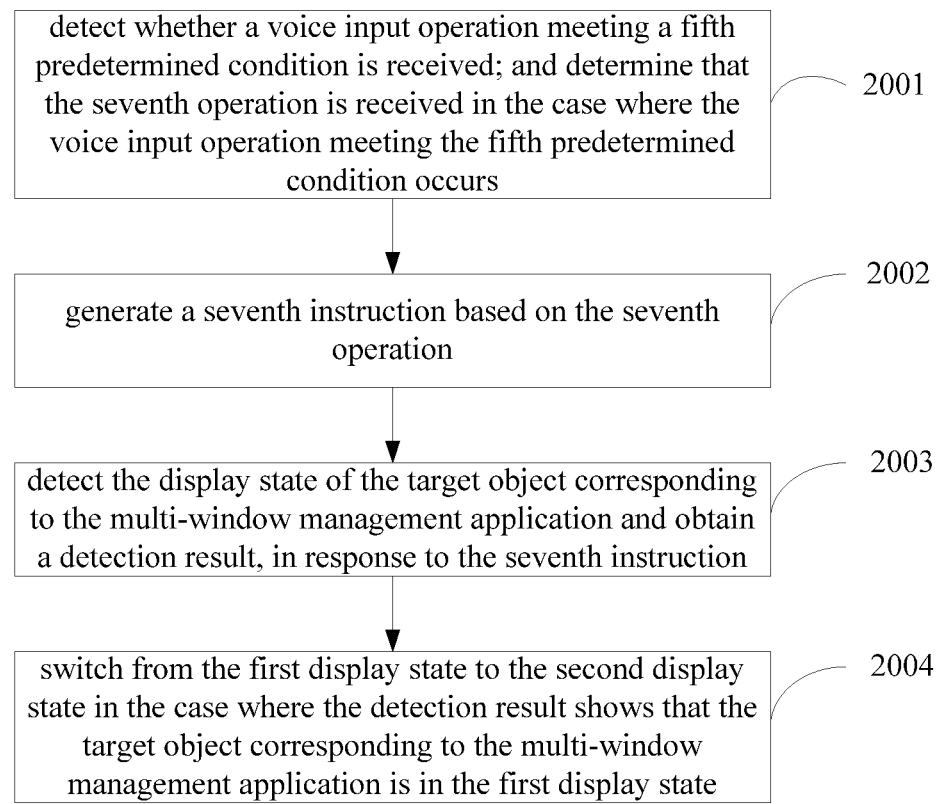
FIG. 20 is a schematic flowchart of a method for processing information according to a twenty-first embodiment of the present invention.

FIG. 20 is a schematic flowchart of a method for processing information according to a twenty-first embodiment of the invention. The method for processing information according to the embodiment of the invention is applied in an electronic apparatus with a touch-control display unit. The electronic apparatus is capable of running a multi-window management application and N first applications, displays a target object corresponding to the multi-window management application on the touch-control display unit. A multi-window management interface is presented when the target object is touch controlled, and there are target objects corresponding to N first applications in the multi-window management interface, with N being a positive integer. The first application is initiated by using the target object corresponding to the first application, and the initiated first application is displayed in a form of a small window on the touch-control display unit. The display region of the small window is smaller than the display region of the full-screen window of the first application, and the small window is transformed from the full-screen window by using a first parameter. In a preferred embodiment of the invention, the method for processing information includes step 2001 to step 2004.

Step 2001 is to detect whether a voice input operation meeting a fifth predetermined condition is received; and determine that the seventh operation is received in the case where the voice input operation meeting the fifth predetermined condition occurs.

Herein, the voice input operation which meets the fifth predetermined condition occurring may be achieved in the following forms, but not limited to herein.

Capturing a voice input by the user, by an audio acquisition unit in the electronic apparatus, such as a microphone; resolving the captured voice and acquire feature parameters of the voice; matching the feature parameters with the database of feature parameters stored at local and determining what meaning the voice represents, such as display or hiding. The target object corresponding to the multi-window management application is displayed on the touch-control display unit in the case where the meaning represented by the voice is display; the target object corresponding to the multi-window management application is not displayed on the touch-control display unit in the case where the meaning represented by the voice is hiding.

In this embodiment, the first application running on the electronic apparatus may be an application self-contained in the electronic apparatus system, such as a clock application, a camera application, alternatively, may also be a third party application provided by the user, such as a WeChat application, a game application.

Generally, all of the first applications are displayed on the desktop of the electronic apparatus in the form of an icon-list, and a first application corresponds to an icon. The corresponding first application may be initiated by touch controlling the icon. The first application may be displayed on the display screen of the electronic apparatus in the form of the full-screen window when the first application is initiated by the above-mentioned way.

In the embodiment of the invention, the first application supports small window display, the first application may be displayed on the touch-control display unit of the electronic apparatus in the form of the small window when the first application is initiated by the following way, but not limited to herein.

The way of initiating the first application may be: adding in advance the first application into the multi-window management interface so that the first application supports the small window display; the multi-window management interface being displayed by initiating the icon corresponding to the multi-window management application; the first application being displayed on the touch-control display unit of the electronic apparatus in the form of the small window when the first application is initiated by the multi-window management interface.

Hence, the icon needs to be displayed on the touch-control display unit in the case where the multi-window management application is initiated by the icon corresponding to the multi-window management application. The icon is hidden in the case where the user does not use the multi-window management application. To this end, the displaying or hiding the icon corresponding to the multi-window management application may be achieved by triggering the first operation. Thus, the electronic apparatus obtains the seventh operation and performs step 2002.

In the above-mentioned solution, the first parameter is at least one of a parameter, a matrix, a parameter group and a parameter set.

For example, the first parameter may be achieved by a first matrix. The full-screen of the first application is transformed by using the first matrix, which may be achieved by formula (1).

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (1)$$

where, $$\begin{pmatrix} x_2 \\ y_2 \\ z_2 \end{pmatrix}$$

represents the coordinate vector of a small window, $x_2$ is the horizontal coordinate of the small window, $y_2$ is the vertical coordinate of the small window and $z_2$ is generally set to 1 by default;

$$M = \begin{pmatrix} M_{11} & M_{12} & M_{13} \\ M_{21} & M_{22} & M_{23} \\ M_{31} & M_{32} & M_{33} \end{pmatrix},$$

M represents the first matrix which is a matrix of 3×3, $M_{ij}$ represents the element of the first matrix at row i and column j, where the value of i is 1, 2, 3 and the value of j is 1, 2, 3;

$$\begin{pmatrix} x_1 \\ y_1 \\ z_1 \end{pmatrix}$$

represents the coordinate vector of the full-screen window, $x_1$ is the horizontal coordinate of the full-screen window, $y_1$ is the vertical coordinate of the full-screen window and $z_1$ is generally set to 1 by default.

When performing a scaling transforming on the full screen window by formula (1), four elements of $M_{ij}$ may be set as follows: $M_{11}=\alpha$, $M_{12}=0$, $M_{21}=0$, $M_{22}=\beta$, and other five elements may be set arbitrarily. Thus, formula (2) may be obtained by substituting the set above-mentioned parameters to formula (1).

$$x_2 = \alpha \times x_1$$

$$y_2 = \beta \times y_1 \quad (2)$$

where, $\alpha$ is a horizontal coordinate scaling parameter, $\beta$ is a vertical coordinate scaling parameter.

In the case where the full-screen is transformed in rotate by formula (1f), four elements of M may be set as follows: $M_{11}=\cos\theta$, $M_{12}=\sin\theta$, $M_{21}=-\sin\theta$, $M_{22}=\cos\theta$, and other five elements may be set arbitrarily. Thus, a formula (3) may be obtained by substituting the set above-mentioned parameters to formula (1).

$$x_2 = \cos\theta \times x_1 + \sin\theta \times y_1$$

$$y_2 = -\sin\theta \times x_1 + \cos\theta \times y_1 \quad (3)$$

where, $\theta$ is a rotation angle.

The full-screen of the first application is transformed in translation by using the first matrix, which may be achieved by formula (4).

$$\begin{pmatrix} x_2 \\ y_2 \\ z_2 \end{pmatrix} = \begin{pmatrix} M_{11} \\ M_{21} \\ M_{31} \end{pmatrix} \times \begin{pmatrix} x_1 \\ y_1 \\ z_1 \end{pmatrix} \quad (4)$$

In the case where a translation transforming on the full-screen is performed by formula (4), three elements of $M_{ij}$ may be set as follows: $M_{11}=a$, $M_{21}=b$, $M_{31}=0$. Thus, formula (5) may be obtained by substituting the set above-mentioned parameters to formula (4).

$$x_2 = a + x_1$$

$$y_2 = b + y_1 \quad (5)$$

where, a is a horizontal coordinate translation parameter, b is a vertical coordinate translation parameter.

Step 2002 is to generate a seventh instruction based on the seventh operation.

Herein, the seventh instruction is generated according to the seventh operation; the seventh instruction is used for detecting a display state of the target object corresponding to the multi-window management application.

Step 2003 is to detect the display state of the target object corresponding to the multi-window management application and obtain a detection result, in response to the seventh instruction.

Herein, the display state of the target object corresponding to the multi-window management application may be a first display state, or a second display state. The two display states may indicate that the target object corresponding to the multi-window management application is in a displayed state and a hidden state, respectively. For example, the first display state may indicate that the target object is in the displayed state or the hidden state; alternatively, the second display state may indicate that the target object is in the hidden state or the displayed state.

In the above-mentioned solution, the displayed state means that the target object, i.e., the application icon, is displayed on the touch-control display unit; the hidden state means that the target object is not displayed on the touch-control display unit.

Step 2004 is to switch from the first display state to the second display state in the case where the detection result shows that the target object corresponding to the multi-window management application is in the first display state.

In this embodiment, assumed that the first display state is the displayed state, the target object is in the hidden state after the first display state is switched to the second display state; assumed that the first display state is the hidden state, the target object is in the displayed state after the first display state is switched to the second display state. Thus, it is achieved to hide and initiate conveniently the application icon corresponding to the multi-window management application, thereby the user experience is improved.

Twenty-Second Embodiment

Figure 21:
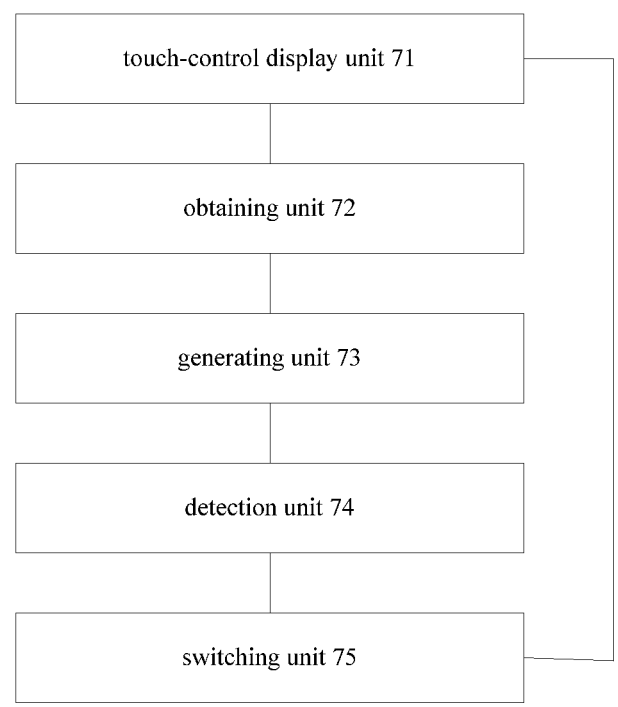
FIG. 21 is a schematic diagram of an electronic apparatus according to a twenty-second embodiment of the present invention.

FIG. 21 is a structural schematic diagram of an electronic apparatus according to the twenty-second embodiment of the invention. The electronic apparatus according to this embodiment is capable of running a multi-window management application and N first applications. In a preferred embodiment of the invention, the electronic apparatus includes a touch-control display unit 71, an obtaining unit 72, a generating unit 73, a detection unit 74 and a switching unit 75.

The touch-control display unit 71 is configured to display a target object corresponding to the multi-window management application; display a multi-window management interface when the target object is touch controlled, there being target objects corresponding to N first applications in the multi-window management interface, with N being a positive integer; display the first application in a form of a small window when the first application is initiated by using the target object corresponding to the first application; the display region of the small window is smaller than the display region of the full-screen window of the first application; the small window is transformed from the full-screen window by using a first parameter.

The obtaining unit 72 is configured to obtain a seventh operation.

The generating unit 73 is configured to generate a seventh instruction based on the seventh operation.

The detection unit 74 is configured to detect a display state of the target object corresponding to the multi-window management application and obtain a detection result, in response to the seventh instruction.

The switching unit 75 is configured to switch from a first display state to a second display state in the case where the detection result shows that the target object corresponding to the multi-window management application is in the first display state.

In the above-mentioned solution, the first parameter is at least one of a parameter, a matrix, a parameter group and a parameter set.

It should be understood by those skilled in the art that the function implemented by units of the electronic apparatus shown in FIG. 21 may be understood with reference to the related description of the aforementioned method for processing information.

Twenty-Third Embodiment

Figure 22:
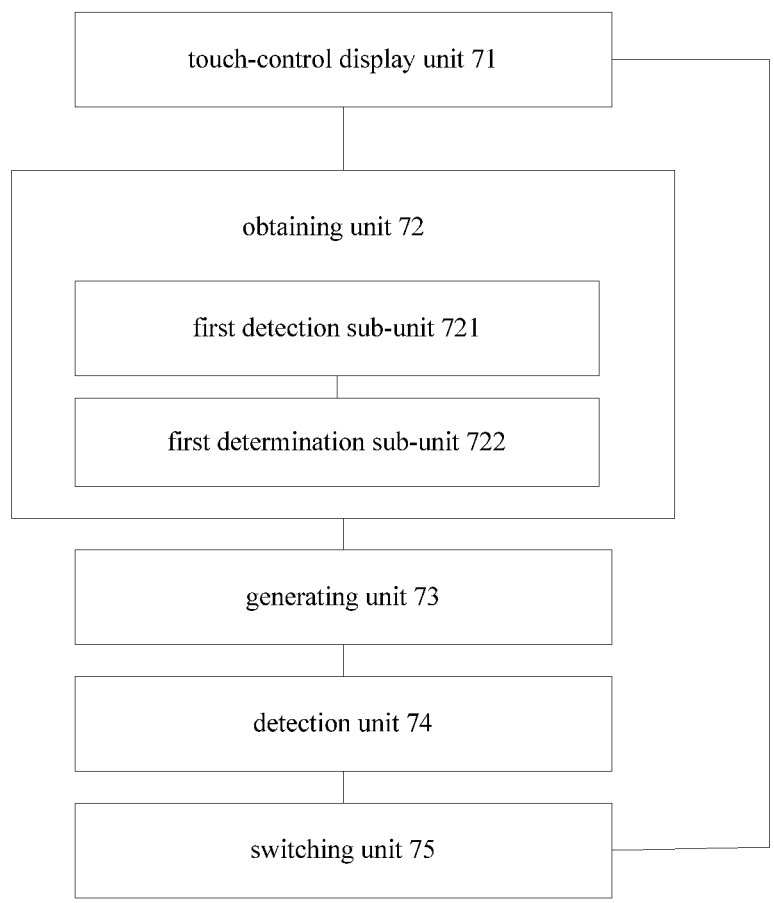
FIG. 22 is schematic diagram of an electronic apparatus according to a twenty-third embodiment of the present invention.

FIG. 22 is a structural schematic diagram of an electronic apparatus according to the twenty-third embodiment of the invention. The electronic apparatus according to this embodiment is capable of running a multi-window management application and N first applications. In a preferred embodiment of the invention, the electronic apparatus includes a touch-control display unit 71, an obtaining unit 72, a generating unit 73, a detection unit 74 and a switching unit 75.

The touch-control display unit 71 is configured to display a target object corresponding to the multi-window management application; display a multi-window management interface when the target object is touch controlled, there being target objects corresponding to N first applications in the multi-window management interface, with N being a positive integer; display the first application in a form of a small window when the first application is initiated by using the target object corresponding to the first application; the display region of the small window is smaller than the display region of the full-screen window of the first application; the small window is transformed from the full-screen window by using a first parameter.

The obtaining unit 72 is configured to obtain a seventh operation.

The generating unit 73 is configured to generate a seventh instruction based on the seventh operation.

The detection unit 74 is configured to detect a display state of the target object corresponding to the multi-window management application and obtain a detection result, in response to the seventh instruction.

The switching unit 75 is configured to switch from a first display state to a second display state in the case where the detection result shows that the target object corresponding to the multi-window management application is in the first display state.

Preferably, the obtaining unit 72 includes a first detection sub-unit 721 and a first determination sub-unit 722.

The first detection sub-unit 721 is configured to detect whether a touch-control operation meeting a first predetermined condition occurs.

The first determination sub-unit 722 is configured to determine that the seventh operation is obtained in the case where the touch-control operation meets the first predetermined condition.

In the above-mentioned solution, the first parameter is at least one of a parameter, a matrix, a parameter group and a parameter set.

It should be understood by those skilled in the art that the function implemented by units of the electronic apparatus shown in FIG. 22 may be understood with reference to the related description of the aforementioned the method for processing information.

Twenty-Fourth Embodiment

Figure 23:
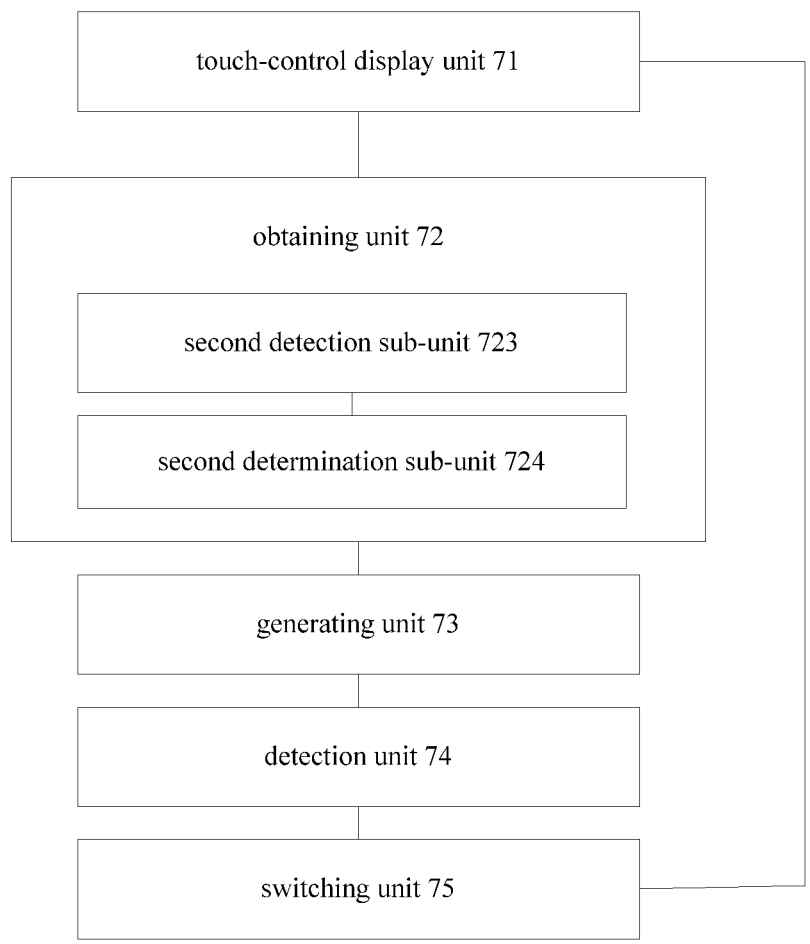
FIG. 23 is schematic diagram of an electronic apparatus according to a twenty-fourth embodiment of the present invention.

FIG. 23 is a structural schematic diagram of an electronic apparatus according to the twenty-fourth embodiment of the invention. The electronic apparatus according to this embodiment is capable of running a multi-window management application and N first applications. In a preferred embodiment of the invention, the electronic apparatus includes a touch-control display unit 71, an obtaining unit 72, a generating unit 73, a detection unit 74 and a switching unit 75.

The touch-control display unit 71 is configured to display a target object corresponding to the multi-window management application; display a multi-window management interface when the target object is touch controlled, there being target objects corresponding to N first applications in the multi-window management interface, with N being a positive integer; display the first application in a form of a small window when the first application is initiated by using the target object corresponding to the first application; the display region of the small window is smaller than the display region of the full-screen window of the first application; the small window is transformed from the full-screen window by using a first parameter.

The obtaining unit 72 is configured to obtain a seventh operation.

The generating unit 73 is configured to generate a seventh instruction based on the seventh operation.

The detection unit 74 is configured to detect a display state of the target object corresponding to the multi-window management application and obtain a detection result, in response to the seventh instruction.

The switching unit 75 is configured to switch from a first display state to a second display state in the case where the detection result shows that the target object corresponding to the multi-window management application is in the first display state.

Preferably, the obtaining unit 72 includes a second detection sub-unit 723 and a second determination sub-unit 724.

The second detection sub-unit 723 is configured to detect whether a key-pressing operation meeting a second predetermined condition occurs.

The second determination sub-unit 724 is configured to determine that the seventh operation is obtained in the case where the key-pressing operation meets the second predetermined condition.

In the above-mentioned solution, the first parameter is at least one of a parameter, a matrix, a parameter group and a parameter set.

It should be understood by those skilled in the art that the function implemented by units of the electronic apparatus shown in FIG. 23 may be understood with reference to the related description of the aforementioned method for processing information.

Twenty-Fifth Embodiment

Figure 24:
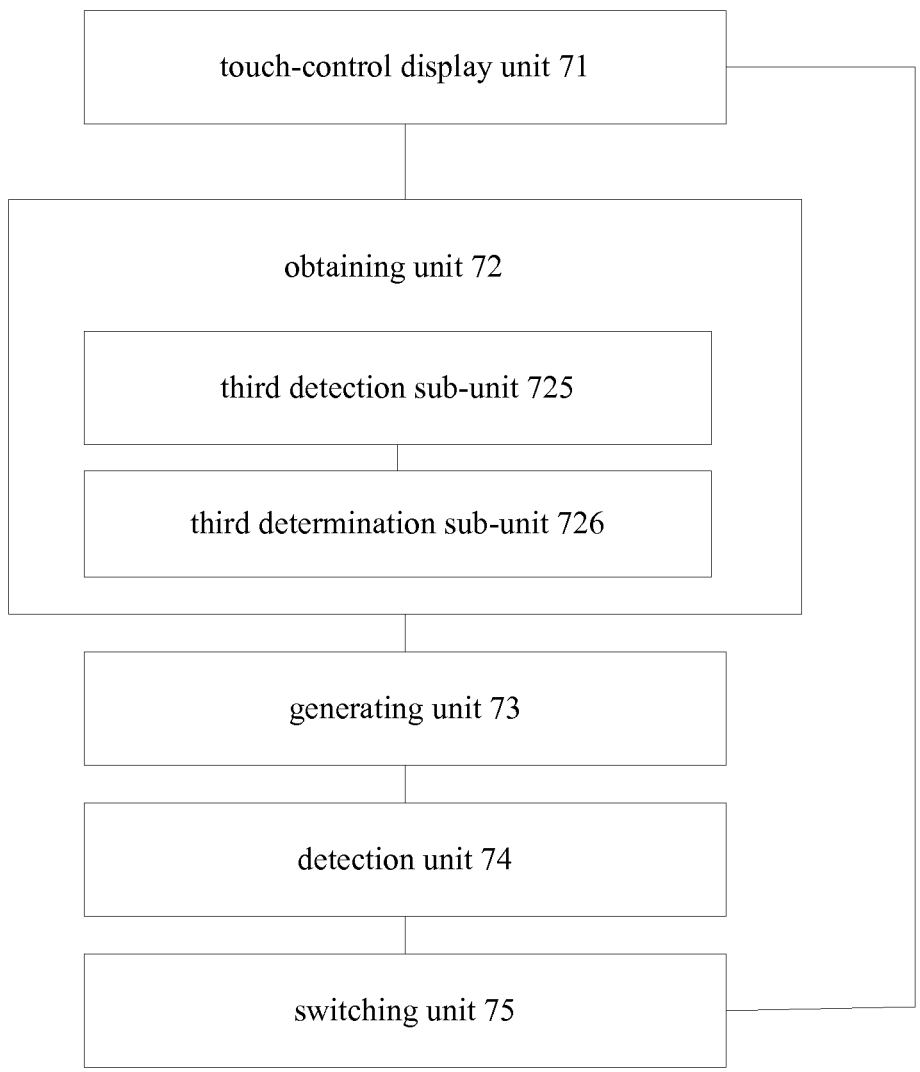
FIG. 24 is schematic diagram of an electronic apparatus according to a twenty-fifth embodiment of the present invention.

FIG. 24 is a structural schematic diagram of an electronic apparatus according to the twenty-fifth embodiment of the invention. The electronic apparatus according to this embodiment is capable of running a multi-window management application and N first applications. In a preferred embodiment of the invention, the electronic apparatus includes a touch-control display unit 71, an obtaining unit 72, a generating unit 73, a detection unit 74 and a switching unit 75.

The touch-control display unit 71 is configured to display a target object corresponding to the multi-window management application; display a multi-window management interface when the target object is touch controlled, there being target objects corresponding to N first applications in the multi-window management interface, with N being a positive integer; display the first application in a form of a small window when the first application is initiated by using the target object corresponding to the first application; the display region of the small window is smaller than the display region of the full-screen window of the first application; the small window is transformed from the full-screen window by using a first parameter.

The obtaining unit 72 is configured to obtain a seventh operation.

The generating unit 73 is configured to generate a seventh instruction based on the seventh operation.

The detection unit 74 is configured to detect a display state of the target object corresponding to the multi-window management application and obtain a detection result, in response to the seventh instruction.

The switching unit 75 is configured to switch from a first display state to a second display state in the case where the detection result shows that the target object corresponding to the multi-window management application is in the first display state.

Preferably, the obtaining unit 72 includes a third detection sub-unit 725 and a third determination sub-unit 726.

The third detection sub-unit 725 is configured to detect whether the electronic apparatus has attitude change meeting a third predetermined condition.

The third determination sub-unit 726 is configured to determine that the seventh operation is obtained in the case where the electronic apparatus has the attitude change meeting the third predetermined condition.

In the above-mentioned solution, the first parameter is at least one of a parameter, a matrix, a parameter group and a parameter set.

It should be understood by those skilled in the art that the function implemented by units of the electronic apparatus shown in FIG. 24 may be understood with reference to the related description of the aforementioned method for processing information processing.

Twenty-Sixth Embodiment

Figure 25:
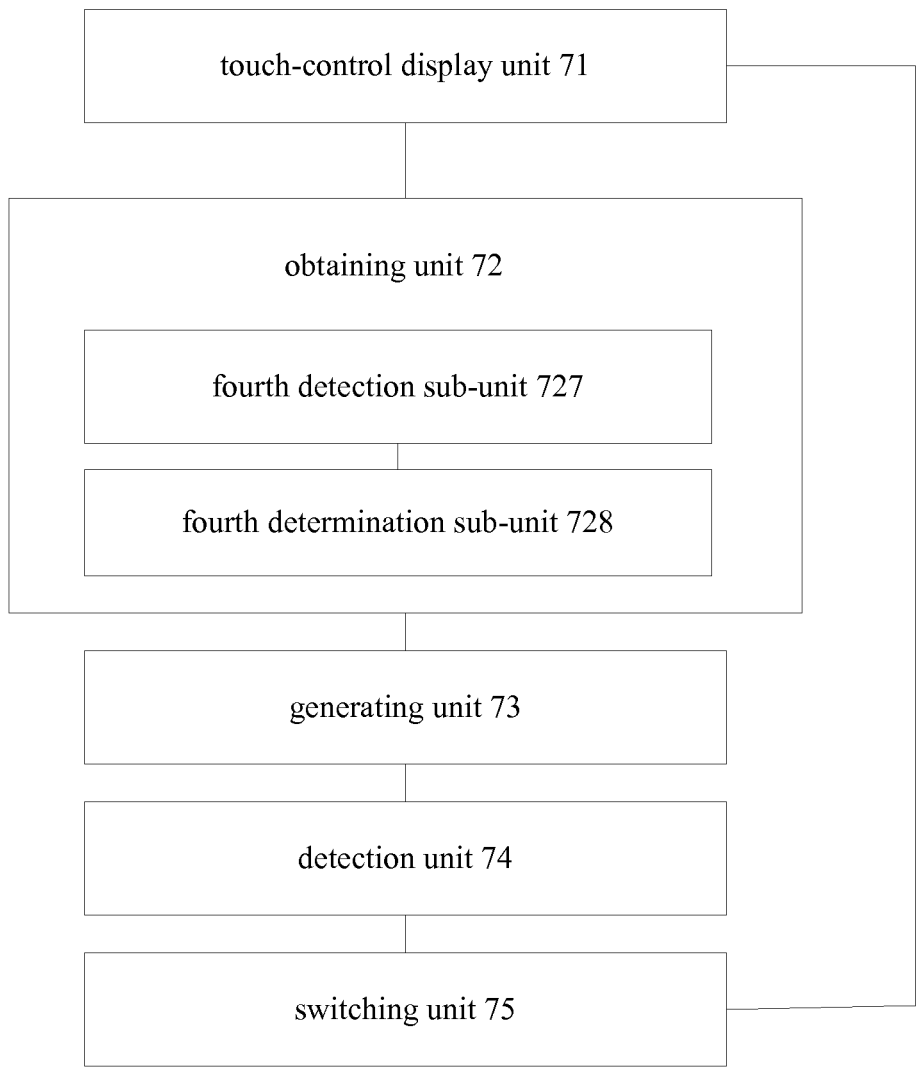
FIG. 25 is schematic diagram of an electronic apparatus according to a twenty-sixth embodiment of the present invention.

FIG. 25 is a structural schematic diagram of an electronic apparatus according to the twenty-sixth embodiment of the invention. The electronic apparatus according to this embodiment is capable of running a multi-window management application and N first applications. In a preferred embodiment of the invention, the electronic apparatus includes a touch-control display unit 71, an obtaining unit 72, a generating unit 73, a detection unit 74 and a switching unit 75.

The touch-control display unit 71 is configured to display a target object corresponding to the multi-window management application; display a multi-window management interface when the target object is touch controlled, there being target objects corresponding to N first applications in the multi-window management interface, with N being a positive integer; display the first application in a form of a small window when the first application is initiated by using the target object corresponding to the first application; the display region of the small window is smaller than the display region of the full-screen window of the first application; the small window is transformed from the full-screen window by using a first parameter.

The obtaining unit 72 is configured to obtain a seventh operation.

The generating unit 73 is configured to generate a seventh instruction based on the seventh operation.

The detection unit 74 is configured to detect a display state of the target object corresponding to the multi-window management application and obtain a detection result, in response to the seventh instruction.

The switching unit 75 is configured to switch from a first display state to a second display state in the case where the detection result shows that the target object corresponding to the multi-window management application is in the first display state.

Preferably, the obtaining unit 72 includes a fourth detection sub-unit 727 and a fourth determination sub-unit 728.

The fourth detection sub-unit 727 is configured to detect whether a gesture operation meeting a fourth predetermined condition occurs.

The fourth determination sub-unit 728 is configured to determine that the seventh operation is received in the case where the gesture operation meeting the fourth predetermined condition occurs.

In the above-mentioned solution, the first parameter is at least one of a parameter, a matrix, a parameter group and a parameter set.

It should be understood by those skilled in the art that the function implemented by units of the electronic apparatus shown in FIG. 25 may be understood with reference to the related description of the aforementioned method for processing information.

Twenty-Seventh Embodiment

Figure 26:
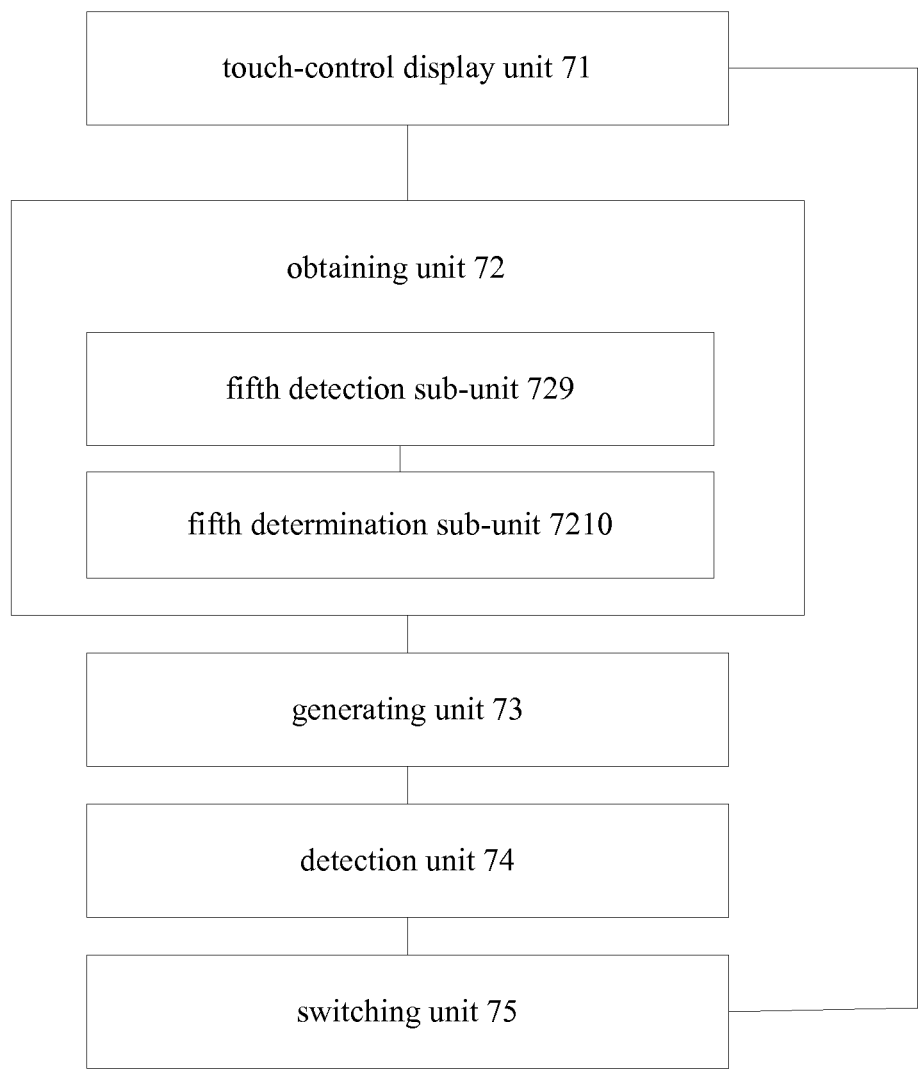
FIG. 26 is schematic diagram of an electronic apparatus according to a twenty-seventh embodiment of the present invention.

FIG. 26 is a structural schematic diagram of an electronic apparatus according to the twenty-seventh embodiment of the invention. The electronic apparatus according to this embodiment is capable of running a multi-window management application and N first applications. In a preferred embodiment of the invention, the electronic apparatus includes a touch-control display unit 71, an obtaining unit 72, a generating unit 73, a detection unit 74 and a switching unit 75.

The touch-control display unit 71 is configured to display a target object corresponding to the multi-window management application; display a multi-window management interface when the target object is touch controlled, there being target objects corresponding to N first applications in the multi-window management interface, with N being a positive integer; display the first application in a form of a small window when the first application is initiated by using the target object corresponding to the first application; the display region of the small window is smaller than the display region of the full-screen window of the first application; the small window is transformed from the full-screen window by using a first parameter.

The obtaining unit 72 is configured to obtain a seventh operation.

The generating unit 73 is configured to generate a seventh instruction based on the seventh operation.

The detection unit 74 is configured to detect a display state of the target object corresponding to the multi-window management application and obtain a detection result, in response to the seventh instruction.

The switching unit 75 is configured to switch from a first display state to a second display state in the case where the detection result shows that the target object corresponding to the multi-window management application is in the first display state.

Preferably, the obtaining unit 72 includes a fifth detection sub-unit 729 and a fifth determination sub-unit 7210.

The fifth detection sub-unit 729 is configured to detect whether a voice input operation meeting a fifth predetermined condition is received.

The fifth determination sub-unit 7210 is configured to determine that the seventh operation is received in the case where the voice input operation meeting the fifth predetermined condition occurs.

In the above-mentioned solution, the first parameter is at least one of a parameter, a matrix, a parameter group and a parameter set.

It should be understood by those skilled in the art that the function implemented by units of the electronic apparatus shown in FIG. 26 may be understood with reference to the related description of the aforementioned method for processing information.

Twenty-Eighth Embodiment

Figure 27:
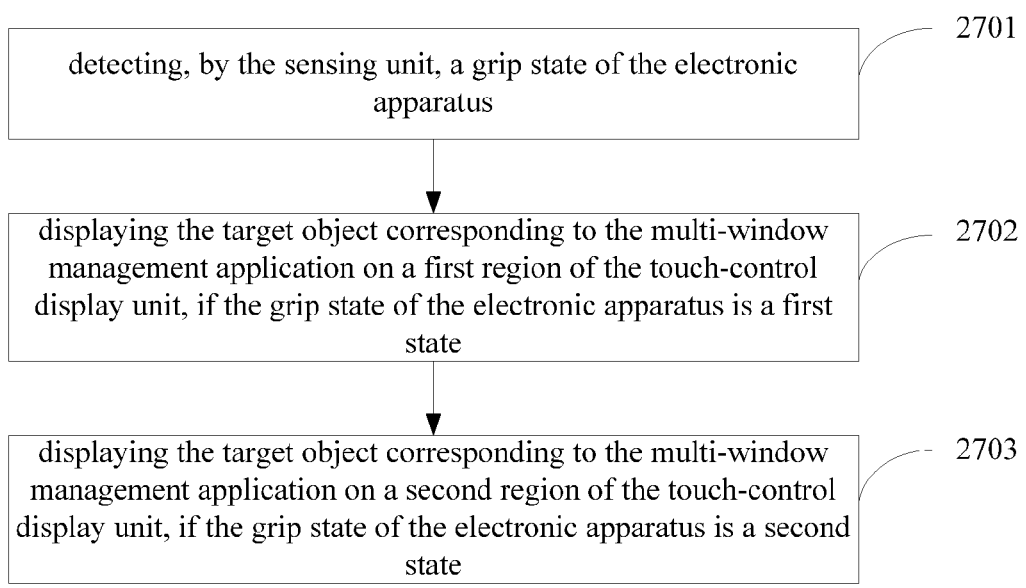
FIG. 27 is a schematic flowchart of a method for processing information according to a twenty-eighth embodiment of the present invention.

FIG. 27 is a schematic flow chart of a method for processing information according to the twenty-eighth embodiment of the present invention. The method for processing information according to this embodiment is applied to an electronic apparatus, the electronic device is able to run a multi-window management application, and the electronic apparatus includes a touch-control display unit and a sensing unit. A target object corresponding to the multi-window management application is displayed on the touch-control display unit. A multi-window management interface may be displayed when the target object is touch-controlled, the multi-window management interface includes target objects corresponding to N first applications, with N being a positive integer. The first application may be initiated by using the target object corresponding to the first application, the initiated first application is displayed in a form of a small window on the touch-control display unit. A display region of the small window is smaller than a display region of a full screen window of the first application. The small window is transformed from the full screen window by using a first parameter. According to a preferred embodiment of the present invention, the method for processing information includes steps from step 2701 to step 2703.

In step 2701: detecting, by the sensing unit, a grip state of the electronic apparatus.

According to this embodiment, the first application set by the electronic apparatus may be an application self-contained in the system of the electronic apparatus, such as a clock application, a camera application, and it may also be a third-party application set by a user, such as a wechat application and a game application.

Generally, all of the first applications are displayed in a form of a list of icons on a desktop of the electronic apparatus. One first application corresponds to one icon, the first application corresponding to the icon may be initiated by touch-controlling the icon. The first application is displayed in a form of the full screen window on a display screen of the electronic apparatus when the first application is initiated in the above-mentioned mode.

In the embodiments of the present invention, the first application supports small window display. The first application is displayed in a form of a small window on the touch-control display unit of the electronic apparatus when the first application is initiated, but not limited to, the following mode.

The modes for initiating the first application may be: the first application is added into the multi-window management interface in advance, so that the first application supports the small window display; the multi-window management interface may be displayed by initiating the icon corresponding to the multi-window management application; and the first application is displayed in a form of a small window on the touch-control display unit of the electronic apparatus when the first application is initiated by using the multi-window management interface.

Therefore, the icon corresponding to the multi-window management application has to be displayed at a specific region on the touch-control display unit where the icon is easy to be touch-controlled when the icon is initiated. According to this embodiment, the grip state of the electronic apparatus is detected by the sensing unit, and then it may be determined whether the electronic apparatus is griped by a left hand or a right hand. The position of the icon corresponding to the multi-window management application has to be adjusted to the region on the touch-control display unit where the icon is easy to be touched by the left hand, if the electronic apparatus is griped by the left hand. And the position of the icon corresponding to the multi-window management application has to be adjusted to the region on the touch-control display unit where the icon is easy to be touched by the right hand, if the electronic apparatus is griped by the right hand.

According to this embodiment, the first parameter is at least one of: a parameter, a matrix, a parameter group and a parameter set. For example, the first parameter may be achieved by a first matrix, a transformation may be performed on the full screen window of the first application by using the first matrix according to formula (1).

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \qquad (1)$$

$$\begin{pmatrix} x_2 \\ y_2 \\ z_2 \end{pmatrix}$$

represents the coordinate vector of the small window, $x_2$ is the horizontal ordinate of the small window, $y_2$ is the vertical coordinate of the small window and $z_2$ is usually set to 1 by default.

$$M = \begin{pmatrix} M_{11} & M_{12} & M_{13} \\ M_{21} & M_{22} & M_{23} \\ M_{31} & M_{32} & M_{33} \end{pmatrix},$$

which represents the first matrix. The first matrix is a 3×3 matrix, $M_{ij}$ represents a element of the first matrix at row i and column j. The value of i is 1, 2 or 3, and the value of j is 1, 2 or 3.

$$\begin{pmatrix} x_1 \\ y_1 \\ z_1 \end{pmatrix}$$

represents the coordinate vector of the full screen window, $x_1$ is the horizontal ordinate of the full screen window, $y_1$ is the vertical coordinate of the full screen window and $z_1$ is usually set to 1 by default.

When performing a scaling transformation on the full screen window according to formula (1), four elements in M may be set as follows: $M_{11}=a$, $M_{12}=0$, $M_{21}=0$ and $M_{22}=\beta$, and the other five elements may be arbitrarily set. Hence, formula (2) may be obtained by substituting the parameters set above into formula (1).

$$x_2 = \alpha \times x_1$$

$$y_2 = \beta \times y_1 \qquad (2)$$

where α is a horizontal coordinate scaling parameter, and β is a vertical coordinate scaling parameter.

When performing a rotation transformation on the full screen window according to formula (1), four elements in $M_{ij}$ may be set as follows: $M_{11}=\cos\theta$, $M_{12}=\sin\theta$, $M_{21}=-\sin\theta$ and $M_{22}=\cos\theta$, and the other five elements may be arbitrarily set. Hence, formula (3) may be obtained by substituting the parameters set above into formula (1).

$$x_2 = \cos\theta \times x_1 + \sin\theta \times y_1$$

$$y_2 = -\sin\theta \times x_1 + \cos\theta \times y_1 \qquad (3)$$

where θ is a rotation angle.

A translation transformation may be performed on the full screen window of the first application by using the first matrix according to formula (4).

$$\begin{pmatrix} x_2 \\ y_2 \\ z_2 \end{pmatrix} = \begin{pmatrix} M_{11} \\ M_{21} \\ M_{31} \end{pmatrix} \times \begin{pmatrix} x_1 \\ y_1 \\ z_1 \end{pmatrix} \qquad (4)$$

When performing the translation transformation on the full screen window according to formula (4), three elements in M may be set as follows: $M_{11}=a$, $M_{21}=b$ and $M_{31}=0$. Hence, formula (5) may be obtained by substituting the parameters set above into formula (4).

$$x_2 = a + x_1$$

$$y_2 = b + y_1 \qquad (5)$$

a is a horizontal coordinate translation parameter, and b is a vertical coordinate translation parameter.

In step 2702: displaying the target object corresponding to the multi-window management application on a first region of the touch-control display unit, if the grip state of the electronic apparatus is a first state.

According to this embodiment, the first state may be a left hand grip state or a right hand grip state. Correspondingly, a second state in the following Step 2703 may be the right hand grip state or the left hand grip state.

Here, the target object corresponding to the multi-window management application may be the icon corresponding to the multi-window management application, and the multi-window management application may be initiated by touch-controlling the icon.

The target object corresponding to the multi-window management application has to be displayed on the first region of the touch-control display unit where the target object is easy to be operated by the left hand, if the first state is the left hand grip state.

Preferably, the first region may be determined in, but not limited to, the following modes.

First position information of the first region may be set by the electronic apparatus, for example, the first region may be a left region; or a range and a frequency of touch-controlling points on the touch-control display unit of the electronic apparatus touch-controlled by the left hand are collected in advance, and a region whose frequency of the touch-controlling points is the highest is determined as the first region.

In step 2703: displaying the target object corresponding to the multi-window management application on a second region of the touch-control display unit, if the grip state of the electronic apparatus is a second state.

Corresponding to step 2702, the second state may be the right hand grip state or the left hand grip state.

The target object corresponding to the multi-window management application has to be displayed on the second region of the touch-control display unit where the target object is easy to be operated by the right hand, if the second state is the right hand grip state.

Preferably, the second region may be determined in, but not limited to, the following modes.

Second position information of the second region may be set by the electronic apparatus, for example, the second region may be a region on the right side; or a range and a frequency of touch-controlling points on the touch-control display unit of the electronic apparatus touch-controlled by the right hand are collected in advance, and a region whose frequency of the touch-controlling points is the highest is determined as the second region.

In the above embodiment, step 2702 and step 2703 are not performed in sequence.

According to the embodiments of the present invention, a target object corresponding to a multi-window management application is displayed on a region corresponding to a grip state of the electronic apparatus. Therefore, the target object corresponding to the multi-window management application can be displayed at the region on the electronic apparatus where the target object is easy to be operated, and thereby improving user experience.

Twenty-Ninth Embodiment

Figure 28:
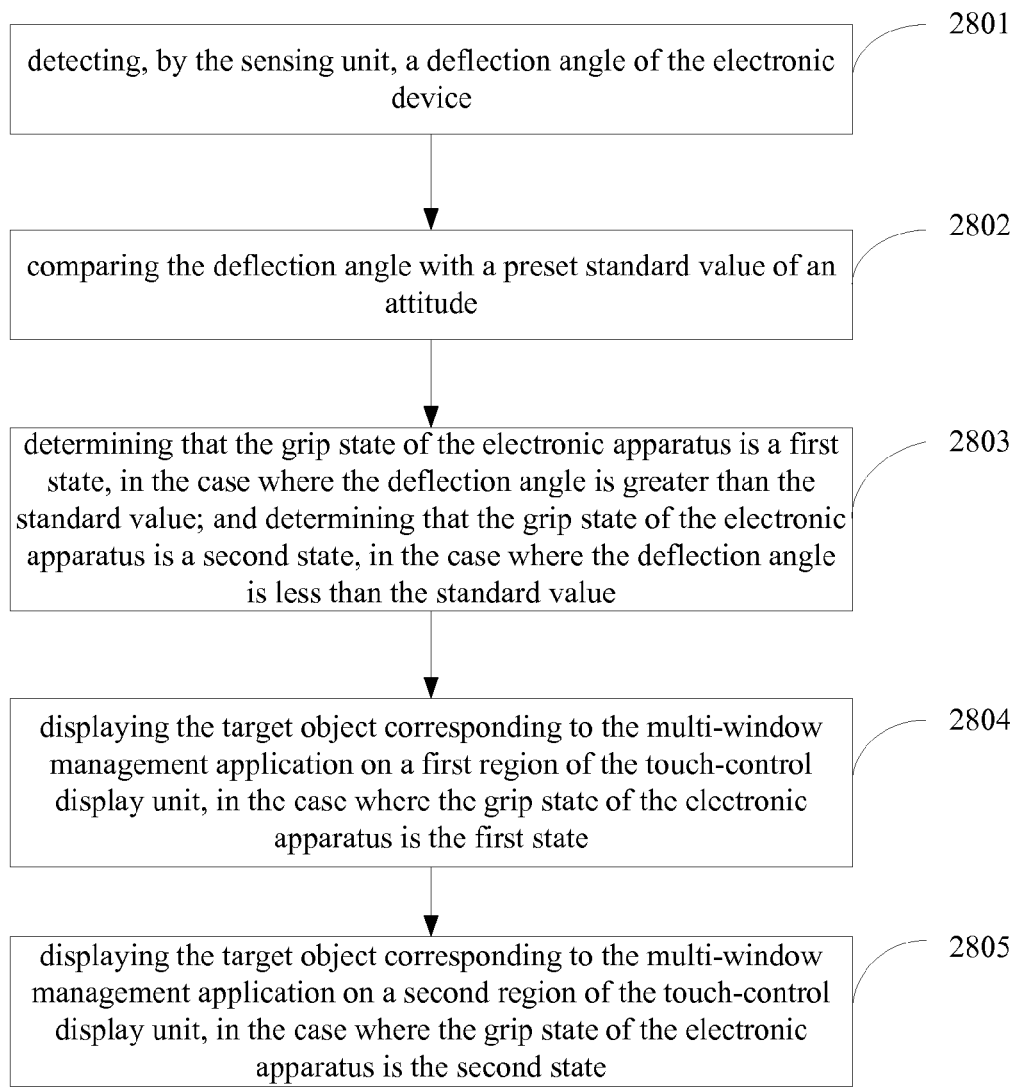
FIG. 28 is a schematic flowchart of a method for processing information according to a twenty-ninth embodiment of the present invention.

FIG. 28 is a schematic flow chart of method for processing information according to the twenty-ninth embodiment of the present invention. The method for processing information according to this embodiment is applied to an electronic apparatus, the electronic apparatus is able to run a multi-window management application, and the electronic apparatus includes a touch-control display unit and a sensing unit. A target object corresponding to the multi-window management application is displayed on the touch-control display unit. A multi-window management interface may be displayed when the target object is touch-controlled, the multi-window management interface includes target objects corresponding to N first applications, with N being a positive integer. The first application may be initiated by using the target object corresponding to the first application, the initiated first application is displayed in a form of a small window on the touch-control display unit. A display region of the small window is smaller than a display region of a full screen window of the first application. The small window is transformed from the full screen window by using a first parameter. According to a preferred embodiment of the present invention, the method for processing information includes steps from step 2801 to step 2805.

In step 2801: detecting, by the sensing unit, a deflection angle of the electronic device.

Here, the sensing unit may be a deflection angle sensor embedded in the electronic apparatus. The deflection angle of the electronic apparatus may be detected by the deflection angle sensor, for example, the electronic apparatus deflects from the horizontal direction by 20 degrees.

According to this embodiment, the first application set by the electronic apparatus may be an application self-contained in the electronic apparatus system, such as a clock application and a camera application, and it may also be a third-party application set by a user, such as a wechat application and a game application.

Generally, all of the first applications are displayed in a form of a list of icons on a desktop of the electronic apparatus. One first application corresponds to one icon, the first application corresponding to the icon may be initiated by touch-controlling the icon. The first application is displayed in a form of the full screen window on a display screen of the electronic apparatus when the first application is initiated in the above-mentioned mode.

In the embodiments of the present invention, the first application supports small window display. The first application is displayed in a form of a small window on the touch-control display unit of the electronic apparatus when the first application is initiated in, but not limited to, the following mode.

The modes for initiating the first application may be: the first application is added into the multi-window management interface in advance, so that the first application supports the small window display; the multi-window management interface may be displayed by initiating the icon corresponding to the multi-window management application; and the first application is displayed in a form of a small window on the touch-control display unit of the electronic apparatus when the first application is initiated by using the multi-window management interface.

Therefore, the icon corresponding to the multi-window management application has to be displayed at a specific region on the touch-control display unit where the icon is easy to be touch-controlled when the icon is initiated. According to this embodiment, a grip state of the electronic apparatus is detected by the sensing unit, and then it may be determined whether the electronic apparatus is griped by a left hand or a right hand. The position of the icon corresponding to the multi-window management application has to be adjusted to the region on the touch-control display unit where the icon is easy to be touched by the left hand, if the electronic apparatus is griped by the left hand. And the position of the icon corresponding to the multi-window management application has to be adjusted to the region on the touch-control display unit where the icon is easy to be touched by the right hand, if the electronic apparatus is griped by the right hand.

According to this embodiment, the first parameter is at least one of: a parameter, a matrix, a parameter group and a parameter set. For example, the first parameter may be achieved by a first matrix, a transformation may be performed on the full screen window of the first application by using the first matrix according to formula (1).

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (1)$$

$$\begin{pmatrix} x_2 \\ y_2 \\ z_2 \end{pmatrix}$$

represents the coordinate vector of the small window, $x_2$ is the horizontal ordinate of the small window, $y_2$ is the vertical coordinate of the small window and $z_2$ is usually set to 1 by default.

$$M = \begin{pmatrix} M_{11} & M_{12} & M_{13} \\ M_{21} & M_{22} & M_{23} \\ M_{31} & M_{32} & M_{33} \end{pmatrix},$$

which represents the first matrix. The first matrix is a 3×3 matrix, $M_{ij}$ represents a element of the first matrix at row i and column j. The value of i is 1, 2 or 3, and the value of j is 1, 2 or 3.

$$\begin{pmatrix} x_1 \\ y_1 \\ z_1 \end{pmatrix}$$

represents the coordinate vector of the full screen window, $x_1$ is the horizontal ordinate of the full screen window, $y_1$ is the vertical coordinate of the full screen window and $z_1$ is usually set to 1 by default.

When performing a scaling transformation on the full screen window according to formula (1), four elements in $M_{ij}$ may be set as follows: $M_{11}=\alpha$, $M_{12}=0$, $M_{21}=0$ and $M_{22}=\beta$, and the other five elements may be arbitrarily set. Hence, formula (2) may be obtained by substituting the parameters set above into formula (1).

$$x_2 = \alpha \times x_1$$
$$y_2 = \beta \times y_1 \quad (2)$$

$\alpha$ is a horizontal coordinate scaling parameter, and $\beta$ is a vertical coordinate scaling parameter.

When performing a rotation transformation on the full screen window according to formula (1), four elements in $M_{ij}$ may be set as follows: $M_{11}=\cos\theta$, $M_{12}=\sin\theta$, $M_{21}=-\sin\theta$ and $M_{22}=\cos\theta$, and the other five elements may be arbitrarily set. Hence, formula (3) may be obtained by substituting the parameters set above into formula (1).

$$x_2 = \cos\theta \times x_1 + \sin\theta \times y_1$$
$$y_2 = -\sin\theta \times x_1 + \cos\theta \times y_1 \quad (3)$$

where $\theta$ is a rotation angle.

A translation transformation may be performed on the full screen window of the first application by using the first matrix according to formula (4).

$$\begin{pmatrix} x_2 \\ y_2 \\ z_2 \end{pmatrix} = \begin{pmatrix} M_{11} \\ M_{21} \\ M_{31} \end{pmatrix} \times \begin{pmatrix} x_1 \\ y_1 \\ z_1 \end{pmatrix} \quad (4)$$

When performing the translation transformation on the full screen window according to formula (4), three elements in $M_{ij}$ may be set as follows: $M_{11}=a$, $M_{21}=b$ and $M_{31}=0$. Hence, formula (5) may be obtained by substituting the parameters set above into formula (4).

$$x_2 = a + x_1$$
$$y_2 = b + y_1 \quad (5)$$

where a is a horizontal coordinate translation parameter, and b is a vertical coordinate translation parameter.

In step 2802: comparing the deflection angle with a preset standard value of an attitude.

The standard value characterizes a parameter value of the attitude in the case where the electronic apparatus is in a horizontal state. For example, the standard value may be 0 degree.

In step 2803: determining that the grip state of the electronic apparatus is a first state, in the case where the deflection angle is greater than the standard value; and determining that the grip state of the electronic apparatus is a second state, in the case where the deflection angle is less than the standard value.

According to this embodiment, the first state may be a left hand grip state or a right hand grip state. Correspondingly, the second state may be the right hand grip state or the left hand grip state.

Generally, the direction of the deflection angle of the electronic apparatus is a first direction in the case where the electronic apparatus is griped by the left hand, and the direction of the deflection angle of the electronic apparatus is a direction opposite to the first direction in the case where the electronic apparatus is griped by the right hand. Therefore, if it is assumed that the grip state of the electronic apparatus is the right hand grip state in the case where the deflection angle is greater than the standard value, the grip state of the electronic apparatus is the left hand grip state in the case where the deflection angle is less than the standard value. Similarly, if it is assumed that the grip state of the electronic apparatus is the right hand grip state in the case where the deflection angle is less than the standard value, the grip state of the electronic apparatus is the left hand grip state in the case where the deflection angle is greater than the standard value.

In step 2804: displaying the target object corresponding to the multi-window management application on a first region of the touch-control display unit, in the case where the grip state of the electronic apparatus is the first state.

According to this embodiment, the target object corresponding to the multi-window management application may be the icon corresponding to the multi-window management application, and the multi-window management application may be initiated by touch-controlling the icon.

The target object corresponding to the multi-window management application has to be displayed on the first region of the touch-control display unit where the target object is easy to be operated by the left hand, in the case where the first state is the left hand grip state.

Preferably, the first region may be determined in, but not limited to, the following modes.

First position information of the first region may be set by the electronic apparatus, for example, the first region may be a left region; or a range and a frequency of touch-controlling points on the touch-control display unit of the electronic apparatus touch-controlled by the left hand are collected in advance, and a region whose frequency of the touch-controlling points is the highest is determined as the first region.

In step 2805: displaying the target object corresponding to the multi-window management application on a second region of the touch-control display unit, in the case where the grip state of the electronic apparatus is the second state.

Corresponding to Step 2804, the second state may be the right hand grip state or the left hand grip state.

The target object corresponding to the multi-window management application has to be displayed on the second region of the touch-control display unit where the target object is easy to be operated by the right hand, in the case where the second state is the right hand grip state.

Preferably, the second region may be determined in, but not limited to, the following modes.

Second position information of the second region may be set by the electronic apparatus, for example, the second region may be a region on the right side; or a range and a frequency of touch-controlling points on the touch-control display unit of the electronic apparatus touch-controlled by the right hand are collected in advance, and a region whose frequency of the touch-controlling points is the highest is determined as the second region.

In the above embodiment, Step 2804 and Step 2805 are not performed in sequence.

According to the embodiments of the present invention, a target object corresponding to a multi-window management application is displayed on a region corresponding to a grip state of the electronic apparatus. Therefore, the target object corresponding to the multi-window management application can be displayed at the region on the electronic apparatus where the target object is easy to be operated, and thereby improving user experience.

Thirtieth Embodiment

Figure 29:
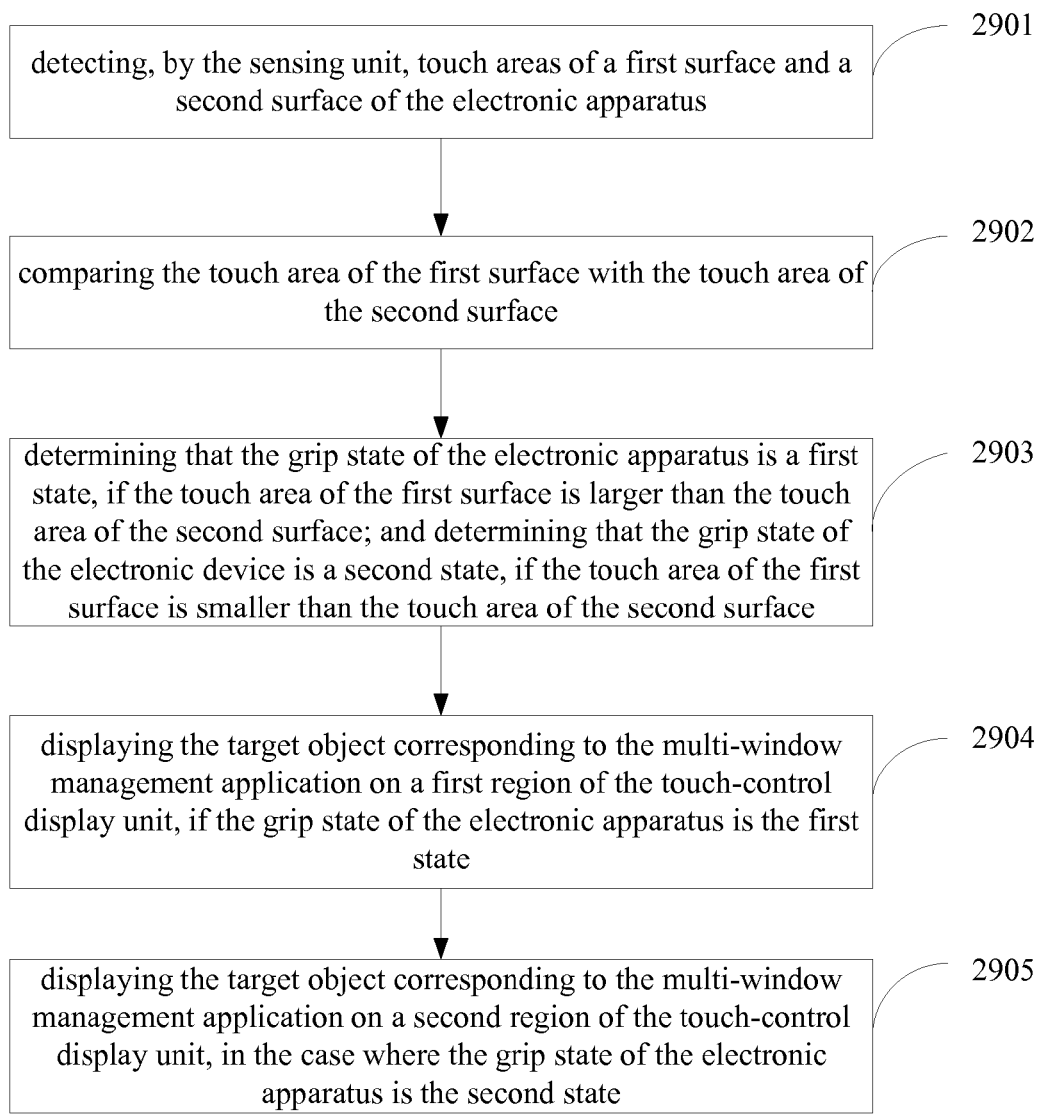
FIG. 29 is a schematic flowchart of a method for processing information according to a thirtieth embodiment of the present invention.

FIG. 29 is a schematic flow of a method for processing information according to a third embodiment of the present invention. The method for processing information according to this embodiment is applied to an electronic apparatus, the electronic apparatus is able to run a multi-window management application, and the electronic apparatus includes a touch-control display unit and a sensing unit. A target object corresponding to the multi-window management application is displayed on the touch-control display unit. A multi-window management interface may be displayed when the target object is touch-controlled, the multi-window management interface includes target objects corresponding to N first applications, with N being a positive integer. The first application may be initiated by using the target object corresponding to the first application, the initiated first application is displayed in a form of a small window on the touch-control display unit. A display region of the small window is smaller than a display region of a full screen window of the first application. The small window is transformed from the full screen window by using a first parameter.

The first parameter is at least one of: a parameter, a matrix, a parameter group and a parameter set. According to a preferred embodiment of the present invention, the method for processing information includes steps from step 2901 to step 2905.

In step 2901: detecting, by the sensing unit, touch areas of a first surface and a second surface of the electronic apparatus.

Here, the sensing unit may be a heat-sensitive sensor embedded in the electronic apparatus. The range of the area on the electronic apparatus touched by a user may be detected by the heat-sensitive sensor.

Here, the first surface may be a left surface of the electronic apparatus, correspondingly, the second surface may be a right surface of the electronic apparatus.

According to this embodiment, the first application set by the electronic apparatus may be an application self-contained in the electronic apparatus system, such as a clock application and a camera application, and it may also be a third-party application set by the user, such as a wechat application and a game application.

Generally, all of the first applications are displayed in a form of a list of icons on a desktop of the electronic apparatus. One first application corresponds to one icon, the first application corresponding to the icon may be initiated by touch-controlling the icon. The first application is displayed in a form of the full screen window on a display screen of the electronic apparatus when the first application is initiated in the above-mentioned mode.

In the embodiments of the present invention, the first application supports small window display. The first application is displayed in a form of a small window on the touch-control display unit of the electronic apparatus when the first application is initiated in, but not limited to, the following mode.

The modes for initiating the first application may be: the first application is added into the multi-window management interface in advance, so that the first application supports the small window display; the multi-window management interface may be displayed by initiating the icon corresponding to the multi-window management application; and the first application is displayed in a form of a small window on the touch-control display unit of the electronic apparatus when the first application is initiated by using the multi-window management interface.

Therefore, the icon corresponding to the multi-window management application has to be displayed at a specific region on the touch-control display unit where the icon is easy to be touch-controlled when the icon is initiated. According to this embodiment, a grip state of the electronic apparatus is detected by the sensing unit, and then it may be determined whether the electronic apparatus is griped by a left hand or a right hand. The position of the icon corresponding to the multi-window management application has to be adjusted to the region on the touch-control display unit where the icon is easy to be touched by the left hand, in the case where the electronic apparatus is griped by the left hand. And the position of the icon corresponding to the multi-window management application has to be adjusted to the region on the touch-control display unit where the icon is easy to be touched by the right hand, in the case where the electronic apparatus is griped by the right hand.

In step 2902: comparing the touch area of the first surface with the touch area of the second surface.

Generally, the area on the left surface touched by the user is different from the area on the right surface touched by the user in the case where the electronic apparatus is griped by the user. Generally, the touch area of the left surface is larger and the touch area of the right surface is smaller, in the case where the electronic apparatus is griped by the left hand. Therefore, the grip state of the electronic apparatus may be determined by comparing the touch area of the left surface with the touch area of the right surface.

In step 2903: determining that the grip state of the electronic apparatus is a first state, if the touch area of the first surface is larger than the touch area of the second surface; and determining that the grip state of the electronic device is a second state, if the touch area of the first surface is smaller than the touch area of the second surface.

According to this embodiment, the first state may be a left hand grip state or a right hand grip state. Correspondingly, the second state may be the right hand grip state or the left hand grip state.

If it is assumed that the grip state of the electronic apparatus is the left hand grip state in the case where the touch area of the first surface is larger than the touch area of the second surface, the grip state of the electronic apparatus is the right hand grip state in the case where the touch area of the first surface is smaller than the touch area of the second surface. Alternatively, if it is assumed that the grip state of the electronic device is the left hand grip state in the case where the touch area of the first surface is smaller than the touch area of the second surface, the grip state of the electronic apparatus is the right hand grip state in the case where the touch area of the first surface is larger than the touch area of the second surface.

In step 2904: displaying the target object corresponding to the multi-window management application on a first region of the touch-control display unit, if the grip state of the electronic apparatus is the first state.

According to this embodiment, the target object corresponding to the multi-window management application may be the icon corresponding to the multi-window management application, and the multi-window management application may be initiated by touch-controlling the icon.

The target object corresponding to the multi-window management application has to be displayed on the first region of the touch-control display unit where the target object is easy to be operated by the left hand, in the case where the first state is the left hand grip state.

Preferably, the first region may be determined in, but not limited to, the following modes.

First position information of the first region may be set by the electronic apparatus, for example, the first region may be a left region; or a range and a frequency of touch-controlling points on the touch-control display unit of the electronic apparatus touch-controlled by the left hand are collected in advance, and a region whose frequency of the touch-controlling points is the highest is determined as the first region.

In step 2905: displaying the target object corresponding to the multi-window management application on a second region of the touch-control display unit, in the case where the grip state of the electronic apparatus is the second state.

Corresponding to Step 2904, the second state may be the right hand grip state or the left hand grip state.

The target object corresponding to the multi-window management application has to be displayed on the second region of the touch-control display unit where the target object is easy to be operated by the right hand, in the case where the second state is the right hand grip state.

Preferably, the second region may be determined in, but not limited to, the following modes.

Second position information of the second region may be set by the electronic apparatus, for example, the second region may be a region on the right side; or a range and a frequency of touch-controlling points on the touch-control display unit of the electronic apparatus touch-controlled by the right hand are collected in advance, and a region whose frequency of the touch-controlling points is the highest is determined as the second region.

In the above embodiment, Step 2904 and Step 2905 are not performed in sequence.

According to the embodiments of the present invention, a target object corresponding to a multi-window management application is displayed on a region corresponding to a grip state of the electronic apparatus. Therefore, the target object corresponding to the multi-window management application can be displayed at the region on the electronic apparatus where the target object is easy to be operated, and thereby improving user experience.

Thirty-First Embodiment

Figure 30:
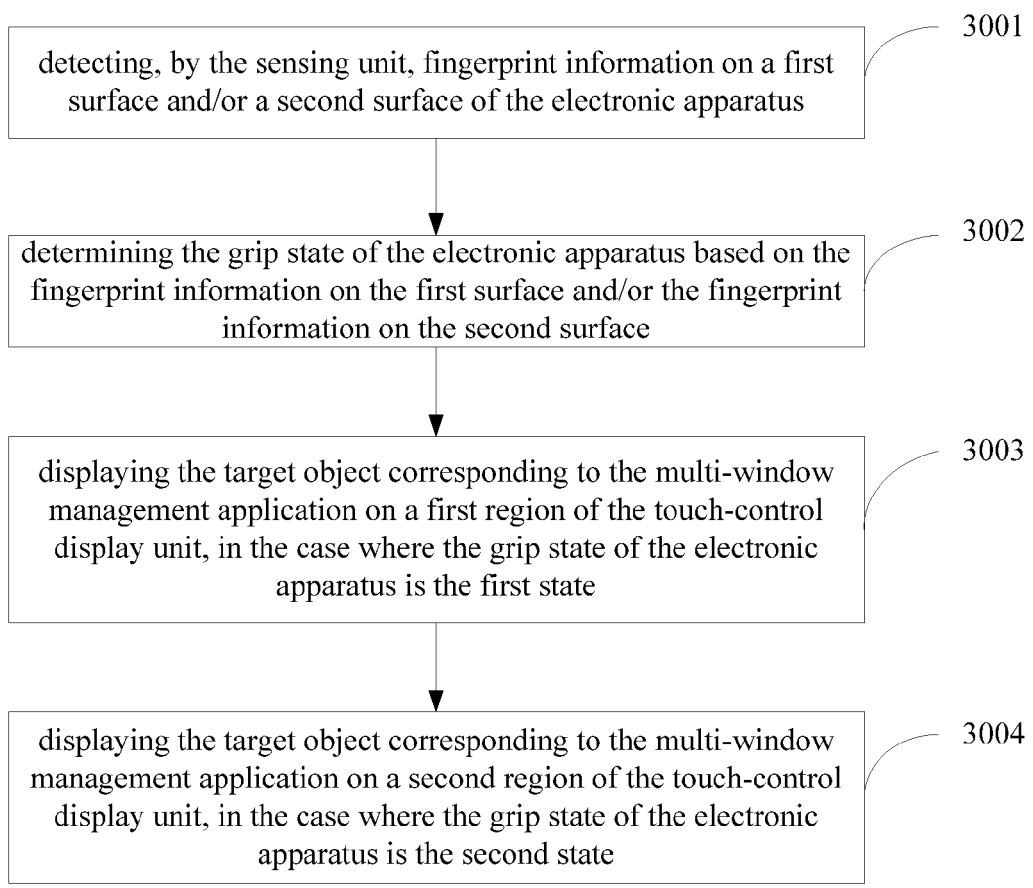
FIG. 30 is a schematic flowchart of a method for processing information according to a thirty-first embodiment of the present invention.

FIG. 30 is a schematic flow chart of a method for processing information according to the thirty-first embodiment of the present invention. The method for processing information according to this embodiment is applied to an electronic apparatus, the electronic apparatus is able to run a multi-window management application, and the electronic apparatus includes a touch-control display unit and a sensing unit. A target object corresponding to the multi-window management application is displayed on the touch-control display unit. A multi-window management interface may be displayed when the target object is touch-controlled, and the multi-window management interface includes target objects corresponding to N first applications, with N being a positive integer. The first application may be initiated by using the target object corresponding to the first application, the initiated first application is displayed in a form of a small window on the touch-control display unit. A display region of the small window is smaller than a display region of a full screen window of the first application. The small window is transformed from the full screen window by using a first parameter. The first parameter is at least one of: a parameter, a matrix, a parameter group and a parameter set. According to a preferred embodiment of the present invention, the method for processing information includes steps from step 3001 to step 3004.

In step 3001: detecting, by the sensing unit, fingerprint information on a first surface and/or a second surface of the electronic apparatus.

Here, the sensing unit may be a fingerprint recognizer embedded in the electronic apparatus. The fingerprint on the electronic apparatus touched by a user may be detected by the fingerprint recognizer.

Here, the first surface may be a left surface of the electronic apparatus, correspondingly, the second surface may be a right surface of the electronic apparatus.

According to this embodiment, the first application set by the electronic apparatus may be an application self-contained in the electronic apparatus system, such as a clock application and a camera application, and it may also be a third-party application set by the user, such as a wechat application and a game application.

Generally, all of the first applications are displayed in a form of a list of icons on a desktop of the electronic apparatus. One first application corresponds to one icon, and the first application corresponding to the icon may be initiated by touch-controlling the icon. The first application is displayed in a form of the full screen window on a display screen of the electronic apparatus when the first application is initiated in the above-mentioned mode.

In the embodiments of the present invention, the first application supports small window display. The first application is displayed in a form of a small window on the touch-control display unit of the electronic apparatus when the first application is initiated in, but not limited to, the following mode.

The modes for initiating the first application may be: the first application is added into the multi-window management interface in advance, so that the first application supports the small window display; the multi-window management interface may be displayed by initiating the icon corresponding to the multi-window management application; and the first application is displayed in a form of a small window on the touch-control display unit of the electronic apparatus when the first application is initiated by using the multi-window management interface.

Therefore, the icon corresponding to the multi-window management application has to be displayed at a specific region on the touch-control display unit where the icon is easy to be touch-controlled when the icon is initiated. According to this embodiment, a grip state of the electronic apparatus is detected by the sensing unit, and then it may be determined whether the electronic apparatus is griped by a left hand or a right hand. The position of the icon corresponding to the multi-window management application has to be adjusted to the region on the touch-control display unit where the icon is easy to be touched by the left hand, in the case where the electronic apparatus is griped by the left hand. And the position of the icon corresponding to the multi-window management application has to be adjusted to the region on the touch-control display unit where the icon is easy to be touched by the right hand, in the case where the electronic apparatus is griped by the right hand.

In step 3002: determining the grip state of the electronic apparatus based on the fingerprint information on the first surface and/or the fingerprint information on the second surface.

According this embodiment, the grip state includes a first state and a second state. The first state may be a left hand grip state or a right hand grip state. Correspondingly, the second state may be the right hand grip state or the left hand grip state.

According this embodiment, the first surface may be the left surface of the electronic apparatus, and the second surface may be the right surface of the electronic apparatus. The grip state of the electronic apparatus is the left hand grip state i.e. the first state, in the case where the fingerprint information of a thumb is detected on the left surface of the electronic apparatus. The grip state of the electronic device is the right hand grip state i.e. the second state, in the case where the fingerprint information of one or more fingers that are not the thumb is detected on the left surface of the electronic apparatus. Alternatively, the grip state of the electronic apparatus may also be determined by detecting the fingerprint information on the second surface of the electronic apparatus.

Step 3003: displaying the target object corresponding to the multi-window management application on a first region of the touch-control display unit, in the case where the grip state of the electronic apparatus is the first state.

According to this embodiment, the target object corresponding to the multi-window management application may be the icon corresponding to the multi-window management application, and the multi-window management application may be initiated by touch-controlling the icon.

The target object corresponding to the multi-window management application has to be displayed on the first region of the touch-control display unit where the target object is easy to be operated by the left hand, in the case where the first state is the left hand grip state.

Preferably, the first region may be determined in, but not limited to, the following modes.

First position information of the first region may be set by the electronic apparatus, for example, the first region may be a left region; or a range and a frequency of touch-controlling points on the touch-control display unit of the electronic apparatus touch-controlled by the left hand are collected in advance, and a region whose frequency of the touch-controlling points is the highest is determined as the first region.

In step 3004: displaying the target object corresponding to the multi-window management application on a second region of the touch-control display unit, in the case where the grip state of the electronic apparatus is the second state.

Corresponding to Step 3003, the second state may be the right hand grip state or the left hand grip state.

The target object corresponding to the multi-window management application has to be displayed on the second region of the touch-control display unit where the target object is easy to be operated by the right hand, in the case where the second state is the right hand grip state.

Preferably, the second region may be determined in, but not limited to, the following modes.

Second position information of the second region may be set by the electronic apparatus, for example, the second region may be a region on the right side; or a range and a frequency of touch-controlling points on the touch-control display unit of the electronic apparatus touch-controlled by the right hand are collected in advance, and a region whose frequency of the touch-controlling points is the highest is determined as the second region.

In the above embodiment, Step 3003 and Step 3004 are not performed in sequence.

According to the embodiments of the present invention, a target object corresponding to a multi-window management application is displayed on a region corresponding to a grip state of the electronic apparatus. Therefore, the target object corresponding to the multi-window management application can be displayed at the region on the electronic apparatus where the target object is easy to be operated, and thereby improving user experience.

Thirty-Second Embodiment

Figure 31:
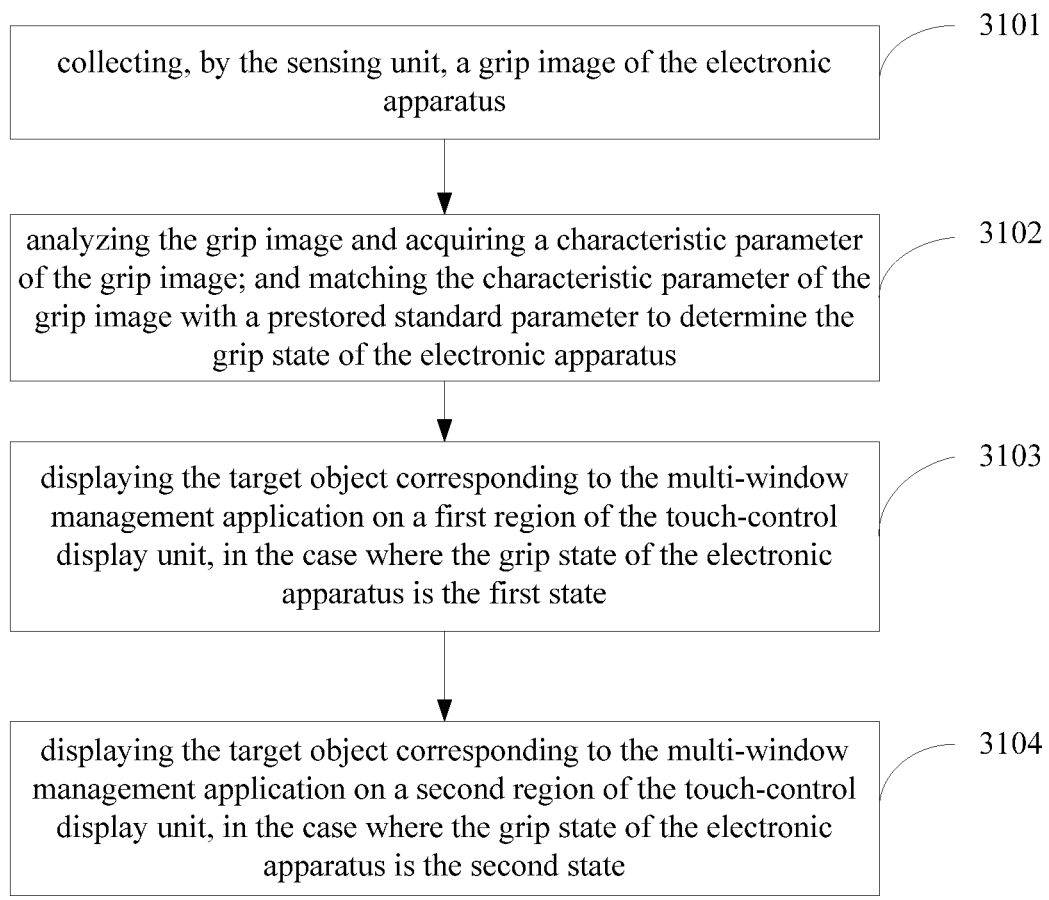
FIG. 31 is a schematic flowchart of a method for processing information according to a thirty-second embodiment of the present invention.

FIG. 31 is a schematic flow chart of method for processing information according to the thirty-second embodiment of the present invention. The method for processing information according to this embodiment is applied to an electronic apparatus, the electronic apparatus is able to run a multi-window management application, and the electronic apparatus includes a touch-control display unit and a sensing unit. A target object corresponding to the multi-window management application is displayed on the touch-control display unit. A multi-window management interface may be displayed when the target object is touch-controlled, the multi-window management interface includes target objects corresponding to N first applications, with N being a positive integer. The first application may be initiated by using the target object corresponding to the first application, the initiated first application is displayed in a form of a small window on the touch-control display unit. A display region of the small window is smaller than a display region of a full screen window of the first application. The small window is transformed from the full screen window by using a first parameter. The first parameter is at least one of: a parameter, a matrix, a parameter group and a parameter set. According to a preferred embodiment of the present invention, the method for processing information includes steps from step 3101 to step 3104.

In step 3101: collecting, by the sensing unit, a grip image of the electronic apparatus.

Here, the sensing unit may be an external camera for the electronic apparatus, and the grip image of the electronic apparatus may be captured and collected by the camera. The grip image of the electronic apparatus refers to an image of the hand which grips the electronic apparatus.

According to this embodiment, the first application set by the electronic apparatus may be an application self-contained in the electronic apparatus system, such as a clock application and a camera application, and it may also be a third-party application set by the user, such as a Wechat application and a game application.

Generally, all of the first applications are displayed in a form of a list of icons on a desktop of the electronic apparatus. One first application corresponds to one icon, and the first application corresponding to the icon may be initiated by touch-controlling the icon. The first application is displayed in a form of the full screen window on a display screen of the electronic apparatus when the first application is initiated in the above-mentioned mode.

In the embodiment of the present invention, the first application supports small window display. The first application is displayed in a form of a small window on the touch-control display unit of the electronic apparatus when the first application is initiated in, but not limited to, the following mode.

The modes for initiating the first application may be: the first application is added into the multi-window management interface in advance, so that the first application supports the small window display; the multi-window management interface may be displayed by initiating the icon corresponding to the multi-window management application; and the first application is displayed in a form of a small window on the touch-control display unit of the electronic apparatus when the first application is initiated by using the multi-window management interface.

Therefore, the icon corresponding to the multi-window management application has to be displayed at a specific region on the touch-control display unit where the icon is easy to be touch-controlled when the icon is initiated. According to this embodiment, a grip state of the electronic apparatus is detected by the sensing unit, and then it may be determined whether the electronic apparatus is griped by a left hand or a right hand. The position of the icon corresponding to the multi-window management application has to be adjusted to the region on the touch-control display unit where the icon is easy to be touched by the left hand, in the case where the electronic apparatus is griped by the left hand. And the position of the icon corresponding to the multi-window management application has to be adjusted to the region on the touch-control display unit where the icon is easy to be touched by the right hand, in the case where the electronic apparatus is griped by the right hand.

In step 3102: analyzing the grip image and acquiring a characteristic parameter of the grip image; and matching the characteristic parameter of the grip image with a prestored standard parameter to determine the grip state of the electronic apparatus.

Here, the characteristic parameter of the grip image may be a parameter about a finger shape and so on, and the standard parameter is prestored in the electronic apparatus. The standard parameter characterizes that the grip state of the electronic apparatus is a first state in the case where the finger shape is a first shape, and the grip state of the electronic apparatus is a second state in the case where the finger shape is a second shape. The current grip state of the electronic apparatus is the first state in the case where the finger shape collected currently matches the first shape, and the current grip state of the electronic apparatus is the second state in the case where the finger shape collected currently matches the second shape.

The first state may be a left hand grip state or a right hand grip state. Alternatively, the second state may be the right hand grip state or the left hand grip state.

In step 3103: displaying the target object corresponding to the multi-window management application on a first region of the touch-control display unit, in the case where the grip state of the electronic apparatus is the first state.

According to this embodiment, the target object corresponding to the multi-window management application may be the icon corresponding to the multi-window management application, and the multi-window management application may be initiated by touch-controlling the icon.

The target object corresponding to the multi-window management application has to be displayed on the first region of the touch-control display unit where the target object is easy to be operated by the left hand, in the case where the first state is the left hand grip state.

Preferably, the first region may be determined in, but not limited to, the following modes.

First position information of the first region may be set by the electronic apparatus, for example, the first region may be a left region; or a range and a frequency of touch-controlling points on the touch-control display unit of the electronic apparatus touch-controlled by the left hand are collected in advance, and a region whose frequency of the touch-controlling points is the highest is determined as the first region.

In step 3104: displaying the target object corresponding to the multi-window management application on a second region of the touch-control display unit, in the case where the grip state of the electronic apparatus is the second state.

Corresponding to Step 3103, the second state may be the right hand grip state or the left hand grip state.

The target object corresponding to the multi-window management application has to be displayed on the second region of the touch-control display unit where the target object is easy to be operated by the right hand, in the case where the second state is the right hand grip state.

Preferably, the second region may be determined in, but not limited to, the following modes.

Second position information of the second region may be set by the electronic apparatus, for example, the second region may be a region on the right side; or a range and a frequency of touch-controlling points on the touch-control display unit of the electronic apparatus touch-controlled by the right hand are collected in advance, and a region whose frequency of the touch-controlling points is the highest is determined as the second region.

In the above embodiment, step 3103 and step 3104 are not performed in sequence.

According to the embodiments of the present invention, a target object corresponding to a multi-window management application is displayed on a region corresponding to a grip state of the electronic apparatus. Therefore, the target object corresponding to the multi-window management application can be displayed at the region on the electronic apparatus where the target object is easy to be operated, and thereby improving user experience.

Thirty-Third Embodiment

Figure 32:
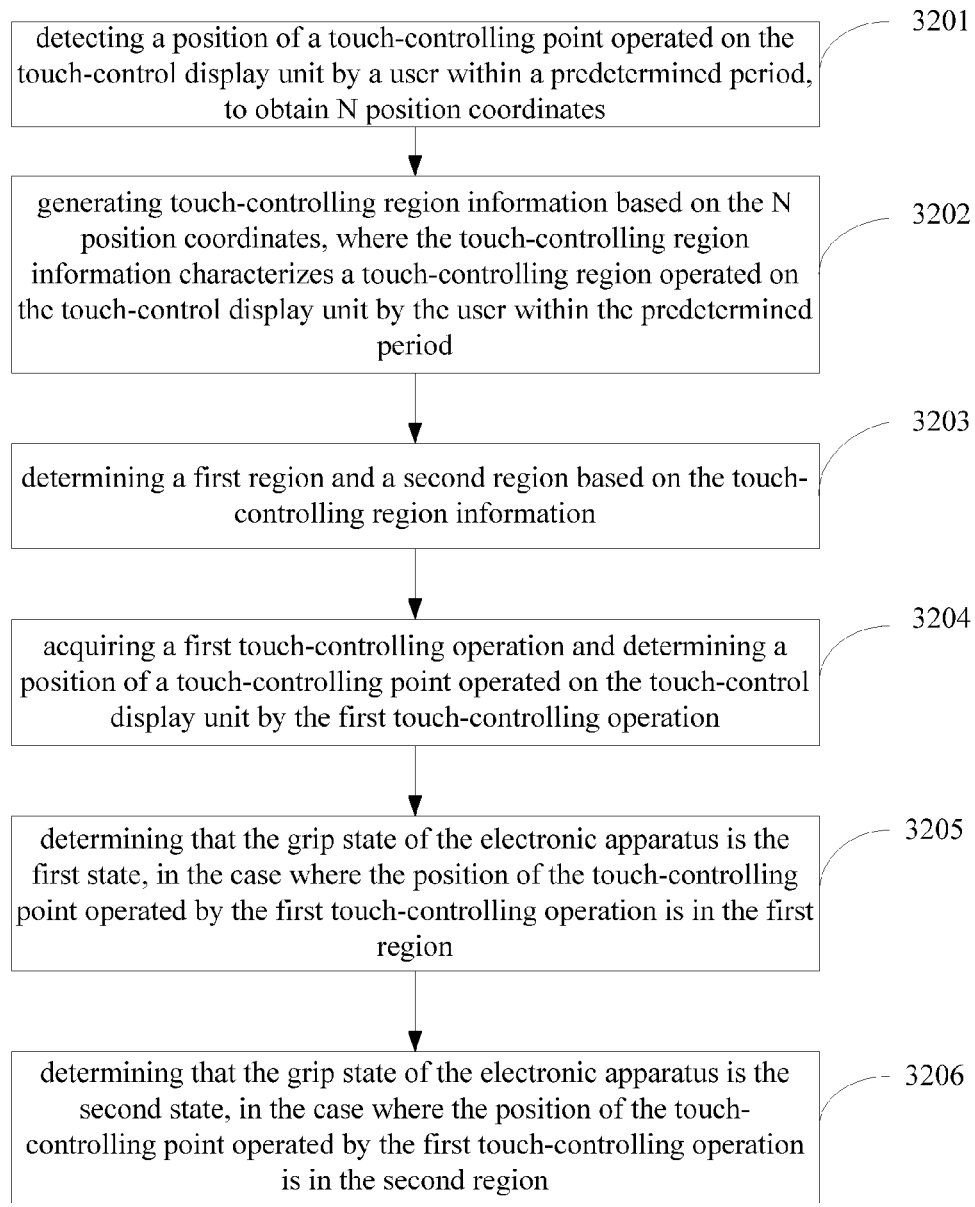
FIG. 32 is a schematic flowchart of a method for processing information according to a thirty-third embodiment of the present invention.

FIG. 32 is a schematic flow chart of a method for processing information according to the thirty-third embodiment of the present invention. The method for processing information according to this embodiment is applied to an electronic apparatus, the electronic apparatus is able to run a multi-window management application, and the electronic apparatus includes a touch-control display unit and a sensing unit. A target object corresponding to the multi-window management application is displayed on the touch-control display unit. A multi-window management interface may be displayed when the target object is touch-controlled, and the multi-window management interface includes target objects corresponding to N first applications, with N being a positive integer. The first application may be initiated by using the target object corresponding to the first application, the initiated first application is displayed in a form of a small window on the touch-control display unit. A display region of the small window is smaller than a display region of a full screen window of the first application. The small window is transformed from the full screen window by using a first parameter. The first parameter is at least one of: a parameter, a matrix, a parameter group and a parameter set. According to a preferred embodiment of the present invention, the method for processing information includes steps from step 3201 to step 3206.

In step 3201: detecting a position of a touch-controlling point operated on the touch-control display unit by a user within a predetermined period, to obtain N position coordinates, with N being an integer greater than or equal to 1.

Here, the predetermined period may be a time period of one day, one week or one month etc., and it may be set according to the practice.

For example, a certain region may be touch-controlled frequently when the user touch-controls the touch-control display unit by a left hand. Then the positions of the touch-controlling points on this region may be detected to characterize the information of the region where the user often performs the touch-control.

According to this embodiment, the first application set by the electronic apparatus may be an application self-contained in the electronic apparatus system, such as a clock application and a camera application, and it may also be a third-party application set by the user, such as a wechat application and a game application.

Generally, all of the first applications are displayed in a form of a list of icons on a desktop of the electronic apparatus. One first application corresponds to one icon, and the first application corresponding to the icon may be initiated by touch-controlling the icon. The first application is displayed in a form of the full screen window on a display screen of the electronic apparatus when the first application is initiated in the above-mentioned mode.

In the embodiment of the present invention, the first application supports small window display. The first application is displayed in a form of a small window on the touch-control display touch-control display unit of the electronic apparatus when the first application is initiated in, but not limited to, the following mode.

The modes for initiating the first application may be: the first application is added into the multi-window management interface in advance, so that the first application supports the small window display; the multi-window management interface may be displayed by initiating the icon corresponding to the multi-window management application; and the first application is displayed in a form of a small window on the touch-control display unit of the electronic apparatus when the first application is initiated by using the multi-window management interface.

Therefore, the icon corresponding to the multi-window management application has to be displayed at a specific region on the touch-control display unit where the icon is easy to be touch-controlled when the icon is initiated. According to this embodiment, a grip state of the electronic apparatus is detected by the sensing unit, and then it may be determined whether the electronic apparatus is griped by the left hand or a right hand. The position of the icon corresponding to the multi-window management application has to be adjusted to the region on the touch-control display unit where the icon is easy to be touched by the left hand, in the case where the electronic apparatus is griped by the left hand. And the position of the icon corresponding to the multi-window management application has to be adjusted to the region on the touch-control display unit where the icon is easy to be touched by the right hand, in the case where the electronic apparatus is griped by the right hand.

In step 3202: generating touch-controlling region information based on the N position coordinates, where the touch-controlling region information characterizes a touch-controlling region operated on the touch-control display unit by the user within the predetermined period.

Subsequent to step 3201, the touch-controlling region information characterizes the touch-controlling region where the user often operates on the touch-control display unit within the predetermined period. For example, the region where the user often operates is a left region of the touch-control display unit when the user touch-controls the touch-control display unit by the left hand.

In step 3203: determining a first region and a second region based on the touch-controlling region information.

Here, if the first region corresponds to the case where the electronic apparatus is griped by the left hand, the second region corresponds to the case where the electronic apparatus is griped by the right hand. Alternatively, if the first region corresponds to the case where the electronic apparatus is griped by the right hand, the second region corresponds to the case where the electronic apparatus is griped by the left hand.

In step 3204: acquiring a first touch-controlling operation and determining a position of a touch-controlling point operated on the touch-control display unit by the first touch-controlling operation.

Here, the first touch-controlling operation is an operation that the user touches an arbitrary region of the touch-control display unit.

In step 3205: determining that the grip state of the electronic apparatus is the first state, in the case where the position of the touch-controlling point operated by the first touch-controlling operation is in the first region.

Here, the first state may be a left hand grip state or a right hand grip state.

In step 3206: determining that the grip state of the electronic apparatus is the second state, in the case where the position of the touch-controlling point operated by the first touch-controlling operation is in the second region.

Corresponding to step 3205, the second state may be the right hand grip state or the left hand grip state.

The target object corresponding to the multi-window management application has to be displayed on the second region of the touch-control display unit where the target object is easy to be operated by the right hand, if the second state is the right hand grip state.

In the above embodiment, step 3205 and step 3206 are not performed in sequence.

According to the embodiments of the present invention, a target object corresponding to a multi-window management application is displayed on a region corresponding to a grip state of the electronic apparatus. Therefore, the target object corresponding to the multi-window management application can be displayed at the region on the electronic apparatus where the target object is easy to be operated, and thereby improving user experience.

Thirty-Fourth Embodiment

Figure 33:
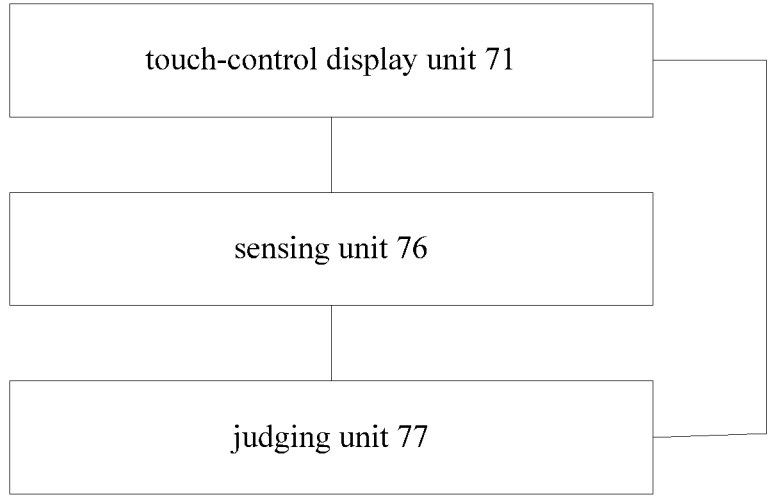
FIG. 33 is a schematic diagram of an electronic apparatus according to a thirty-fourth embodiment of the present invention.

FIG. 33 is a schematic structural diagram of an electronic apparatus according to the thirty-fourth embodiment of the present invention. The electronic apparatus according to this embodiment is able to run a multi-window management application. According to a preferred embodiment of the present invention, the electronic apparatus includes a touch-control display unit 71, a sensing unit 76 and a judging unit 77.

The touch-control display unit 71 is configured to display a target object corresponding to the multi-window management application; a multi-window management interface is displayed when the target object is touch-controlled, the multi-window management interface includes target objects corresponding to N first applications, with N being a positive integer; the first application is displayed in a form of a small window when the first application is initiated by using the target object corresponding to the first application; a display region of the small window is smaller than a display region of a full screen window of the first application; the small window is transformed from the full screen window by using a first parameter.

The sensing unit 76 is configured to detect a grip state of the electronic apparatus.

The judging unit 77 is configured to send a first triggering instruction to the touch-control display unit 71 in the case where the grip state of the electronic apparatus is a first state; and to send a second triggering instruction to the touch-control display unit 71 in the case where the grip state of the electronic apparatus is a second state.

Correspondingly, the touch-control display unit 71 is further configured to display the target object on a first region when the first triggering instruction sent by the judging unit 77 is received; and to display the target object on a second region when the second triggering instruction sent by the judging unit 73 is received.

In the above embodiment, the first parameter is at least one of: a parameter, a matrix, a parameter group and a parameter set.

It should be understood by those ordinary skilled in the art that the function achieved by each of the units of the electronic apparatus shown in FIG. 33 may be understood with reference to the description of the above method for processing information.

Thirty-Fifth Embodiment

Figure 34:
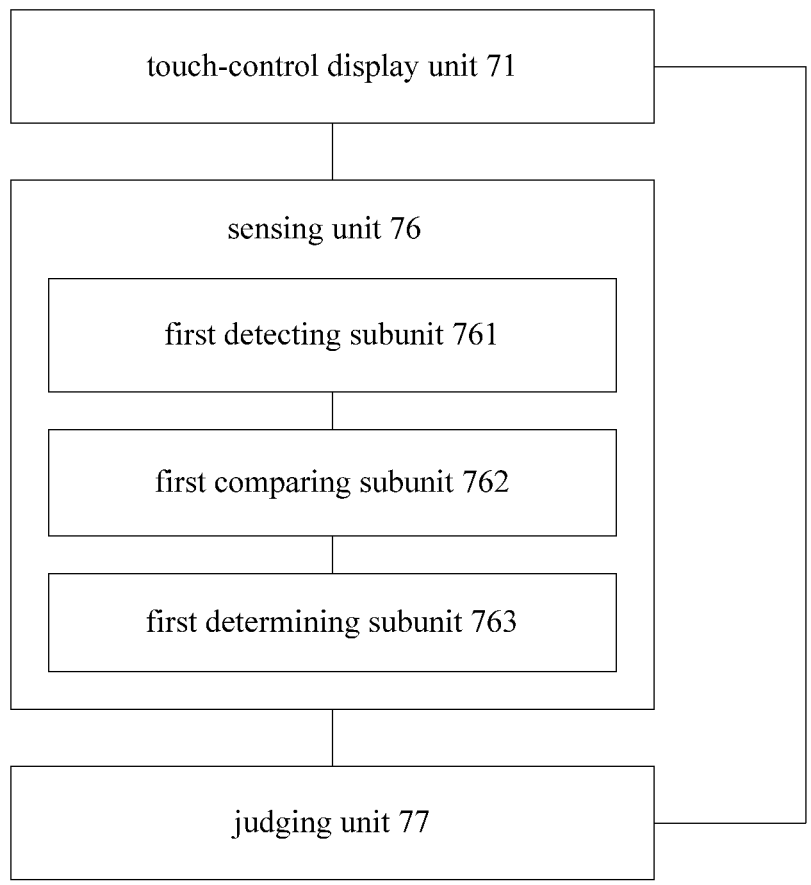
FIG. 34 is a schematic diagram of an electronic apparatus according to a thirty-fifth embodiment of the present invention.

FIG. 34 is a schematic structural diagram of an electronic apparatus according to the thirty-fifth embodiment of the present invention. The electronic apparatus according to this embodiment is able to run a multi-window management application. According to a preferred embodiment of the present invention, the electronic apparatus includes a touch-control display unit 71, a sensing unit 76 and a judging unit 77.

The touch-control display unit 71 is configured to display a target object corresponding to the multi-window management application; a multi-window management interface is displayed when the target object is touch-controlled, the multi-window management interface includes target objects corresponding to N first applications, with N being a positive integer; the first application is displayed in a form of a small window when the first application is initiated by using the target object corresponding to the first application; a display region of the small window is smaller than a display region of a full screen window of the first application; the small window is transformed from the full screen window by using a first parameter.

The sensing unit 76 is configured to detect a grip state of the electronic apparatus.

The judging unit 77 is configured to send a first triggering instruction to the touch-control display unit 71 in the case where the grip state of the electronic apparatus is a first state; and to send a second triggering instruction to the touch-control display unit 71 in the case where the grip state of the electronic apparatus is a second state.

Correspondingly, the touch-control display unit 71 is further configured to display the target object on a first region when the first triggering instruction sent by the judging unit 77 is received; and to display the target object on a second region when the second triggering instruction sent by the judging unit 77 is received.

Preferably, the sensing unit 76 includes a first detecting subunit 761, a first comparing subunit 762 and a first determining subunit 763.

The first detecting subunit 761 is configured to detect a deflection angle of the electronic apparatus.

The first comparing subunit 762 is configured to compare the deflection angle with a preset standard value of an attitude, where the standard value characterizes a parameter value of the attitude in the case where the electronic apparatus is in a horizontal state.

The first determining subunit 763 is configured to determine that the grip state of the electronic apparatus is the first state, in the case where the deflection angle is greater than the standard value; and to determine that the grip state of the electronic apparatus is the second state, in the case where the deflection angle is less than the standard value.

In the above embodiment, the first parameter is at least one of: a parameter, a matrix, a parameter group and a parameter set.

It should be understood by those ordinary skilled in the art that the function achieved by each of the units and their subunits of the electronic apparatus shown in FIG. 34 may be understood with reference to the description of the above information processing method.

Thirty-Sixth Embodiment

Figure 35:
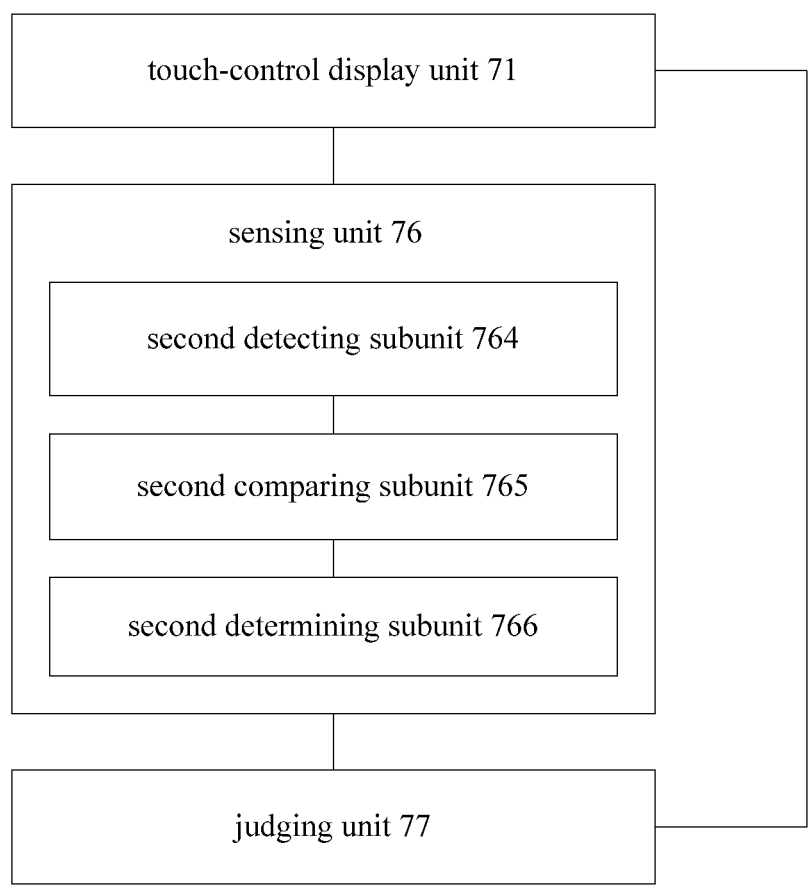
FIG. 35 is a schematic diagram of an electronic apparatus according to a thirty-sixth embodiment of the present invention.

FIG. 35 is a schematic structural diagram of an electronic apparatus according to the thirty-sixth embodiment of the present invention. The electronic apparatus according to this embodiment is able to run a multi-window management application. According to a preferred embodiment of the present invention, the electronic apparatus includes a touch-control display unit 71, a sensing unit 76 and a judging unit 77.

The touch-control display unit 71 is configured to display a target object corresponding to the multi-window management application; a multi-window management interface is displayed when the target object is touch-controlled, the multi-window management interface includes target objects corresponding to N first applications, with N being a positive integer; the first application is displayed in a form of a small window when the first application is initiated by using the target object corresponding to the first application; a display region of the small window is smaller than a display region of a full screen window of the first application; the small window is transformed from the full screen window by using a first parameter.

The sensing unit 76 is configured to detect a grip state of the electronic apparatus.

The judging unit 77 is configured to send a first triggering instruction to the touch-control display unit 71 in the case where the grip state of the electronic apparatus is a first state; and to send a second triggering instruction to the touch-control display unit 71 in the case where the grip state of the electronic apparatus is a second state.

Correspondingly, the touch-control display unit 71 is further configured to display the target object on a first region when the first triggering instruction sent by the judging unit 77 is received; and to display the target object on a second region when the second triggering instruction sent by the judging unit 77 is received.

Preferably, the sensing unit 76 includes a second detecting subunit 764, a second comparing subunit 765 and a second determining subunit 766.

The second detecting subunit 764 is configured to detect touch areas of a first surface and a second surface of the electronic apparatus.

The second comparing subunit 765 is configured to compare the touch area of the first surface with the touch area of the second surface.

The second determining subunit 766 is configured to determine that the grip state of the electronic apparatus is the first state, in the case where the touch area of the first surface is larger than the touch area of the second surface; and to determine that the grip state of the electronic apparatus is the second state, in the case where the touch area of the first surface is smaller than the touch area of the second surface.

In the above embodiment, the first parameter is at least one of: a parameter, a matrix, a parameter group and a parameter set.

It should be understood by those ordinary skilled in the art that the function achieved by each of the units and their subunits of the electronic apparatus shown in FIG. 35 may be understood with reference to the description of the above method for processing information.

Thirty-Seventh Embodiment

Figure 36:
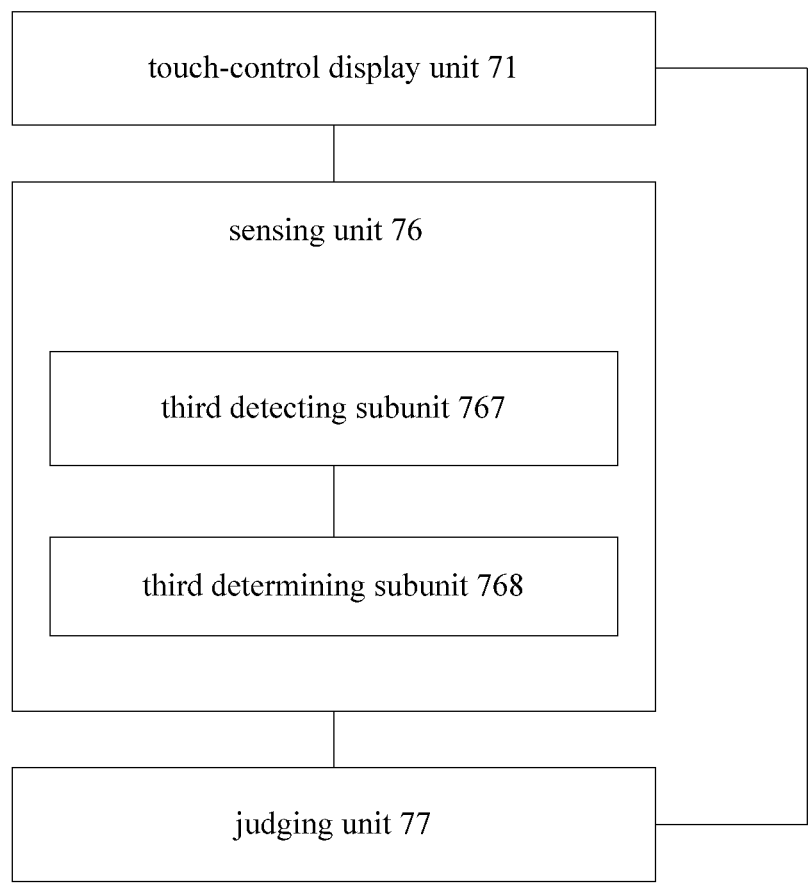
FIG. 36 is a schematic diagram of an electronic apparatus according to a thirty-seventh embodiment of the present invention.

FIG. 36 is a schematic structural diagram of an electronic apparatus according to the thirty-seventh embodiment of the present invention. The electronic apparatus according to this embodiment is able to run a multi-window management application. According to a preferred embodiment of the present invention, the electronic apparatus includes a touch-control display unit 71, a sensing unit 76 and a judging unit 77.

The touch-control display unit 71 is configured to display a target object corresponding to the multi-window management application; a multi-window management interface is displayed when the target object is touch-controlled, the multi-window management interface includes target objects corresponding to N first applications, with N being a positive integer; the first application is displayed in a form of a small window when the first application is initiated by using the target object corresponding to the first application; a display region of the small window is smaller than a display region of a full screen window of the first application; the small window is transformed from the full screen window by using a first parameter.

The sensing unit 76 is configured to detect a grip state of the electronic apparatus.

The judging unit 77 is configured to send a first triggering instruction to the touch-control display unit 71 in the case where the grip state of the electronic apparatus is a first state; and to send a second triggering instruction to the touch-control display unit 71 in the case where the grip state of the electronic apparatus is a second state.

Correspondingly, the touch-control display unit 71 is further configured to display the target object on a first region when the first triggering instruction sent by the judging unit 77 is received; and to display the target object on a second region when the second triggering instruction sent by the judging unit 77 is received.

Preferably, the sensing unit 76 includes a third detecting subunit 767 and a third determining subunit 768.

The third detecting subunit 767 is configured to detect, fingerprint information on a first surface and/or a second surface of the electronic apparatus.

The third determining subunit 768 is configured to determine the grip state of the electronic apparatus based on the fingerprint information on the first surface and/or the fingerprint information on the second surface.

In the above embodiment, the first parameter is at least one of: a parameter, a matrix, a parameter group and a parameter set.

It should be understood by those ordinary skilled in the art that the function achieved by each of the units and their subunits of the electronic apparatus shown in FIG. 36 may be understood with reference to the description of the above method for processing information.

Thirty-Eighth Embodiment

Figure 37:
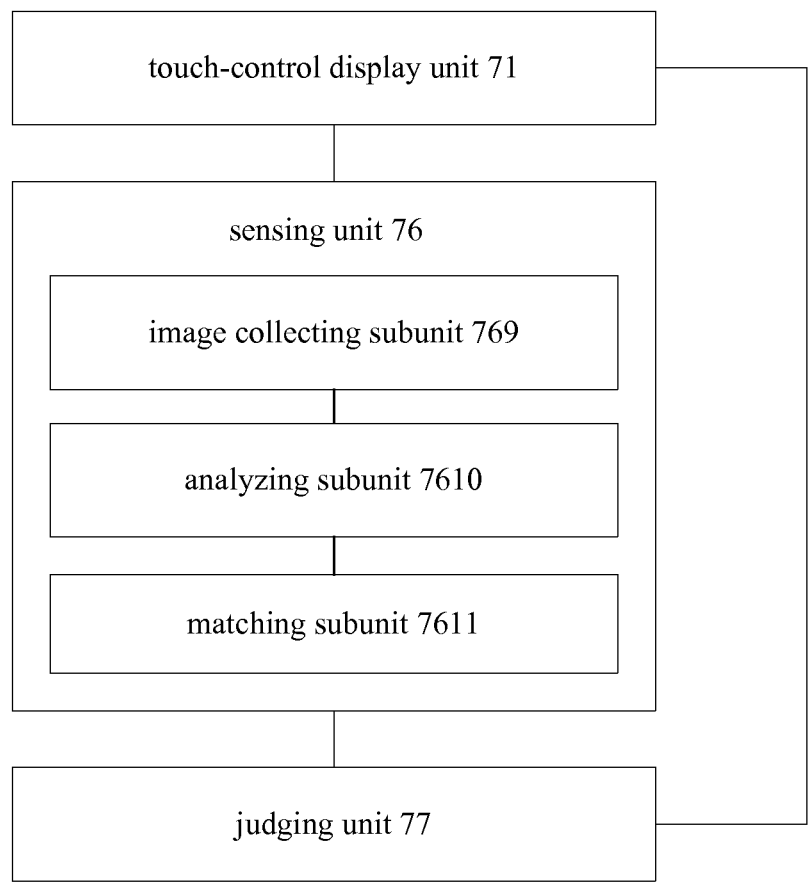
FIG. 37 is a schematic diagram of an electronic apparatus according to a thirty-eighth embodiment of the present invention.

FIG. 37 is a schematic structural diagram of an electronic apparatus according to the thirty-eighth embodiment of the present invention. The electronic apparatus according to this embodiment is able to run a multi-window management application. According to a preferred embodiment of the present invention, the electronic apparatus includes a touch-control display unit 71, a sensing unit 76 and a judging unit 77.

The touch-control display unit 71 is configured to display a target object corresponding to the multi-window management application; a multi-window management interface is displayed when the target object is touch-controlled, the multi-window management interface includes target objects corresponding to N first applications, with N being a positive integer; the first application is displayed in a form of a small window when the first application is initiated by using the target object corresponding to the first application; a display region of the small window is smaller than a display region of a full screen window of the first application; the small window is transformed from the full screen window by using a first parameter.

The sensing unit 76 is configured to detect a grip state of the electronic apparatus.

The judging unit 77 is configured to send a first triggering instruction to the touch-control display unit 71 in the case where the grip state of the electronic apparatus is a first state; and to send a second triggering instruction to the touch-control display unit 71 in the case where the grip state of the electronic apparatus is a second state.

Correspondingly, the touch-control display unit 71 is further configured to display the target object on a first region when the first triggering instruction sent by the judging unit 77 is received; and to display the target object on a second region when the second triggering instruction sent by the judging unit 77 is received.

Preferably, the sensing unit 76 includes an image collecting subunit 769, an analyzing subunit 7610 and a matching subunit 7611.

The image collecting subunit 769 is configured to collect a grip image of the electronic apparatus.

The analyzing subunit 7610 is configured to analyze the grip image and acquire a characteristic parameter of the grip image.

The matching subunit 7611 is configured to match the characteristic parameter of the grip image with a prestored standard parameter to determine the grip state of the electronic apparatus.

In the above embodiment, the first parameter is at least one of: a parameter, a matrix, a parameter group and a parameter set.

It should be understood by those ordinary skilled in the art that the function achieved by each of the units and their subunits of the electronic apparatus shown in FIG. 37 may be understood with reference to the description of the above method for processing information.

Thirty-Ninth Embodiment

Figure 38:
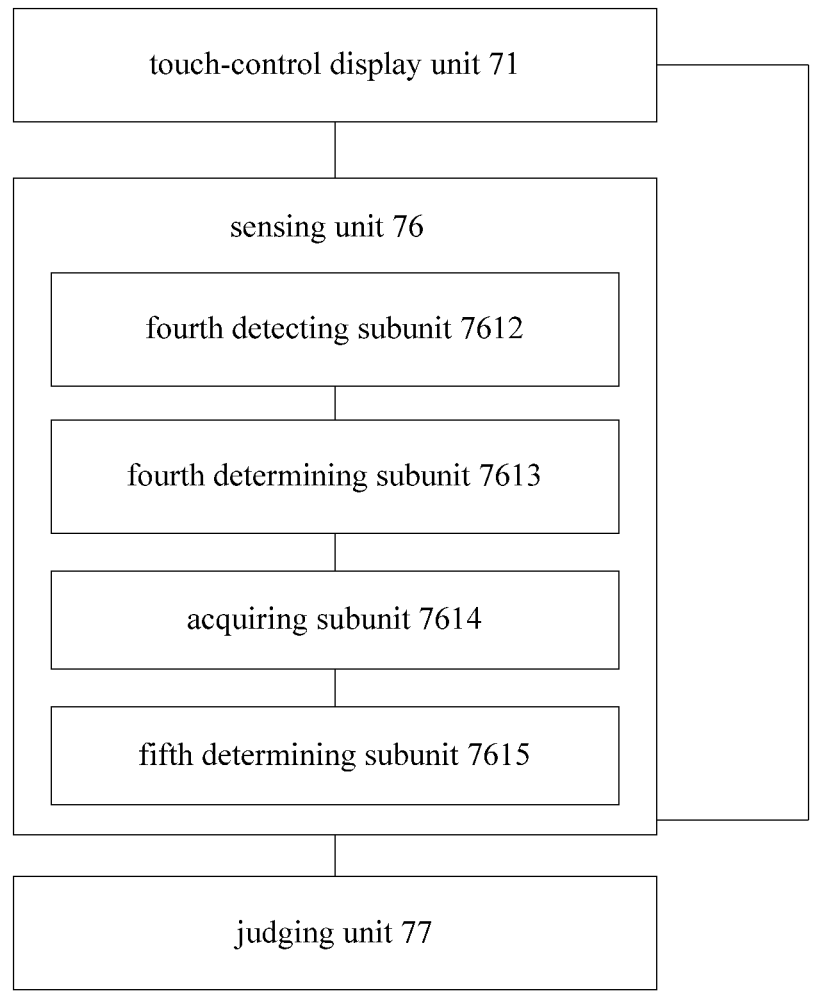
FIG. 38 is a schematic diagram of an electronic apparatus according to a thirty-ninth embodiment of the present invention.

FIG. 38 is a schematic structural diagram of an electronic apparatus according to the thirty-ninth embodiment of the present invention. The electronic apparatus according to this embodiment is able to run a multi-window management application. According to a preferred embodiment of the present invention, the electronic apparatus includes a touch-control display unit 71, a sensing unit 76 and a judging unit 77.

The touch-control display unit 71 is configured to display a target object corresponding to the multi-window management application; a multi-window management interface is displayed when the target object is touch-controlled, the multi-window management interface includes target objects corresponding to N first applications, with N being a positive integer; the first application is displayed in a form of a small window when the first application is initiated by using the target object corresponding to the first application; a display region of the small window is smaller than a display region of a full screen window of the first application; the small window is transformed from the full screen window by using a first parameter.

The sensing unit 76 is configured to detect a grip state of the electronic apparatus.

The judging unit 77 is configured to send a first triggering instruction to the touch-control display unit 71 in the case where the grip state of the electronic apparatus is a first state; and to send a second triggering instruction to the touch-control display unit 71 in the case where the grip state of the electronic apparatus is a second state.

Correspondingly, the touch-control display unit 71 is further configured to display the target object on a first region when the first triggering instruction sent by the judging unit 77 is received; and to display the target object on a second region when the second triggering instruction sent by the judging unit 77 is received.

Preferably, the sensing unit 76 includes a fourth detecting subunit 7612, a fourth determining subunit 7613, an acquiring subunit 7614 and a fifth determining subunit 7615.

The fourth detecting subunit 7612 is configured to detect a position of a touch-controlling point operated on the touch-control display unit by a user within a predetermined period, to obtain N position coordinates, with N being an integer greater than or equal to 1.

The fourth determining subunit 7613 is configured to generate touch-controlling region information based on the N position coordinates, where the touch-controlling region information characterizes a touch-controlling region operated on the touch-control display unit by the user within the predetermined period; and to determine the first region and the second region based on the touch-controlling region information.

The acquiring subunit 7614 is configured to acquire a first touch-controlling operation and determine a position of a touch-controlling point operated on the touch-control display unit by the first touch-controlling operation.

The fifth determining subunit 7615 is configured to determine that the grip state of the electronic apparatus is the first state, in the case where the position of the touch-controlling point operated by the first touch-controlling operation is in the first region; and to determine that the grip state of the electronic apparatus is the second state, in the case where the position of the touch-controlling point operated by the first touch-controlling operation is in the second region.

In the above embodiment, the first parameter is at least one of: a parameter, a matrix, a parameter group and a parameter set.

It should be understood by those ordinary skilled in the art that the function achieved by each of the units and their subunits of the electronic apparatus shown in FIG. 38 may be understood with reference to the description of the above method for processing information.

It should be understood that, in the several embodiments according to the invention, the disclosed device and method may be implemented in other way. The above-described embodiments of the device are merely illustrative. For example, the division for the units is only based on a logic function. There may be other way to divide in actual implement. For example, multiple units or components may be combined or integrated into another system, or some features may be omitted or not be implemented. In addition, the illustrated or discussed mutual coupling or direct coupling or communication connection between the components may be indirect coupling or communication connection via some interfaces, devices or units, and may be electrical, mechanical or of other form.

A unit described above as a separated part may be or may not be physically separated. A part shown in a unit may be or may not be a physical unit, i.e. a part shown in a unit may be located in one place or may be distributed to multiple network units. A part or all of the units may be chosen as required to achieve the object of the present embodiment plan.

In addition, the functional units in the embodiments of the invention may be integrated into one processing unit, or each unit can exit separately, or two or more units may be integrated into one unit. The integrated units described above may be implemented in a form of hardware, or may be implemented in a form of software functional unit.

It should be understood by those skilled in the art that all or a part of the steps for implementing the above method embodiments may be performed by related hardware instructed by a program. The program may be stored in a computer readable storage medium and when being executed may perform steps included in the above method embodiments. The storage medium includes various mediums which may store a program code, such as a removable storage device, a read only memory (ROM, Read-Only Memory), a random access memory (RAM, Random Access Memory), a diskette or a compact disk.

Alternatively, if the above integrated unit in the invention is implemented in the form of software functional module and is sold or used as a separate product, it can be stored in a computer readable storage medium. Based on such understanding, the technical scheme of the embodiments of the invention essentially or its part that provides contribution to the existing technology may be expressed in the form of a software product. The computer software product is stored in one storage medium, and includes several instructions which enable a computer (which may be a personal computer, a server, or a network device, etc.) device to execute all or part of steps of the method of each embodiment of the invention. The storage medium includes various mediums which may store a program code, such as a removable storage device, a read only memory (ROM, Read-Only Memory), a random access memory (RAM, Random Access Memory), a diskette or a compact disk.

What are described above are only specific embodiments of the present invention. However the scope of protection of the present invention is not limited thereto. Any changes or equivalent substitutions made easily by any of those skilled in the art within the technical scope disclosed in the present invention fall within the scope of protection of the present invention. Therefore, the scope of protection of the present invention should consistent with the scope of protection of the claims.

The above-mentioned embodiments are only some preferred embodiments of the present invention, and are not intended to limit the scope of the present invention.

The invention claimed is:

1. A method for processing information, applied in an electronic apparatus, comprising:
    acquiring a first operation for triggering a multi-window manager, wherein the multi-window manager runs on the electronic apparatus;
    triggering an object identifier in the multi-window manager, initiating an application corresponding to the object identifier;
    displaying the multi-window management interface corresponding to the multi-window manager based on the first operation, wherein the multi-window management interface suspends over an operating system interface of the electronic apparatus, and the multi-window management interface comprises a first region and a second region;
    displaying running status information of the application in the first region of the multi-window management interface; and
    displaying a running interface of the application in the second region of the multi-window management interface and the operating system interface in a small window, wherein the small window suspends over operating system interface of the electronic apparatus without being included in the first region or the second region, and is transformed from a full screen window based on a first transformation parameter;
    wherein the electronic apparatus comprises a sensing unit, the method further comprises:
    detecting, by the sensing unit, a hand grip state of the electronic apparatus;
    displaying the multi-window management interface in a first region of a touch display unit of the electronic apparatus, in the case where the hand grip state of the electronic apparatus is a first state;
    displaying the multi-window management interface in a second region of the touch display unit of the electronic apparatus, in the case where the hand grip state of the electronic apparatus is a second state.

2. The method according to claim 1, wherein the acquiring a first operation comprises:
    detecting whether a touch operation which meets a first predetermined condition occurs; and determining that the first operation is acquired, in the case where the operation meets the first predetermined condition;
    detecting whether a key-pressing operation which meets a second predetermined condition occurs; and determining that the first operation is acquired, in the case where the key-pressing operation meets the second predetermined condition;
    detecting whether a change in an attitude of the electronic apparatus which meets a third predetermined condition occurs; and determining that the first operation is acquired, in the case where the change in the attitude of the electronic apparatus which meets the third predetermined condition occurs; or,
    detecting whether a voice operation which meets a fourth predetermined condition occurs; and determining that the first operation is acquired, in the case where the voice operation meets the fourth predetermined condition.

3. The method according to claim 1, further comprising:
    acquiring a second operation;
    determining a first object identifier in the multi-window management interface according to the second operation; and
    determining first running status information of the first object identifier, switching the first application from a first running status to a second running status according to the first running status information, and displaying second running status information of the first application in the multi-window management interface.

4. The method according to claim 1, further comprising:
    obtaining a third operation and generating a third triggering instruction which indicates to select a first application from applications corresponding to the application identifiers displayed in the first region to run in the foreground; and
    in response to the third triggering instruction, judging whether the selected first application runs in the foreground; if the selected first application runs in the foreground, continuously running the first application in the foreground and displaying the running interface of the first application in a first displaying small window, assigned by the third triggering instruction, in the second region of the multi-window management interface; if the selected first application does not run in the foreground, running the first application in the foreground and displaying the running interface of the first application in the first displaying small window, assigned by the third triggering instruction, in the second region of the multi-window management interface.

5. The method according to claim 4, further comprising: in the case where the first application runs in the foreground, displaying the running interface of the first application in the form of a first small window corresponding to the first displaying small window, wherein the first small window is covered by the multi-window management interface transparently, translucently or non-transparently.

6. The method according to claim 5, wherein after the displaying the running interface of the first application in the first displaying small window assigned by the third triggering instruction, the method further comprises:
    obtaining a fourth operation and generating a fourth triggering instruction which indicates to clean the first application displayed in the first displaying small window; and
    in response to the fourth triggering instruction, switching the first application to run in a background or stopping the first application, and cleaning both the running interface of the first application in the first displaying small window and the first small window corresponding to the first displaying small window.

7. The method according to claim 5, wherein after the displaying the running interface of the first application in the first displaying small window assigned by the third triggering instruction, the method further comprises:
    obtaining a fifth operation and generating a fifth triggering instruction which indicates to switch the application running in the foreground from the first application to a second application; and in response to the fifth triggering instruction, switching the first application to run in a background and the second application to run in the foreground, and displaying the running interface of the second application in a first displaying small window, assigned by the fifth triggering instruction, in the second region of the multi-window management interface, wherein the first displaying small window assigned by the fifth triggering instruction is the same as the first displaying small window assigned by the second triggering instruction, and the running interface of the second application displayed in the first displaying small window is configured to replace the running interface of the first application.

8. The method according to claim 5, wherein the second regions comprises at least two first displaying small windows, and the first small window corresponds to the first displaying small window in one-to-one correspondence; in the case where the different first displaying small windows are respectively configured to display running interfaces of different applications, the method further comprises:
   obtaining a sixth operation and generating a sixth triggering instruction which indicates to exchange the running interfaces of the corresponding applications displayed in the two first displaying small windows; and
   in response to the sixth triggering instruction, replacing the running interfaces of the corresponding applications displayed in the two first displaying small windows assigned by the sixth triggering instruction with each other and also replacing the running interfaces of the corresponding applications displayed in the two first small windows respectively corresponding to the two first displaying small windows with each other.

9. The method according to claim 1, further comprising:
   acquiring a seventh operation;
   generating a seventh instruction based on the seventh operation;
   detecting a display state of the target object corresponding to the multi-window management application and obtaining a detection result, in response to the seventh instruction; and
   switching from a first display state to a second display state in the case where the detection result shows that the target object corresponding to the multi-window management application is in the first display state.

10. The method according to claim 1, wherein the detecting, by the sensing unit, a grip state of the electronic apparatus comprises:
   detecting, by the sensing unit, a deflection angle of the electronic apparatus;
   comparing the deflection angle with a preset standard value of a posture, wherein the standard value characterizes a parameter value of the posture in the case where the electronic apparatus is in a horizontal state;
   determining that the grip state of the electronic apparatus is the first state, in the case where the deflection angle is greater than the standard value; and
   determining that the grip state of the electronic apparatus is the second state, in the case where the deflection angle is less than the standard value.

11. The method according to claim 1, wherein the detecting, by the sensing unit, a grip state of the electronic apparatus comprises:
   detecting, by the sensing unit, touch areas of a first surface and a second surface of the electronic apparatus;
   comparing the touch area of the first surface with the touch area of the second surface;
   determining that the grip state of the electronic apparatus is the first state, in the case where the touch area of the first surface is larger than the touch area of the second surface; and
   determining that the grip state of the electronic apparatus is the second state, in the case where the touch area of the first surface is smaller than the touch area of the second surface.

12. The method according to claim 1, wherein the detecting, by the sensing unit, a grip state of the electronic apparatus comprises:
   detecting, by the sensing unit, fingerprint information on a first surface and/or a second surface of the electronic apparatus; and
   determining the grip state of the electronic apparatus based on the fingerprint information on the first surface and/or the fingerprint information on the second surface.

13. The method according to claim 1, wherein the detecting, by the sensing unit, a grip state of the electronic apparatus comprises:
   collecting, by the sensing unit, a grip image of the electronic apparatus;
   analyzing the grip image and acquiring a characteristic parameter of the grip image; and
   matching the characteristic parameter of the grip image with a prestored standard parameter to determine the grip state of the electronic apparatus.

14. The method according to claim 1, wherein the detecting, by the sensing unit, a grip state of the electronic apparatus comprises:
   detecting a position of a touch-controlling point operated on the touch-control display unit by a user within a predetermined period, to obtain N position coordinates, with N being an integer greater than or equal to 1;
   generating touch-control region information based on the N position coordinates, wherein the touch-control region information characterizes a touch-control region operated on the touch-control display unit by the user within the predetermined period;
   determining the first region and the second region based on the touch-control region information;
   acquiring a first touch-control operation and determining a position of a touch-control point operated on the touch-control display unit by the first touch-control operation;
   determining that the grip state of the electronic apparatus is the first state, in the case where the position of the touch-control point operated by the first touch-control operation is in the first region; and
   determining that the grip state of the electronic apparatus is the second state, in the case where the position of the touch-control point operated by the first touch-control operation is in the second region.

15. An electronic apparatus, comprising a processor and a memory having a processor-executable instruction stored therein, and the instruction when executed by the processor, configure the processor to:
   acquire a first operation for triggering a multi-window manager, wherein the multi-window manager runs on the electronic apparatus;
   trigger an object identifier in the multi-window manager, initiating an application corresponding to the object identifier;

display the multi-window management interface corresponding to the multi-window manager based on the first operation, wherein the multi-window management interface suspends over an operating system interface of the electronic apparatus, and the multi-window comprises a first region and a second region;

display running status information of the application in the first region of the multi-window management interface; and display a running interface of the application in the second region of the multi-window management interface and the operating system interface in a small window, wherein the small window suspends over operating system interface of the electronic apparatus without being included in the first region or the second region, and is transformed from a full screen window based on a first transformation parameter;

wherein the electronic apparatus further comprises a sensing unit configured to detect a hand grip state of the electronic apparatus, the processor is further configured to:

display the multi-window management interface in a first region of a touch display unit of the electronic apparatus, in the case where the hand grip state of the electronic apparatus is a first state;

display the multi-window management interface in a second region of the touch display unit of the electronic apparatus, in the case where the hand grip state of the electronic apparatus is a second state.

16. The electronic apparatus according to claim 15, wherein the processor is configured to:

detect whether a touch operation which meets a first predetermined condition occurs; and determine that the first operation is acquired, in the case where the operation meets the first predetermined condition;

detect whether a key-pressing operation which meets a second predetermined condition occurs; and determine that the first operation is acquired, in the case where the key-pressing operation meets the second predetermined condition;

detect whether a change in an attitude of the electronic apparatus which meets a third predetermined condition occurs; and determine that the first operation is acquired, in the case where the change in the attitude of the electronic apparatus which meets the third predetermined condition occurs; or, detect whether a voice operation which meets a fourth predetermined condition occurs; and determine that the first operation is acquired, in the case where the voice operation meets the fourth predetermined condition.

17. The electronic apparatus according to claim 15, wherein the processor is configured to display the multi-window management interface corresponding to the multi-window manager in the touch-control display unit based on the first operation; to display the at least one object identifier corresponding to the at least one application in the multi-window management interface; and to display at least one piece of running status information in one-to-one correspondence with the at least one application in the multi-window management interface, in the case where the running status of the at least one application is determined to be different.

18. The electronic apparatus according to claim 15, wherein the processor is configured to:

acquire an operation input by the user;

determine a first object identifier in the multi-window management interface according to a second operation in the case where the operation is determined to be the second operation; and determine first running status information of the current first object identifier, to switch the first application from a first running status to a second running status according to the first running status information, and to display second running status information of the first application in the multi-window management interface.

\* \* \* \* \*

UNITED STATES PATENT AND TRADEMARK OFFICE
CERTIFICATE OF CORRECTION

PATENT NO. : 9,841,944 B2  
APPLICATION NO. : 14/230205  
DATED : December 12, 2017  
INVENTOR(S) : Guizhen Wang et al.

Page 1 of 1

It is certified that error appears in the above-identified patent and that said Letters Patent is hereby corrected as shown below:

In the Specification

At Column 23, Line number 35, "M" should be --$M_{ij}$--.

At Column 23, Line number 47, "M" should be --$M_{ij}$--.

At Column 23, Line number 48, "$M_{21}=\sin\theta$" should be --$M_{21}=-\sin\theta$--.

At Column 35, Line number 67, "M" should be --$M_{ij}$--.

At Column 36, Line number 1, "$M_{21,}=-\sin\theta$" should be --$M_{21}=-\sin\theta$--.

At Column 42, Line number 28, "$M_{22}\leq\beta$" should be --$M_{22}=\beta$--.

At Column 42, Line number 28, "$M_{11}=a$" should be --$M_{11}=\alpha$--.

At Column 48, Line number 66, "M" should be --$M_{ij}$--.

Signed and Sealed this  
Thirty-first Day of July, 2018

Andrei Iancu  
*Director of the United States Patent and Trademark Office*